US 9,197,518 B2

(12) United States Patent
Yamasaki et al.

(10) Patent No.: US 9,197,518 B2
(45) Date of Patent: Nov. 24, 2015

(54) QUALITY-DETERIORATED PART ANALYZING SYSTEM, QUALITY-DETERIORATED PART ANALYZING DEVICE, QUALITY-DETERIORATED PART ANALYZING METHOD, AND QUALITY-DETERIORATED PART ANALYZING PROGRAM

(75) Inventors: Yasuhiro Yamasaki, Tokyo (JP); Yoichi Hatano, Tokyo (JP)

(73) Assignee: NEC Corporation, Tokyo (JP)

( * ) Notice: Subject to any disclaimer, the term of this patent is extended or adjusted under 35 U.S.C. 154(b) by 1023 days.

(21) Appl. No.: 13/137,169

(22) Filed: Jul. 25, 2011

(65) Prior Publication Data
US 2011/0286348 A1    Nov. 24, 2011

(51) Int. Cl.
H04L 12/26 (2006.01)
H04L 12/721 (2013.01)

(52) U.S. Cl.
CPC .............. *H04L 43/00* (2013.01); *H04L 43/062* (2013.01); *H04L 43/08* (2013.01); *H04L 43/12* (2013.01); *H04L 45/12* (2013.01); *H04L 45/70* (2013.01); *H04L 43/0829* (2013.01)

(58) Field of Classification Search
None
See application file for complete search history.

(56) References Cited

U.S. PATENT DOCUMENTS

| 7,606,896 | B2 | 10/2009 | Kobayashi |
| 2001/0021176 | A1* | 9/2001 | Mimura et al. ............... 370/235 |
| 2002/0105911 | A1 | 8/2002 | Pruthi et al. |
| 2006/0126514 | A1* | 6/2006 | Lee et al. ...................... 370/238 |
| 2006/0190620 | A1* | 8/2006 | Kobayashi .................... 709/242 |
| 2009/0052331 | A1 | 2/2009 | Kobayashi et al. |
| 2010/0008291 | A1 | 1/2010 | LeBlanc et al. |

(Continued)

FOREIGN PATENT DOCUMENTS

| CN | 1881862 A | 12/2006 |
| CN | 101622833 A | 1/2010 |
| GB | 2 401 750 A | 11/2004 |

(Continued)

OTHER PUBLICATIONS

"OpenFlow Switch Specification Version 0.9.0", Jul. 20, 2009 <http://www.openflowswitch.org/documents/openflow-spec-v0.9.0.pdf> (Date of Search: Feb. 4, 2010).

(Continued)

*Primary Examiner* — Khoa Huynh
(74) *Attorney, Agent, or Firm* — McGinn IP Law Group, PLLC

(57) ABSTRACT

Provided is a quality-deteriorated part analyzing system capable of analyzing a quality-deteriorated part in a network while increasing the degree of freedom of precision (coverage ratio, sectioning divisions, etc.) independently of the number and installation locations of devices transmitting and receiving flows. Path calculation means 71 determines paths, each passing through one or more directed links between nodes in the network and being regarded as a target of communication quality measurement, and generates a path table which indicates directed links included in each communication quality measurement target section. Quality measurement means 74 measures communication quality based on the flows corresponding to the paths determined by the path calculation means. Analysis means 75 analyzes a communication quality-deteriorated part in the directed links in the network based on the path table and the communication quality.

18 Claims, 31 Drawing Sheets

(56) References Cited

U.S. PATENT DOCUMENTS

| | | |
|---|---|---|
| 2010/0049460 A1 | 2/2010 | Hasegawa et al. |
| 2010/0118718 A1 | 5/2010 | Kobayashi |

FOREIGN PATENT DOCUMENTS

| | | |
|---|---|---|
| JP | 2006-238052 A | 9/2006 |
| JP | 2009-55113 A | 3/2009 |
| WO | WO 2006/066241 A2 | 6/2006 |
| WO | WO 2006/137373 A1 | 12/2006 |
| WO | WO 2008/108231 A1 | 9/2008 |

OTHER PUBLICATIONS

International Search Report (ISR) (PCT Form PCT/ISA/210) dated Mar. 15, 2011, with partial English translation.

Chinese Office Action dated Jun. 26, 2014 with an English translation thereof.

Supplementary European Search Report dated Mar. 17, 2015.

Japanese Notification of Reasons for Refusal dated Sep. 2, 2014 with a partial English translation thereof.

Atsuo Tachibana, et al., "A Study on Locating Congestion based on Active Measurements over Multiple End-to-End Path", Technical Report of the Institute of Electronics, Information and Communication Engineers, Japan, Corporation Juridical Person the Institute of Electronics, Information and Communication Engineers, Nov. 14, 2003, vol. 103, No. 443, pp. 89-94.

Ihsan Ayyub QAZI, "Designing Experiments using GENI Cluster B", [online], 2009, [retrieved on Aug. 27, 2014] retrieved from the Internet, URL, http://people.cs.pitt.edu/ihsan/~bbn_geni.pdf.

Yoshihiko Kanaumi, el al., "The demonstration experience of OpenFlow on JGN2plus", Proceedings of the 2009 IEICE general conference Communication 2, Corporation Juridical Person the Institute of Electronics, Information and Communication Engineers, Mar. 4, 2009, pp. S135-S136.

\* cited by examiner

FIG. 3

|  | QUALITY INFORMATION |
|---|---|
| F5 | Good |
| F7 | Good |
| F9 | Good |
| F10 | Good |
| F12 | Good |
| F14 | Good |
| F15 | Good |
| F16 | Good |
| F17 | Good |
| F18 | Good |
| F19 | Good |
| F20 | Good |
| F21 | Bad |
| F22 | Bad |

FIG. 10

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| F1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | | | | | | | | | | | | | | | | | | | |
| F2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 11

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | QUALITY INFORMATION |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| F5 | | | | | | | | | 1 | 1 | | | | | | | | | | | | | | | | | | | | | | | | | | | | | | | | | | | Good |
| F7 | | | | | | | | | 1 | 1 | | | 1 | 1 | | | | | | | | | | | | | | | | | | | | | | | | | | | | | | | Good |
| F9 | | | | | | | | | | | | | | | | | | | 1 | 1 | | | | | 1 | 1 | | | | | | | | | | | | | | | | | | | Good |
| F10 | | | | | | | | | | | | | | | | | | | 1 | 1 | 1 | 1 | | | | 1 | 1 | | | | | | | | | | | | | | | | | | Good |
| F12 | | | | | | | | | | | 1 | 1 | | | | | | | 1 | 1 | 1 | 1 | | | 1 | 1 | | | | 1 | 1 | | | | | | | | | | | | | | Good |
| F14 | | | | | | | | | | | 1 | 1 | | | | | | | 1 | 1 | 1 | 1 | 1 | 1 | | | | | | | | | | | 1 | 1 | | | | | | | | | Good |
| F15 | 1 | 1 | | | | | | | | | | | | | | | | | | 1 | 1 | | | | | | | | | | | | | | | | | | | | | | | | Good |
| F16 | | | 1 | 1 | | | | | | | | | | | | | | | | 1 | 1 | 1 | | | | | | | | | | | | | | | | | | | | | | | Good |
| F17 | | | | | 1 | 1 | | | | | | | | | | 1 | 1 | | | | | | 1 | 1 | | | | | | | | | | | | | | | | | | | | | Good |
| F18 | | | | | | | 1 | 1 | | | | | | | | 1 | 1 | | | 1 | 1 | 1 | 1 | 1 | | | | | | | | | | | | | | | | | | | | | Good |
| F19 | | | | | | | | | | | | | | | | | | | | 1 | 1 | | | | | | | | 1 | 1 | | | | | | | 1 | 1 | | | | | | | Good |
| F20 | | | | | | | | | | | | | | | | | | | | 1 | 1 | | | | | | | | 1 | 1 | | | | | | | | | 1 | 1 | | | | | Good |
| F21 | | | | | | | | | | | | | | | | | | | | 1 | 1 | 1 | 1 | 1 | | | | | | | | 1 | 1 | 1 | 1 | | | | | | 1 | 1 | | | Bad |
| F22 | | | | | | | | | | | | | | | | | | | | 1 | 1 | 1 | 1 | 1 | | | | | | | | 1 | 1 | 1 | 1 | | | | | | | | 1 | 1 | Bad |

QUALITY-DETERIORATED LINK (CANDIDATE)
LINK 34, LINK 35

FIG. 14

| | RELATED TECHNIQUE 1 | RELATED TECHNIQUE 2 | ALGORITHM 1 IN FIRST EXEMPLARY EMBODIMENT | | | ALGORITHM 2 IN FIRST EXEMPLARY EMBODIMENT |
| --- | --- | --- | --- | --- | --- | --- |
| | | | STEP 1-1 | STEP 1-2 | STEP 2 | |
| THE NUMBER OF PROBES | 4 | 4 | 1 | 1 | 1 | 1 |
| THE NUMBER OF GENERATED FLOWS | 12 | 14 | 14 | 22 | 14 | 2 |
| COVERAGE RATIO | 27% (12/44) | 27% (12/44) | 63% (28/44) | 100% (44/44) | 100% (44/44) | 100% (44/44) |
| SECTIONING DIVISIONS | 8 | 12 | 14 | 22 | 22 | 3 |

FIG. 23

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| F1-1 | | | | | | | | | | | | | | | | | | | 1 | 1 | 1 | 1 | 1 | 1 | | | | | | | | | | | | | | | | | | | | |
| F1-2 | | | | | | | | | | | | | | | | | | | | 1 | 1 | | | | | | | | | | | | | | | | | | | | | | | |
| F1-3 | | | | | | | | | | | | | | | | | | | | | | 1 | 1 | 1 | 1 | 1 | | | | | | | | | | | | | | | | | | |
| F1-4 | | | | | | | | | | | | | | | | | | | | | 1 | 1 | | | | | | | | | | | | | | | | | | | | | | |
| F2-1 | | | | | | | | | | 1 | | | | | | | | | | 1 | 1 | | | | | | | | | | | | | | | | | 1 | | | | | | |
| F2-2 | | | | | | | | | | 1 | | | | | | | | | | | | 1 | | | | | | | | | 1 | | | | | | 1 | | 1 | | | | | |
| F2-3 | | | | | | | | | | | | | | | | | | | | | | 1 | | | | | | | | | | | | | | | | 1 | | 1 | | | | |
| F3-1 | | | | | | | | | | | | 1 | | | | | | | | | 1 | | | | | | | | | | 1 | | | | | | 1 | | | | | | | |
| F3-2 | | | | | | | | | | | | 1 | | | | | | | | | | 1 | | | | | | | | | 1 | 1 | | | | | 1 | | | | | | | |
| F3-3 | | | | | | | | | | | | | | | | | | | | | | | | | | | | | | | | 1 | | | | | | | | | | | | |
| F4-1 | | | | | | | | | | | | | | | | | 1 | | | | | | | | 1 | 1 | | | | | 1 | | | | | | | | | | 1 | | | |
| F4-2 | | | | | | | | | | | | | | | | | 1 | | | | | | | 1 | 1 | | | | | | 1 | | | | | | | | | | | 1 | | |
| F4-3 | | | | | | | | | | | | | | | | | | | | | | | | 1 | | | | | | | | | | | | | | | | | 1 | | | |
| F5-1 | | | | | | | | | | | | | | | | | | 1 | | | | | 1 | 1 | | | | | | | | 1 | | | | | | | | | | 1 | 1 | 1 |
| F5-2 | | | | | | | | | | | | | | | | | | 1 | | | | | 1 | | 1 | | | | | | | | | | | | | | | | 1 | | | |
| F5-3 | | | | | | | | | | | | | | | | | | | | | | | 1 | | | | | | | | | 1 | | | | | | | | | | 1 | | 1 |

FIG. 29
Related Art

FLOWS: 12
MONITORED LINKS: 12/44
COVERAGE RATIO: 27%
MANAGEMENT UNITS: 8 DIVISIONS

FIG. 32
Related Art

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| a1→a2 | | | | | | | | | | | | 1 | | | | | | | | | | 1 | | | | | | | | | | | | | | | | | | | | | | |
| a1→a3 | | | | | | | | | | | | | 1 | | | | | | | | 1 | | | | | | | | | 1 | | | | | | | | | | | | | | |
| a1→a4 | | | | | | | | | | | | | | 1 | | | | | | | | | 1 | | | | | | | | | | | | | | | | | | | | | |
| a2→a1 | | | | | | | | | | | | | | | | | | | | | | | | 1 | | | | | | | | | | | | | | | | | | | | |
| a2→a3 | | | | | | | | | | | | | | 1 | | | | | | | | | 1 | | 1 | | | | | | | | | | | | | | | | | | | |
| a2→a4 | | | | | | | | | | | | | | | 1 | | | | | | | | 1 | | 1 | | | | | 1 | | | | | | | | | | | | | | |
| a3→a1 | | | | | | | | | | | | | | | 1 | | | | | | | 1 | | 1 | | | | | | | | | | | | | | | | | | | | |
| a3→a2 | | | | | | | | | | | | | | | | | | | | | 1 | | | | 1 | | | | | | | 1 | | | | | | | | | | | |
| a3→a4 | | | | | | | | | | | | | | | | | | | | | 1 | | | | | | | | | | | 1 | | | | | | | | | | | |
| a4→a1 | | | | | | | | | | | | | | | | | | | | | | 1 | | 1 | | | | | | | | 1 | | | | | | | | | | | |
| a4→a2 | | | | | | | | | | | | | | | | | | | 1 | 1 | | | | | | | | | | 1 | | | | | | | | | | | | | | |
| a4→a3 | | | | | | | | | | | | | | | | | | | 1 | 1 | | | | | | | | | | | | | | | | | | | | | | | |
| ADDED FLOW 1 | | | | | | | | | | | | | | | | | | | 1 | 1 | | | | | | | | | | | | | | | | | | | | | | | | |
| ADDED FLOW 2 | | | | | | | | | | | | | | | | | | | | | | | | | 1 | 1 | | | | | | | | | | | | | | | | | | |

FLOWS: 14
MONITORED LINKS: 12/44
COVERAGE RATIO: 27%
MANAGEMENT UNITS: 12 DIVISIONS

QUALITY-DETERIORATED PART ANALYZING SYSTEM, QUALITY-DETERIORATED PART ANALYZING DEVICE, QUALITY-DETERIORATED PART ANALYZING METHOD, AND QUALITY-DETERIORATED PART ANALYZING PROGRAM

The present application is based on International Application No. PCT/JP2011/000656 filed on Feb. 7, 2011, which is based on and claims priority from Japan Patent Application No. 2010-034010, filed on Feb. 18, 2010, the entire contents of which is incorporated herein by reference.

TECHNICAL FIELD

The present invention relates to a quality-deteriorated part analyzing system, a quality-deteriorated part analyzing device, a quality-deteriorated part analyzing method and a quality-deteriorated part analyzing program for analyzing quality-deteriorated parts in a network.

BACKGROUND ART

A variety of methods for analyzing quality-deteriorated parts of a network have been proposed (see Patent Documents 1 and 2, for example). FIG. 26 is an explanatory diagram showing an example of a network as a target of the quality-deteriorated part analysis. The network includes nodes such as switching nodes (layer 2 switches, layer 3 switches, routers, etc.), bridge nodes and gateways. In the example of FIG. 26, nodes A-O correspond to these nodes. The nodes are connected together via links. The links can be implemented in various styles, such as LAN cables, fiber-optic cables and wireless links. In FIG. 26, directed links 1-44, which are defined taking also their directions into consideration, are shown as an example. In the figure, the direction of each directed link is indicated with an arrow and the reference character (reference numeral) of each directed link is shown beside the link.

An example of the analysis of the quality-deteriorated part in the network illustrated in FIG. 26 employing the technique described in the Patent Document 1 will be explained below. In the case where the quality-deteriorated part in the network of FIG. 26 is analyzed employing the technique of the Patent Document 1, probes a1-a4 for measuring the quality of each flow and a quality analysis server 1000a for analyzing the quality-deteriorated part are used as illustrated in FIG. 27. It should be noted that the probes are referred to as "terminals" and the quality analysis server is referred to as a "quality-deteriorated part estimating server" in the Patent Document 1. The probes communicate with each other, measure communication quality between the probes (hereinafter referred to as "inter-probe quality"), and periodically transmit information representing the inter-probe quality to the quality analysis server 1000a.

FIG. 28 is a block diagram showing an example of the configuration of the quality analysis server in the technique described in the Patent Document 1. The quality analysis server 1000a includes a quality information gathering unit 1710, a path information gathering unit 1720, a flow link table management unit 1750, a flow link table storage unit 1760 and a quality analysis unit 1770. The quality information gathering unit 1710 receives the information on the inter-probe quality measured by the probes. The path information gathering unit 1720 receives path information (information on paths between probes) determined by another network system and generates a path table by gathering the path information. The path table is a table which describes whether each flow passes through each link or not. The flow link table management unit 1750 generates a flow link table based on the path table and the inter-probe quality which the quality information gathering unit 1710 received from the probes. The flow link table is a table made by adding the quality measurement result of each flow to the path table. The flow link table storage unit 1760 stores the generated flow link table. The quality analysis unit 1770 analyzes the quality-deteriorated part based on the flow link table.

In the technique described in the Patent Document 1 (hereinafter referred to as a "related technique 1"), the paths of the flows used for the analysis are determined by another system in accordance with a general routing method and the quality analysis server 1000a is informed of the thus-determined paths. Since the quality-deteriorated part analysis of a network is conducted using the difference in the path that each flow passes through, detailed analysis is made possible by measuring the quality of a variety of paths. For this purpose, the communication among the probes can be executed by full-mesh communication. The number of flows in the full-mesh communication can be calculated with the following equation (1):

$$\text{The number of flows in full-mesh communication} = (\text{the number of probes}) \times (\text{the number of probes} - 1) \quad (1)$$

In the case of FIG. 27 where four probes are placed at the illustrated locations, the number of flows in the full-mesh communication is 12 according to the equation (1). FIG. 29 shows an example of the path table in this case. In the path table, each column corresponds to each directed link (link number of each directed link) and each row corresponds to each flow. In a row representing a particular flow, a flag "1" is described in each column representing a directed link through which the flow passes. For example, the first row of the table shown in FIG. 29 indicates that the flow from the probe a1 to the probe a2 passes through links 13, 23 and 25. In the example of FIG. 5, among the total of 44 directed links in the network, the number of links through which any one of the flows used for the analysis passes is 12. The communication quality is monitored in the 12 directed links. The number "12" of the links corresponds to 27% of all the links. The ratio of the number of the monitored directed links to the total number of directed links will hereinafter be defined as a "coverage ratio" (coverage ratio=(the number of monitored directed links)/(total number of directed links)).

The number of types of description when the path table is viewed in the column direction (the number of combinations of rows holding the flag "1" counted in the column direction) equals the number of discriminable quality-deteriorated parts. In the path table shown in FIG. 29, the number of description types is "8". Each description type when the table is viewed in the column direction will hereinafter be referred to as a "sectioning division". In the example of FIG. 29, the links 19 and 21 have identical descriptions in the column direction. Therefore, it is impossible to judge which one of the links 19 and 21 is the quality-deteriorated part when quality deterioration has occurred in one of the links. In contrast, the links 13 and 14 have different descriptions in the column direction, and thus it is possible to judge which one of the links 13 and 14 is the quality-deteriorated part when quality deterioration has occurred in one of the links. The quality deterioration analysis is impossible for links through which no flow passes.

Also in the technique described in the Patent Document 2, the paths of the flows used for the analysis is determined by another system in accordance with a general routing method and the quality analysis server 1000a is informed of the thus-determined paths. The key feature of the technique of the Patent Document 2 is that it increases the number of types of paths by adding flows. In this technique, a flow including part of the path of a flow already communicated between probes is added by changing the TTL (Time To Live), etc. For example, assuming that the communication among probes has been conducted in the related technique 1 using the flows shown in FIG. 30, if the technique described in the Patent Document 2 (hereinafter referred tows a "related technique 2") is applied to the environment shown in FIG. 30, two flows are added to the environment as shown in FIG. 31. FIG. 32 shows an example of the path table in this case. In comparison of FIG. 32 with FIG. 29, the number of sectioning divisions has increased to 12 due to the addition of two flows even though the coverage ratio remains at 27%. Therefore, the quality-deteriorated part analysis can be conducted in more detail compared to the case where the path table of FIG. 29 (the number of sectioning divisions is "8") is used.

Meanwhile, there has been known a communication system in which a controller determines, for each flow, the operation of each node upon reception of packets and makes settings regarding the action of each flow for each node on the path of the flow. Protocols allowing the controller to control the nodes include a protocol called "OpenFlow". Specifications of OpenFlow are described in Non-Patent Document 1, for example.

CITATION LIST

Patent Literature

Patent Document 1: JP-A-2006-238052
Patent Document 2: WO/2006/137373 pamphlet

Non-Patent Document

Non-Patent Document 1: "OpenFlow Switch Specification Version 0.9.0", Jul. 20, 2009 <http://www.openflowswitch.org/documents/openflow-spec-v0.9.0.pdf> (Date of Search: Feb. 4, 2010)

SUMMARY OF INVENTION

Technical Problem

In the related technique 1, the paths of the flows used for the analysis are determined by another system in accordance with a general routing method. Thus, the diversity of paths (path diversity) has an upper limit determined by the equation (1). The state in which the path diversity is at the upper limit is the state in which the full-mesh communication is executed among the probes. In order to change the types of paths, there is no choice other than reducing the number of flows from this state. Thus, to ensure the path diversity, the number of probes has to be increased. In the network shown in FIG. 27, for example, eight or more probes are necessary for analyzing the quality deterioration of each directed link since the number of directed links connecting nodes is 44. Still more probes can become necessary depending on the status of the path table. Further, to attain a network coverage ratio of 100%, every edge node has to be provided with a probe. For the measurement of an edge link, an edge node at the end of the edge link has to be provided with a probe since the measurement is impossible at a position with no probe.

As above, in the related technique 1, the number of probes has to be increased in order to increase the precision (coverage ratio, sectioning divisions, etc.). However, increasing the number of probes leads to increase in the maintenance cost and the introduction cost for equipment. Further, the installation of each probe can be restricted by the state of communication and the number of ports of the router. There can also be a restriction on the distance when a probe is placed at a remote location. Thus, there exists another problem that the probes cannot freely be installed. Furthermore, since the precision (coverage ratio, sectioning divisions, etc.) is determined subordinately by the number and installation locations of probes, the monitoring of an intended directed link group (as the target of the quality deterioration analysis) may be impossible when the necessary number of probes cannot be provided or when there is a restriction on the installation locations of the probes.

Meanwhile, in the related technique 2, the path diversity is increased by adding flows by changing the TTL, etc. However, the flows are determined by another system in accordance with a general routing method also in this technique. Thus it is hard to completely resolve the problem that the number of probes has to be increased in order, to increase the precision (coverage ratio, sectioning divisions, etc.) and the problem that the monitoring of the intended directed link group may be impossible when there is a restriction on the installation locations of the probes, etc. Further, the addition of flows is implemented in the related technique 2 by making a node in the network receive a packet once and send back the received packet to the probe by use of the TTL, etc. In this case, the related technique 2 can become inapplicable depending on the settings of the node. For example, in the ICMP (Internet Control Message Protocol) or the source route option, a setting for prohibiting the passage through the network can be made from the viewpoint of security. In such cases, the related technique 2 becomes unusable depending on the node settings. Furthermore, while the quality of the data plane of the network is measured by use of regular flows, the quality of a flow that turned back at a node is affected by the processing load on the CPU of the node. While the node is in the middle of a high-load process, therefore, it seems as if quality deterioration has occurred in the network from the result of the quality measurement even if no quality deterioration has actually occurred in the network.

It is therefore the primary object of the present invention to provide a quality-deteriorated part analyzing system, a quality-deteriorated part analyzing device, a quality-deteriorated part analyzing method and a quality-deteriorated part analyzing program capable of implementing the quality-deteriorated part analysis of a network while the degree of freedom of the precision (coverage ratio, sectioning divisions, etc.) is increased independently of the number and installation locations of the devices transmitting and receiving the flows.

Solution to Problem

A quality-deteriorated part analyzing system in accordance with the present invention comprises: path calculation means which determines paths, each passing through one or more directed links between nodes in a network and being regarded as a target of communication quality measurement, by referring to topology information on the network and generates a path table which indicates directed links included in each communication quality measurement target section; node control means which makes settings for the nodes in the network, the settings for forwarding along the paths flows corresponding to the paths determined by the path calculation means; flow transmission means which transmits the flows corresponding to the paths determined by the path calculation means; quality measurement means which measures communication quality based on the flows corresponding to the paths determined by the path calculation means; and analysis means which analyzes a communication quality-deteriorated part in the directed links in the network based on the path table and the communication quality measured by the quality measurement means.

A quality-deteriorated part analyzing device in accordance with the present invention comprises: path calculation means which determines paths, each passing through one or more directed links between nodes in a network and being regarded as a target of communication quality measurement, by referring to topology information on the network and generates a path table which indicates directed links included in each communication quality measurement target section; node control means which makes settings for the nodes in the network, the settings for forwarding along the paths flows corresponding to the paths determined by the path calculation means; quality information acquiring means which acquires information on communication quality measured based on the flows corresponding to the paths determined by the path calculation means; and analysis means which analyzes a communication quality-deteriorated part in the directed links in the network based on the path table and the communication quality.

A quality-deteriorated part analyzing method in accordance with the present invention comprises the steps of: determining paths, each passing through one or more directed links between nodes in a network and being regarded as a target of communication quality measurement, by referring to topology information on the network and then generating a path table which indicates directed links included in each communication quality measurement target section; making settings for the nodes in the network, the settings for forwarding along the paths flows corresponding to the determined paths; transmitting the flows corresponding to the determined paths; measuring communication quality based on the flows corresponding to the determined paths; and analyzing a communication quality-deteriorated part in the directed links in the network based on the path table and the communication quality.

A quality-deteriorated part analyzing program in accordance with the present invention causes a computer to execute: a path calculation process of determining paths, each passing through one or more directed links between nodes in a network and being regarded as a target of communication quality measurement, by referring to topology information on the network and then generating a path table which indicates directed links included in each communication quality measurement target section; a node control process of making settings for the nodes in the network, the settings for forwarding along the paths flows corresponding to the paths determined by the path calculation process; a quality information acquiring process of acquiring information on communication quality measured based on the flows corresponding to the paths determined in the path calculation process; and an analysis process of analyzing a communication quality-deteriorated part in the directed links in the network based on the path table and the communication quality.

Advantageous Effects of the Invention

According to the present invention, the quality-deteriorated part analysis of a network can be conducted while the degree of freedom of the precision (coverage ratio, sectioning divisions, etc.) is increased independently of the number and installation locations of the devices transmitting and receiving the flows.

BRIEF DESCRIPTION OF DRAWINGS

FIG. 3 It depicts an explanatory diagram showing an example of data stored in a quality information storage unit.

FIG. 10 It depicts is an explanatory diagram showing an example of the path table corresponding to the paths shown in FIG. 9.

FIG. 11 It depicts is an explanatory diagram showing an example of a flow link table.

FIG. 14 It depicts an explanatory diagram showing comparison among the related technique 1, the related technique 2 and the first exemplary embodiment of the present invention.

FIG. 23 It depicts an explanatory diagram showing an example of the path table in the third exemplary embodiment.

FIG. 29 It depicts an explanatory diagram showing an example of the path table.

FIG. 32 It depicts an explanatory diagram showing an example of the path table.

DESCRIPTION OF EMBODIMENTS

Figure 1:
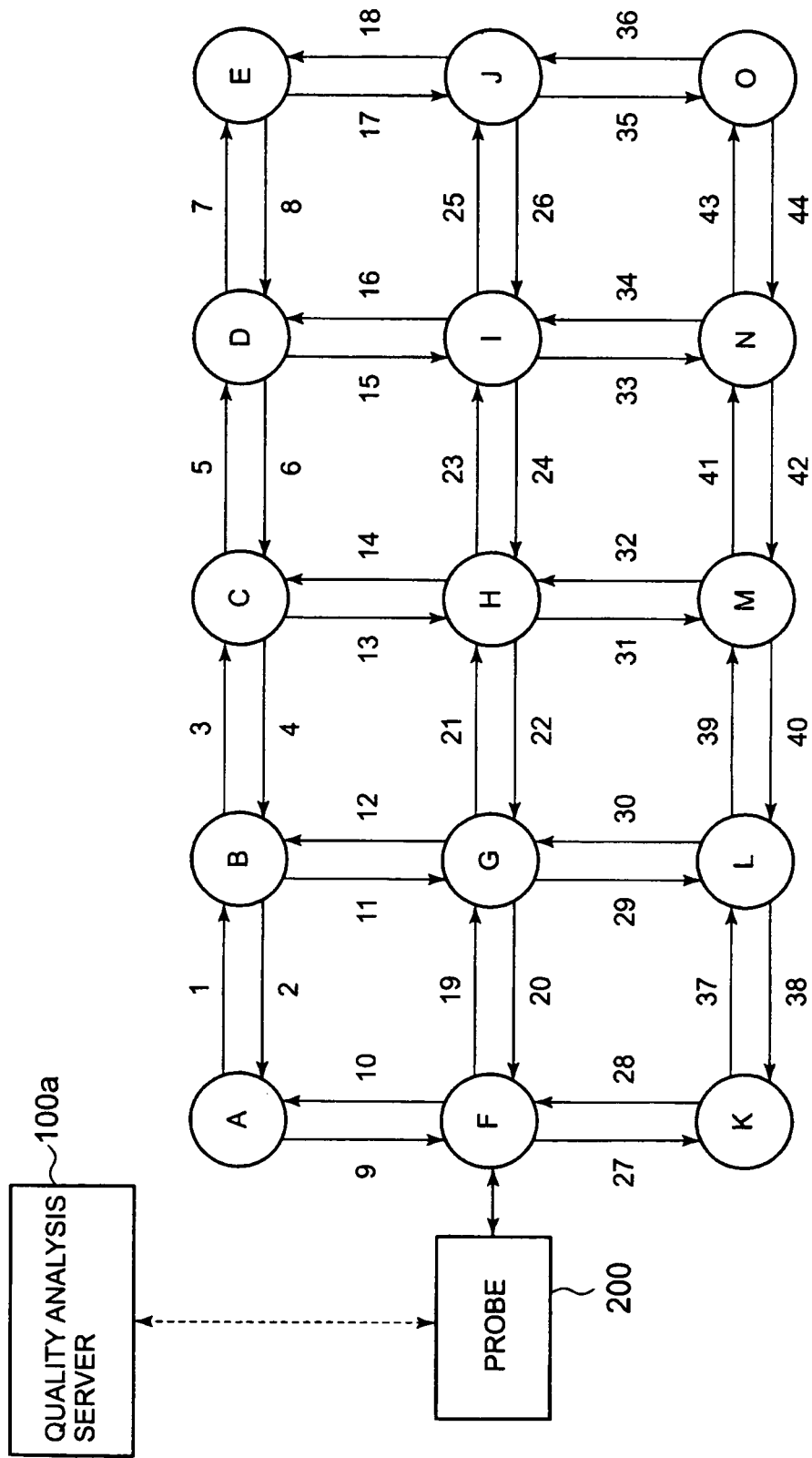
FIG. 1 It depicts an explanatory diagram showing a quality-deteriorated part analyzing system in accordance with a first exemplary embodiment of the present invention.

Referring now to the drawings, a description will be given in detail of preferred exemplary embodiments in accordance with the present invention.

First Exemplary Embodiment

FIG. 1 is an explanatory diagram showing a quality-deteriorated part analyzing system in accordance with a first exemplary embodiment of the present invention. The quality-deteriorated part analyzing system of the first exemplary embodiment includes a quality analysis server 100a and a probe 200. The probe 200 receives each flow sent out to the network and measures communication quality of the flow. In the example of FIG. 1, the probe 200 executes both the transmission and the reception of the flows to/from the network. The quality analysis server 100a analyzes a link having deteriorated communication quality based on the communication quality measured by the probe 200. Thus, the quality analysis server 100a can also be referred to as a "quality-deteriorated part analyzing device".

The following explanation will be given assuming that the network as the target of the quality-deteriorated part analysis is the network shown in FIG. 26, for example. However, the topology and the number of nodes of the network as the target of the quality-deteriorated part analysis are not restricted to the example shown in FIG. 26. While a case where the probe 200 is connected to a node F will be explained below as an example, the node to which the probe 200 is connected is not particularly restricted, either.

However, the network shown in FIG. 1 is assumed to be of a style in which a controller (unshown) for controlling the nodes explicitly grasps the path from the transmitting terminal to the receiving terminal of each communication and makes action-related settings to the nodes in regard to each flow. Typical examples of such a network include a network employing the OpenFlow (hereinafter referred to as an "OpenFlow network").

An OpenFlow network includes a plurality of nodes (switches) and a controller (unshown) for controlling the nodes. The data plane and the control plane are placed separately; the data plane is placed in each node while the control plane is placed in the controller. Each node and the controller communicate with each other according to the OpenFlow protocol. In this architecture, a flow table (specifying actions for each flow) held by each node is controlled by the controller. Thus, accessibility to the controller makes it possible to grasp the whole network topology managed by the controller and path information on the path from the transmitting terminal to the receiving terminal when communication has occurred. Further, by manipulating packet forwarding destinations which are specified as actions in the flow table of each node, it is possible to employ a unique routing method determined by the controller, change the routing method flow by flow, etc.

In ordinary communication, if a packet having a source address and a destination address identical with each other is transmitted by a communication terminal, a node first receiving the packet immediately forwards the packet to the transmitting terminal (which is also the receiving terminal). In the OpenFlow, flexibility in the way of discriminating between flows is high since the discrimination between flows can be made not only based on the IP header and the MAC (Media Access Control) header but also based on the input port (information indicating through which port of the node the packet entered the node). Thus, it is possible to issue an instruction for forwarding a special flow (such as the packet having identical source address and destination address) to a particular port. Consequently, a setting for returning such a packet having identical source address and destination address to the transmitting terminal via all the nodes in the network becomes possible.

Next, technical terms pertinent to the present invention will be explained below.

The "coverage ratio" means the ratio of the number of monitored directed links to the total number of directed links, which is calculated with the equation "coverage ratio=(the number of monitored directed links)/(total number of directed links)". The coverage ratio serves as an index indicating the ratio of directed links, among all the directed links, for which the presence/absence of quality deterioration is being checked. An analysis flow is transmitted in order to check whether there exists quality deterioration or not. Even when there is only one analysis flow, each one of links through which the analysis flow passes is regarded as a monitored directed link. When the coverage ratio is below 100%, quality deterioration occurring in a directed link through which no analysis flow passes cannot be detected.

The "sectioning division" means each type of combination of flows that are listed in regard to a directed link in cases where flows passing through each directed link are listed (in short, each combination type of listed flows). For example, referring to a table shown in FIG. 4 which will be explained later, each row represents a flow and each column represents a directed link. A path table is generated based on this type of table as follows, for example. When a flow (corresponding to a row) passes through directed links (each corresponding to a column), a flag (expressed as "1", for example) is described in cells where the row corresponding to the flow intersects with the columns corresponding to the directed links. The "sectioning division" means each type of description when the path table is viewed in the column direction (each type of combination of rows holding "1" when the table is viewed in the column direction). In the path table shown in FIG. 29, for example, the links 23 and 25 have identical sectioning divisions since the flags exist at the same positions for both links. In contrast, the links 25 and 26 have different sectioning divisions since the flags exist at different positions. The number of "sectioning divisions" is an index indicating "into how many types of groups the monitored directed links are divided for the quality-deteriorated part analysis". Incidentally, there are cases where a row of a path table corresponds to a section as a part of the path of a flow, as will be explained in a third exemplary embodiment.

When the number of sectioning divisions equals the number of monitored directed links, the presence/absence of quality deterioration can be checked in units of directed links. In contrast, even when the number of monitored directed links is large, if the number of sectioning divisions is smaller than the number of monitored directed links, a plurality of directed links corresponding to the same sectioning division have to be handled as candidates for the quality-deteriorated part. Therefore, the quality-deteriorated part can be narrowed down in more detail with the increase in the number of sectioning divisions.

A "monitoring target directed link group" (a directed link group as the monitoring target) means a group (unit) of directed links that are listed as the candidates for the quality-deteriorated part when quality deterioration has occurred at one point. The term "monitoring target directed link group" does not mean all the monitored directed links. In the example of FIG. 29, the links 19 and 21 belong to the same "monitoring target directed link group". The links 20 and 22 also belong to the same "monitoring target directed link group". Directed links belonging to a "monitoring target directed link group" may either be physically contiguous or not. In addition, even one physical link can be assigned to different "monitoring target directed link groups" like the links 19 and 20.

Figure 2:
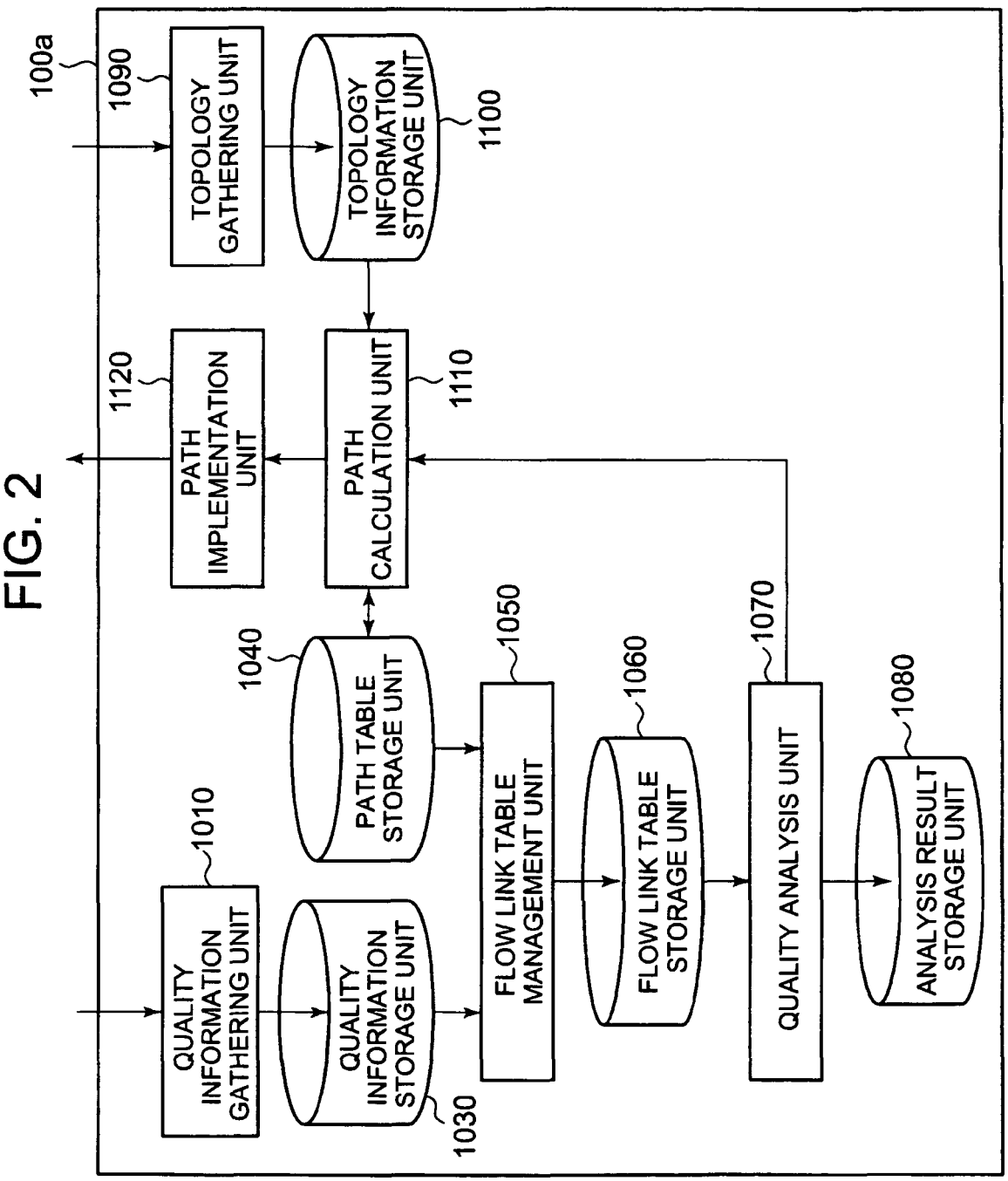
FIG. 2 It depicts a block diagram showing an example of the configuration of a quality analysis server.

Next, the configuration of the quality analysis server (quality-deteriorated part analyzing device) 100a will be described below. FIG. 2 is a block diagram showing an example of the configuration of the quality analysis server 100a. In the first exemplary embodiment, the quality analysis server 100a includes a quality information gathering unit 1010, a quality information storage unit 1030, a topology gathering unit 1090, a topology information storage unit 1100, a path calculation unit 1110, a path implementation unit 1120, a path table storage unit 1040, a flow link table management unit 1050, a flow link table storage unit 1060, a quality analysis unit 1070 and an analysis result storage unit 1080.

The quality information gathering unit 1010 receives information on the communication quality measured by the probe 200 (see FIG. 1) from the probe 200.

The quality information storage unit 1030 is a storage device for storing the communication quality information which the quality information gathering unit 1010 received from the probe 200.

The topology gathering unit 1090 gathers topology information on the network from a device that manages the network (e.g., OpenFlow controller (unshown)).

The topology information storage unit 1100 is a storage device for storing the topology information gathered by the topology gathering unit 1090.

The path calculation unit 1110 calculates the path of each flow that is sent out to the network for the quality-deteriorated part analysis (analysis flow) based on the topology information and generates a path table which indicates the calculated paths of the flows.

The path table storage unit 1040 is a storage device for storing the path table.

The path implementation unit 1120 controls the settings of each node so that each flow sent out for the quality-deteriorated part analysis is forwarded along the path calculated by the path calculation unit 1110. For example, the path implementation unit 1120 requests the OpenFlow controller (un- shown) to make the settings (for forwarding the analysis flow along the path calculated by the path calculation unit 1110) to the nodes.

The flow link table management unit 1050 generates a flow link table based on the communication quality information stored in the quality information storage unit 1030 and the path table stored in the path table storage unit 1040. The flow link table is a table made by adding the communication quality of each flow to the path table.

The flow link table storage unit 1060 is a storage device for storing the flow link table.

The quality analysis unit 1070 analyzes the quality-deteriorated part in the network based on the flow link table. Specifically, the quality analysis unit 1070 judges whether there exists a quality-deteriorated part in the network and then makes a judgment on the quality-deteriorated part.

The analysis result storage unit 1080 is a storage device for storing the result of the analysis by the quality analysis unit 1070.

The quality information gathering unit 1010, the topology gathering unit 1090, the path calculation unit 1110, the path implementation unit 1120, the flow link table management unit 1050 and the quality analysis unit 1070 are implemented by, for example, a computer's CPU operating according to a quality-deteriorated part analyzing program. In this case, the quality-deteriorated part analyzing program may be prestored in a program storage unit (unshown) of the quality analysis server 100a and the CPU may operate as the quality information gathering unit 1010, topology gathering unit 1090, path calculation unit 1110, path implementation unit 1120, flow link table management unit 1050 and quality analysis unit 1070 according to the program. Alternatively, the quality information gathering unit 1010, topology gathering unit 1090, path calculation unit 1110, path implementation unit 1120, flow link table management unit 1050 and quality analysis unit 1070 may also be implemented by separate units.

The probe 200 (see FIG. 1) generates each analysis flow specified by the path calculation unit 1110 and sends out the generated analysis flow to the network. The probe 200 also receives the flows from the network and measures the quality of the data plane of the network based on the received flows. The probe 200 transmits the result of the measurement of the quality (communication quality) to the quality analysis server 100a. The transmission and reception of the flows and the communication quality measurement executed by the probe 200 are techniques well known to those skilled in the art, and thus detailed explanation thereof is omitted.

In a specific method for discriminating between multiple types of flows transmitted from the probe 200 and returning to the probe 200 via nodes in the network, the port number for TCP (Transmission Control Protocol) or UDP (User Datagram Protocol) is changed (while keeping the MAC address and the IP address constant) and the port number is used as a flow identifier. The path implementation unit 1120 (see FIG. 2) carries out control so that such flow identifiers and the actions for forwarding each flow along the calculated path are set to each node (e.g., by instructing the OpenFlow controller to make the settings of each node). Consequently, the node F in FIG. 1 refers to the TCP/UDP port number of each received packet and switches the forwarding flow by flow. For example, the node F forwards a received packet to the node A if the port number is 1, to the node G if the port number is 2, or to the node K if the port number is 3. The other nodes also operate similarly. Therefore, the probe 200 has only to transmit a packet containing a flow identifier in regard to each flow.

In the following, the configuration of the quality analysis server 100*a* will be explained in detail.

The quality information gathering unit 1010 receives the communication quality information (regarding each flow) periodically transmitted from the probe 200 and stores the information in the quality information storage unit 1030. This communication quality information represents communication quality from the transmitting terminal of each flow to a quality measurement terminal. In the example of FIG. 1, both the transmitting terminal of each flow and the quality measurement terminal are implemented by the same terminal, namely, the probe 200. However, the transmitting terminal of each flow and the receiving terminal for measuring the quality may also be implemented by separate terminals as will be described later. Further, the quality measurement terminal may also be placed between the transmitting terminal and the receiving terminal of each flow. Items of the communication quality measured by the probe 200 can include, for example, a packet loss rate, packet loss number (the number of lost packets), delay information, RTT (Round Trip Time), jitter, R-factor, MOS, etc. However, the items measured are not restricted to those listed above; the probe 200 may be configured to measure other communication quality items. The quality information gathering unit 1010 may store the received measurement values in the quality information storage unit 1030 without processing the data. Alternatively, the quality information gathering unit 1010 may also employ a threshold value previously set for classifying the value of each communication quality item into classes "Fine (Good)" and "Deteriorated (bad)", replace each measurement value with "Fine" or "Deteriorated" if the measurement value represents quality higher/lower than the threshold value, and store the information obtained by the replacement in the quality information storage unit 1030.

FIG. 3 is an explanatory diagram showing an example of the data stored in the quality information storage unit 1030. As shown in FIG. 3, the quality information gathering unit 1010 stores data representing the communication quality of each flow ("Good" or "Bad" in the example of FIG. 3) in the quality information storage unit 1030. In the table of FIG. 3, the quality of the flow F5 is fine and that of the flow F21 is deteriorated, for example.

The topology information gathering unit 1090 receives topology information gathered by a network management system (e.g., the OpenFlow controller) from the network management system and stores the received topology information in the topology information storage unit 1100. Alternatively, the quality analysis server 100*a* may also be configured to directly gather the topology information instead of using another system (e.g., the OpenFlow controller) for gathering the topology information. The topology information includes node connection information. For example, the topology information includes information on physical connection between nodes, such as "node B is connected to node. C via port 1" and "node B is connected to node A via port 2". The topology information further includes information on each link connecting nodes. This information is assigned link numbers. In order to discriminate between directed links, two link numbers are assigned to one physical link. The topology information on the network of FIG. 1 includes the connection information on the nodes A-O and the information on the directed links 1-44 between nodes.

Figure 4:
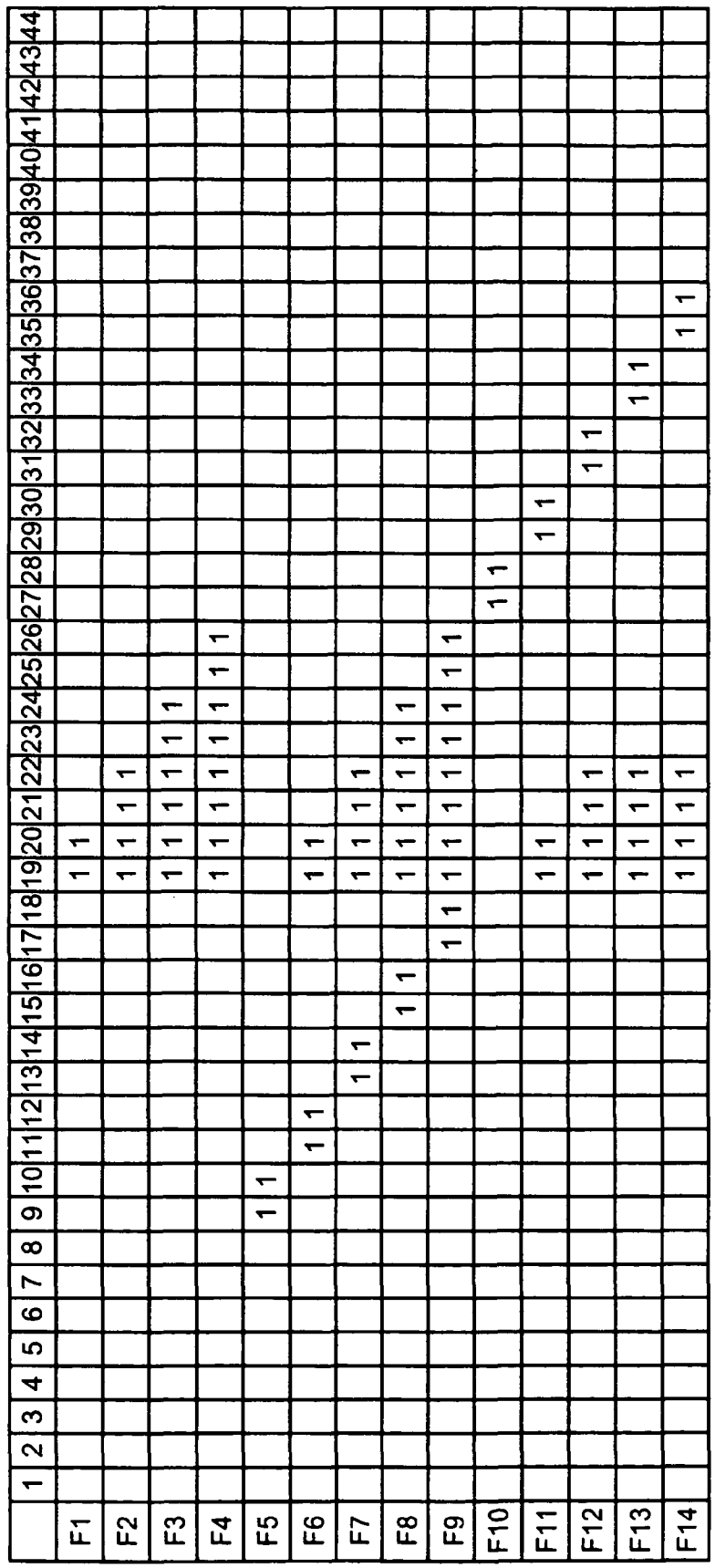
FIG. 4 It depicts an explanatory diagram showing an example of a path table.

The path calculation unit 1110 generates the path table (indicating which directed links each analysis flow passes through) and stores the path table in the path table storage unit 1040. FIG. 4 is an explanatory diagram showing an example of the path table. In the path table, each row represents a flow (analysis flow) and each column represents a directed link. When a flow (corresponding to a row) passes through prescribed directed links (corresponding to columns), a flag (expressed as "1", for example) is described in cells where the row intersects with the columns. The path table of FIG. 4 indicates that the flow F1 passes through the links 19 and 20, the flow F2 passes through the links 19, 20, 21 and 22, etc. Differently from the topology information, the path table is not required to record the information on the connection between links (which links are adjoining each other). While information on the order of links through which a flow passes is necessary for expressing the path of each flow, the path table is not required to record the order of passage of each flow through links (the order of links each flow passes through). To take the flow F1 as an example, the path table does not need to record whether the flow F1 passes through the links 19 and 20 in the order link 19→link 20 or in the order link 20→link 19.

Incidentally, each row of the path table may also be considered to indicate a target section of the communication quality measurement. In the first exemplary embodiment, each row of the path table corresponds to a flow since the probe 200 measures the communication quality in units of flows.

The path calculation unit 1110 refers to the topology information, calculates paths suitable for the quality-deteriorated part analysis, and thereby generates the path table. The path calculation unit 1110 calculates the paths so that all of the "monitoring target directed link groups that should be monitored" can be monitored. In the following, examples of the algorithm for calculating the paths suitable for the quality-deteriorated part analysis will be explained. Four typical algorithms will be explained below.

<Algorithm 1>

Algorithm 1 determines the paths for monitoring the entire network by setting the "monitoring target directed link groups that should be monitored" in units of physical links. When the algorithm 1 is employed, the path calculation unit 1110 successively executes the following steps 1-1, 1-2 and 2:

<Step 1-1 of Algorithm 1>

Figure 5:
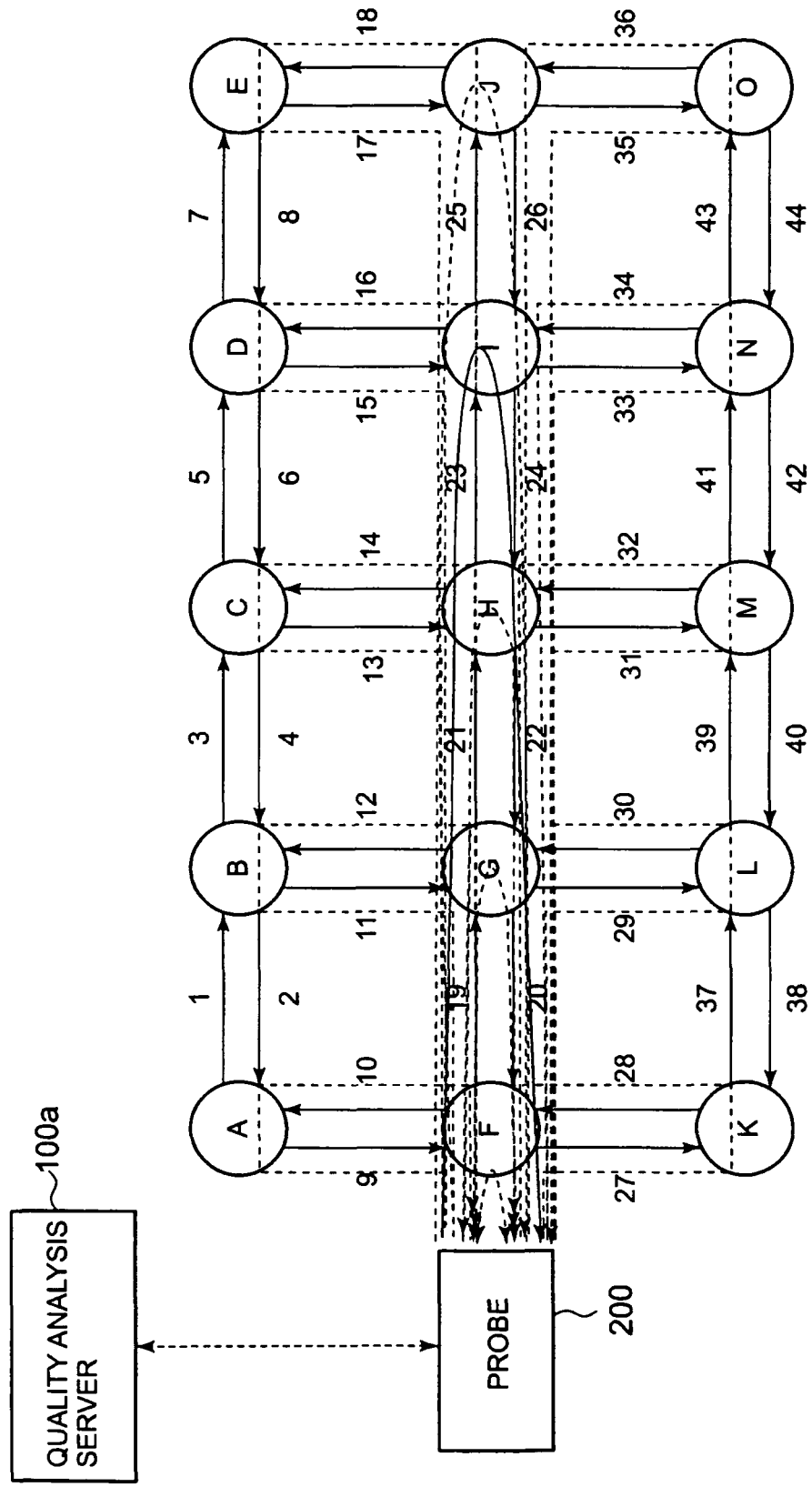
FIG. 5 It depicts is an explanatory diagram showing an example of paths calculated in step 1-1 of algorithm 1.

The path calculation unit 1110 first calculates the shortest path from each node to the probe 200 in regard to all the nodes. Subsequently, considering each node as a target node, the path calculation unit 1110 calculates a path starting from the probe 200 and returning to the probe 200 via the target node. Each of the calculated paths is used as the path of each analysis flow. FIG. 5 shows an example of the result of the path calculation for the network of FIG. 1 including the nodes A-O. In FIG. 5, each path calculated for each node is indicated with broken lines. For example, a path returning to the probe 200 via the node J includes the links 19, 21, 23, 25, 26, 24, 22 and 20. These paths are expressed in the path table as shown in FIG. 4, for example. After calculating each path, the path calculation unit 1110 adds an analysis flow passing through the path to the path table.

In a possible communication method using such paths, the probe 200 transmits a signal (e.g., ping) to a node and the node sends back a response to the signal to the probe 200. It is also possible to send out a packet, whose source address and destination address have been set at the address of the probe 200, to the network and make a specified node forward the packet. When the communication quality is measured by the former communication method, the processing load on the CPU of the node is involved in the measurement result. Thus, from the viewpoint of measuring the actual performance of the data plane, the communication of the analysis flows is desired to be executed by the latter method.

<Step 1-2 of Algorithm 1>

Figure 6:
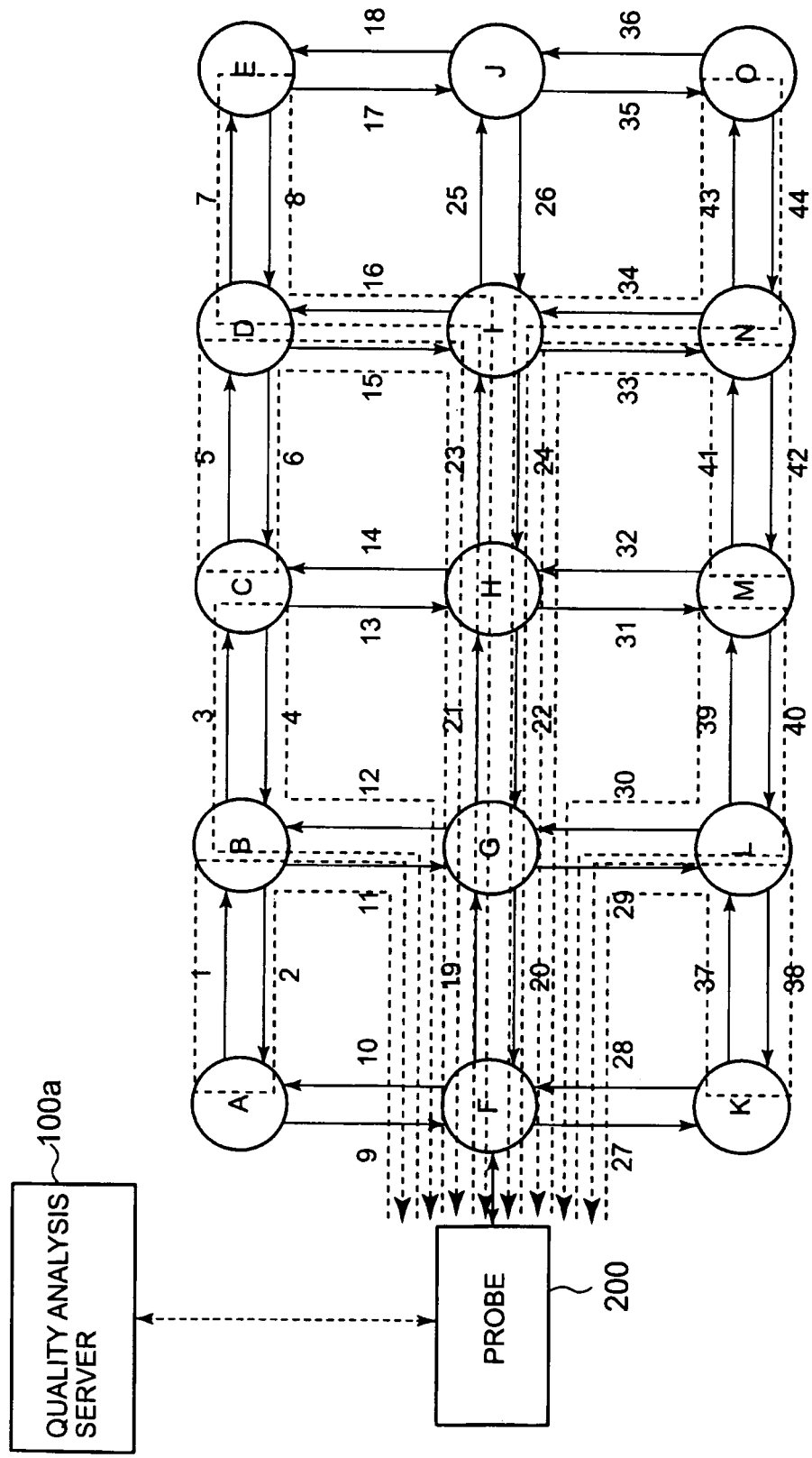
FIG. 6 It depicts an explanatory diagram showing an example of paths calculated in step 1-2 of the algorithm 1.
Figure 7:
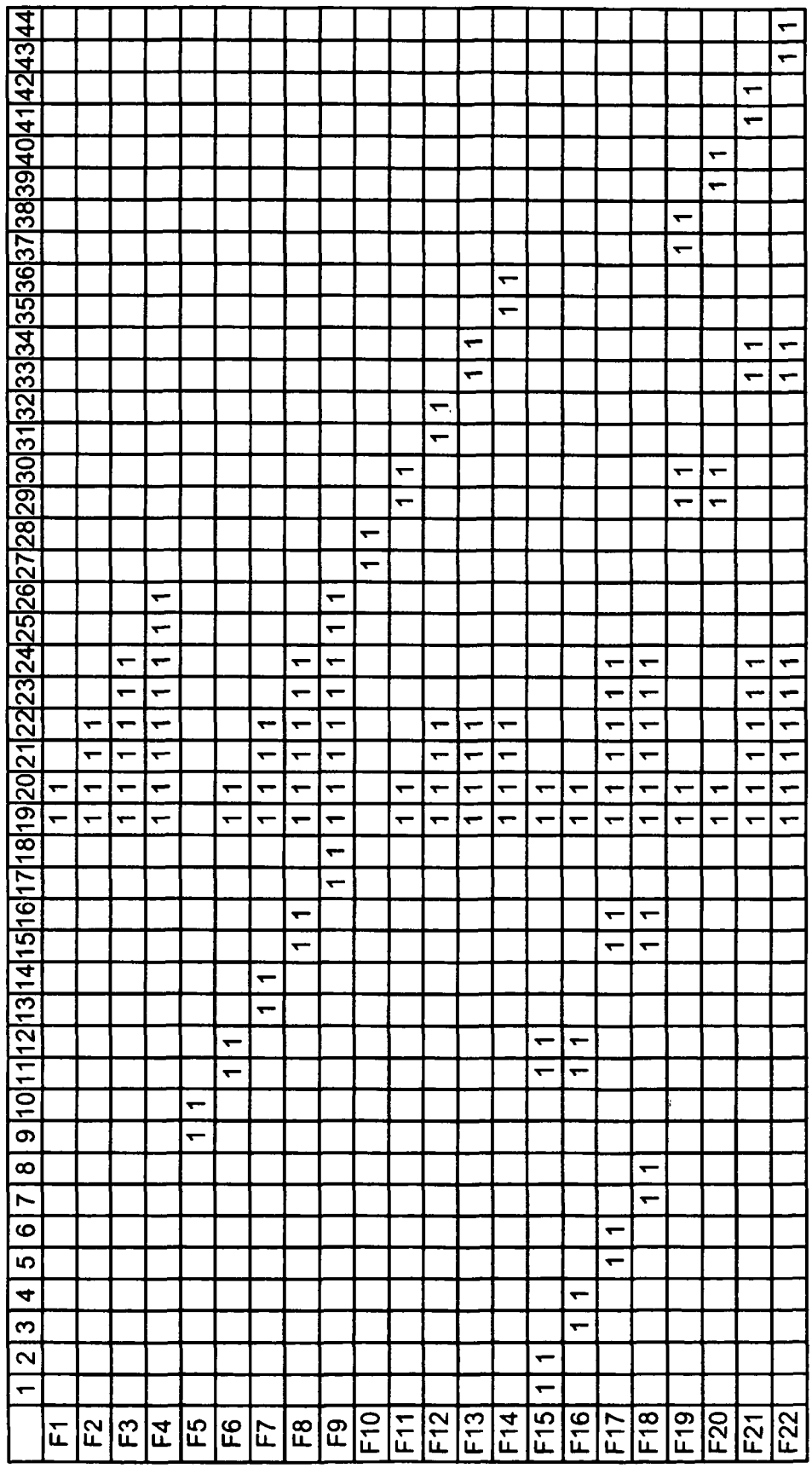
FIG. 7 It depicts an explanatory diagram showing the path table corresponding to the paths calculated until the step 1-2.

Each directed link that is on none of the shortest paths between the probe 200 and the nodes is not included in the paths calculated in the step 1-1. Therefore, the paths calculated in the step 1-1 leave behind some directed links through which no analysis flow passes. For example, the analysis flows corresponding to the paths indicated with broken lines in FIG. 5 include no analysis flow passing through the directed link 1 or 2. In the step 1-2, the path calculation unit 1110 generates a list of directed links (selected from all the directed links) that are on none of the paths calculated in the step 1-1, and calculates paths of analysis flows passing through the listed links. Specifically, after generating the list of directed links that are on none of the paths calculated in the step 1-1, the path calculation unit 1110 arbitrarily extracts a directed link and another directed link that is physically paired with the former directed link (i.e., directed links that are on the same physical link but in opposite directions) from the list. Each end (start point, end point) of the extracted link (link pair) should have a node connected thereto. The path calculation unit 1110 selects one of the nodes and calculates the shortest path from the selected node to the probe. The selected node and the other node of the extracted link (link pair) will hereinafter be referred to as a "start point node" and an "end point node", respectively. In the pair of directed links extracted from the list, the link extending from the start point node to the end point node will be referred to as a "first directed link" and the other link will be referred to as a "second directed link". The path calculation unit 1110 generates a path including the calculated shortest path and connecting the probe 200, the start point node, the first directed link, the end point node, the second directed link, the start point node and the probe 200 in this order. Thereafter, the path calculation unit 1110 deletes the extracted pair of links from the list (list of directed links that are on none of the paths calculated in the step 1-1) and repeats the above process until the list becomes empty. FIG. 6 shows the result of the path calculation in the step 1-2. In FIG. 6, the paths calculated in the step 1-2 are indicated with dotted lines. The paths calculated until the step 1-2 are expressed in the path table as shown in FIG. 7, for example.

The coverage ratio has reached 100% and the number of sectioning divisions has increased to 22 at the point when the step 1-2 is finished. By using the analysis flows corresponding to the calculated paths, quality control in the case where the "monitoring target directed link groups" are set in units of physical links becomes possible. However, when the description of the path table is viewed in the row direction, there exist some rows (flows) expressed subordinately. A "row (flow) expressed subordinately" means a row that can be expressed based on the description (flags) of other rows. Deletion of such rows (flows) causes no change to the sectioning divisions. Therefore, a process for reducing redundant analysis flows while maintaining the precision of analysis is added as the step 2 after the step 1-2.

<Step 2 of Algorithm 1>

The path calculation unit 1110 refers to the path table, extracts the description (expression) regarding each flow, and examines whether the expression of each flow is possible as the sum of expressions of some other flows or as the difference between the expression of another flow and the expression of still another flow. If possible, the path calculation unit 1110 judges that the flow under consideration is expressed subordinately (subordinate expression) and deletes the description of the flow from the path table. If impossible, the path calculation unit 1110 judges that the flow under consideration is expressed independently (independent expression) and leaves the description of the flow untouched in the path table. The path calculation unit 1110 executes this process for each of the flows in the path table.

For example, assuming that a flow A passing through links 1 and 2, a flow B passing through links 3 and 4, and a flow C passing through the links 1-4 are described in the path table, the flow A is a subordinate expression since it can be expressed as the difference between the flow C and the flow B. Similarly, the flow B is also a subordinate expression. The flow C, which is expressible as the sum of the expressions of the flows A and B, is also a subordinate expression. Thus, in this state in which the flows A-C are described in the path table, all the three flows are subordinate expressions. The path calculation unit 1110 focuses on any one of the flows A-C and deletes the flow under consideration from the path table. Consequently, the remaining two flows become independent expressions.

Figure 8:
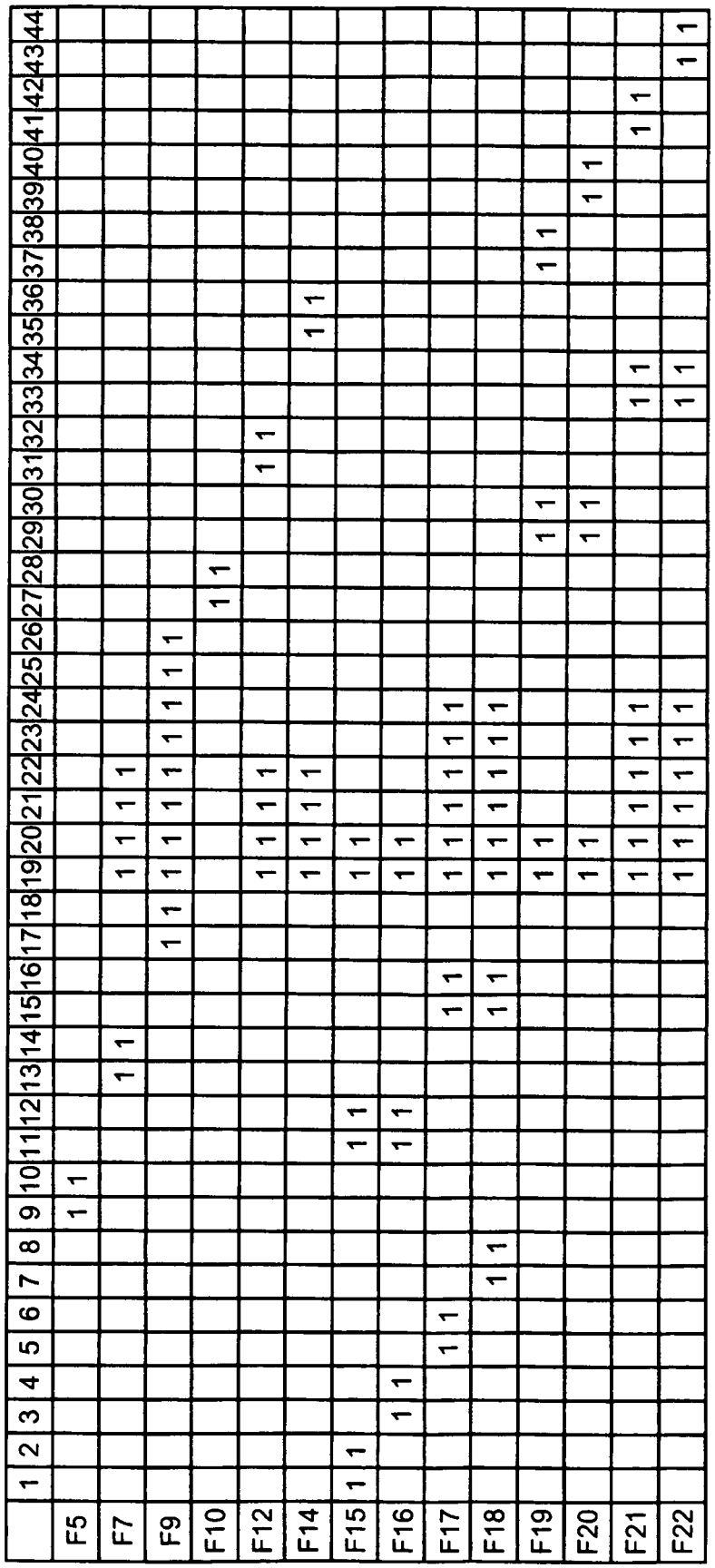
FIG. 8 It depicts an explanatory diagram showing an example of the path table after step 2 of the algorithm 1.

FIG. 8 shows a path table which is obtained by executing the step 2 to the path table shown in FIG. 7.

The algorithm 1 is finished by the step 2. The algorithm 1 can be executed to any topology.

<Algorithm 2>

Algorithm 2 is a method to be used, after the "management target directed link groups" have been set by the network administrator, for determining the paths of the flows to be transmitted for monitoring the link groups. The method of setting the "management target directed link groups" employed by the network administrator is not particularly limited.

This example will be explained assuming that two "management target directed link groups", a first management target directed link group including directed links 1-26 (see FIG. 1) and a second management target directed link group including directed links 19-44 (see FIG. 1), have been set, for example. The management target directed link groups may be set arbitrarily without being restricted to this example.

The path calculation unit 1110 focuses on each monitoring target directed link group, determines a path passing through the monitoring target directed link group under consideration, determines another path, as a part of the former path, not passing through the monitoring target directed link group, and adds analysis flows passing through the paths to the path table. By generating the path table in this way, the analysis flows corresponding to the paths can be expressed as independent expressions in the path table.

In this example, the two "management target directed link groups" are both connected to the probe 200. Specifically, the directed link 19, belonging to both "management target directed link groups", is connected to the probe 200. In this case, the path calculation unit 1110 may set a path that turns back at the node connected to the probe and returns to the probe as the path (as a part of a path passing through a monitoring target directed link group) not passing through the monitoring target directed link group. This path is not described in the path table.

Figure 9:
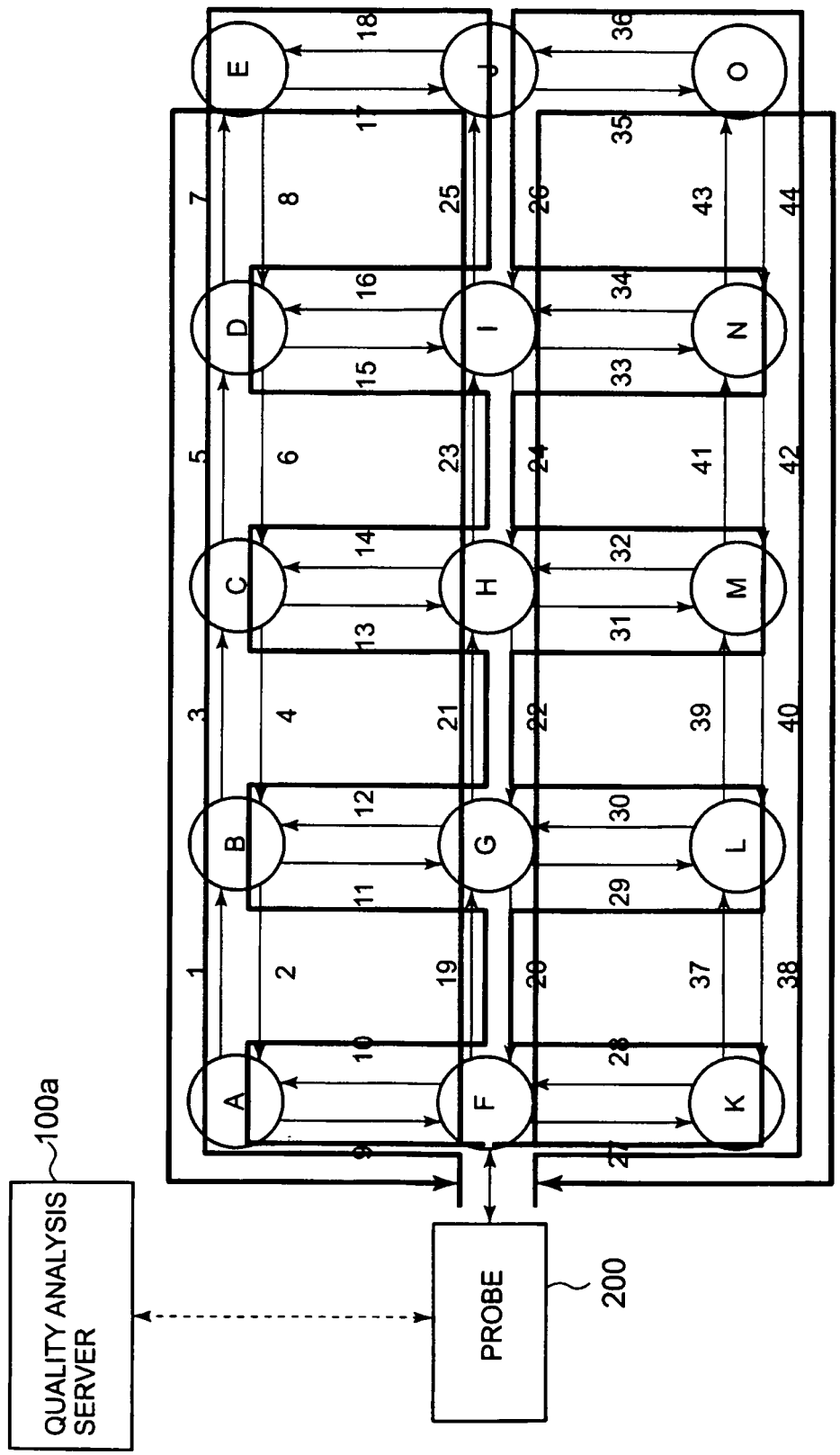
FIG. 9 It depicts an explanatory diagram showing an example of paths calculated by algorithm 2.

FIG. 9 shows an example of the paths calculated as the paths passing through the management target directed link groups. FIG. 10 shows the path table corresponding to the paths.

Incidentally, if there is an overlap (one or more common directed links) between a monitoring target directed link group and another monitoring target directed link group, the number of sectioning divisions increases due to an increase in the number of expression types in the column direction in the path table. In this example, the number of expression types in the column direction is three although the number of "monitoring target directed link groups" is two, since the two "monitoring target directed link groups" overlap with each other at the directed links 19-26. Concretely, as shown in FIG. 10, there are three types of expressions "F1=1 and F2=0", "F1=1 and F2=1" and "F1=0 and F2=1", that is, the number of sectioning divisions is three.

<Algorithm 3>

Algorithm 3 calculates the paths of the analysis flows for already-set monitoring target directed link-groups by a method generalizing the algorithm 1. The monitoring target directed link groups may be set by the network administrator, for example. The method of setting the monitoring target directed link groups is not particularly limited.

When a monitoring target directed link group has been set, the path calculation unit 1110 calculates the paths of two or more analysis flows as paths for analyzing the quality deterioration of the monitoring target directed link group. Calculation of the paths of two analysis flows will be explained here as an example. The path calculation unit 1110 calculates two paths under a first condition that the path of one analysis flow passes through the monitoring target directed link group and the path of the other analysis flow does not pass through the monitoring target directed link group and a second condition that a part of the former path (passing through the monitoring target directed link group) other than the monitoring target directed link group is also included in the latter path as a common part. Specifically, assuming that the monitoring target directed link group corresponds to a path A and the probe is connected to the path A by a path B, the path calculation unit 1110 sets a path including the paths A and B as the path passing through the monitoring target directed link group while setting a path including the path B but not including the path A as the path not passing through the monitoring target directed link group. After calculating the paths, the path calculation unit 1110 adds the analysis flows passing through the calculated paths to the path table. By calculating such paths satisfying the above conditions, the sectioning divisions in the monitoring target directed link group are differentiated from the sectioning divisions of links other than the monitoring target directed link group when the path table is viewed in the column direction, by which the judgment on the presence/absence of quality deterioration in the monitoring target directed link group is made possible.

In the algorithm 3, the path calculation unit 1110 calculates a plurality of paths (two paths in the above example) for each of the already-set "monitoring target directed link groups". Therefore, the number of the calculated paths equals a multiple of the number of "monitoring target directed link groups". As a result, the quality-deteriorated part analysis can be conducted with required precision. After calculating the paths for each "monitoring target directed link group"; the path calculation unit 1110 may also delete unnecessary flows from the path table by executing a process like the step 2 of the algorithm 1.

The process of calculating two paths for the "monitoring target directed link group" under consideration in the algorithm 3 will be explained more specifically below. The path calculation unit 1110 specifies a start point node and an end point node in the "monitoring target directed link group". For example, the path calculation unit 1110 specifies one of the nodes at both ends of a series of physical links corresponding to the "monitoring target directed link group" as the start point node and the other as the end point node. For example, assuming that the "monitoring target directed link group" is made up of the directed links 1-8 shown in FIG. 1, the nodes A and E exists at the ends of the series of physical links (a physical link corresponding to the directed links 1 and 2, a physical link corresponding to the directed links 3 and 4, a physical link corresponding to the directed links 5 and 6 and a physical link corresponding to the directed links 7 and 8). Therefore, the path calculation unit 1110 may specify either one of the nodes (node A or node E) as the start point node and the other as the end point node.

After specifying the start point node and the end point node, the path calculation unit 1110 calculates a path between the start point node and the probe. Subsequently, the path calculation unit 1110 determines a path that connects the probe, the start point node, directed links from the start point node to the end point node, the end point node, directed links from the end point node to the start point node, the start point node and the probe in this order. Incidentally, the "directed links from the start point node to the end point node" and the "directed links from the end point node to the start point node" are all included in the "monitoring target directed link group". The above path is the path passing through the "monitoring target directed link group".

The path calculation unit 1110 also determines a path that connects the probe, the start point node and the probe in this order as the path not passing through the "monitoring target directed link group". This path is the path not passing through the "monitoring target directed link group".

In the path passing through the "monitoring target directed link group" and the path not passing through the "monitoring target directed link group", the section from the probe to the start point node and the section from the start point node to the probe are common to both paths. When each individual path is considered, the physical link(s) from the probe to the start point node and the physical link(s) from the start point node to the probe may differ from each other. The path from the probe to the start point node and the path from the start point node to the probe may be determined arbitrarily as long as the condition that "the paths are common to the path passing through the monitoring target directed link group and the path not passing through the monitoring target directed link group" is satisfied. The paths between the probe and the start point node may be determined by searching for the shortest paths or by a random search, for example.

<Algorithm 4>

Algorithm 4 calculates the paths of the analysis flows for already-set monitoring target directed link groups, similarly to the algorithm 3. The monitoring target directed link groups may be set by the network administrator, for example. The method of setting the monitoring target directed link groups is not particularly limited.

When a monitoring target directed link group has been set, the path calculation unit 1110 calculates the paths of two or more analysis flows as paths for analyzing the quality deterioration of the monitoring target directed link group. The path calculation unit 1110 calculates a plurality of paths that satisfy a condition that "the paths of all analysis flows pass through the monitoring target directed link group and each path's sections other than the monitoring target directed link group vary from analysis flow to analysis flow". By calculating such paths satisfying the condition, the sectioning divisions in the monitoring target directed link group are differentiated from the sectioning divisions of links other than the monitoring target directed link group when the path table is viewed in the column direction, by which the judgment on the presence/absence of quality deterioration in the monitoring target directed link group is made possible. After calculating the paths, the path calculation unit 1110 adds the analysis flows passing through the calculated paths to the path table.

In the algorithm 4, the path calculation unit 1110 calculates a plurality of paths for each of the already-set "monitoring target directed link groups". Therefore, the number of the calculated paths equals a multiple of the number of "monitoring target directed link groups". As a result, the quality-deteriorated part analysis can be conducted with required precision. After calculating the paths for each "monitoring target directed link group", the path calculation unit 1110 may also delete unnecessary flows from the path table by executing a process like the step 2 of the algorithm 1.

The process of calculating a plurality of paths for the "monitoring target directed link group" under consideration in the algorithm 4 will be explained more specifically below. In this explanation, calculation of two paths for the "monitoring target directed link group" under consideration will be described as an example. The path calculation unit 1110 specifies the start point node and the end point node in the "monitoring target directed link group". Subsequently, the path calculation unit 1110 calculates a path between the start point node and the probe. This path will hereinafter be referred to as "path 1". Similarly, the path calculation unit 1110 calculates a path between the end point node and the probe. This path will hereinafter be referred to as "path 2". Then, the path calculation unit 1110 deletes directed links on the path 1 and directed links on the path 2 from the list of all directed links. The path calculation unit 1110 calculates a path between the start point node and the probe (hereinafter referred to as a "path 3") and a path between the end point node and the probe (hereinafter referred to as a "path 4") again from the directed links existing in the list after the deletion. There are cases where the path 3 or 4 cannot be found from the list of all directed links due to the deletion of the directed links on the paths 1 and 2. In such cases, the path calculation by the algorithm 4 is impossible. After calculating the paths 1-4, the path calculation unit 1110 determines a path connecting the probe, the path 1, the start point node, the monitoring target directed link group, the end point node, the path 2 and the probe in this order as the path of the first analysis flow. The path calculation unit 1110 also determines a path connecting the probe, the path 3, the start point node, the monitoring target directed link group, the end point node, the path 4 and the probe in this order as the path of the second analysis flow.

Incidentally, the paths 1-4 may be determined arbitrarily as long as the paths 1-4 pass through different links. The paths 1-4 may be calculated by searching for the shortest paths or by randomly searching for paths between the node and the probe, for example. In the case where the paths 3 and 4 are determined by searching for the shortest paths, the search for the shortest paths is made using the list of links after the deletion of the links on the paths 1 and 2.

The path calculation by the algorithm 3 and the path calculation by the algorithm 4 may be used appropriately and selectively for each "monitoring target directed link group". For example, it is possible to start the path calculation for each "monitoring target directed link group" by using the algorithm 4 and carry on the path calculation by using the algorithm 3 after the algorithm 4 has become inapplicable.

The path calculations by the four types of algorithms 1-4 have been explained above. In the following, these algorithms will be explained in a more generalized manner. The path calculation unit 1110 is desired to determine the paths of the analysis flows so as to satisfy a condition that the descriptions in the column direction in a "monitoring target directed link group" under consideration differ from the descriptions in the column direction in the other directed links when each "monitoring target directed link group" in the path table is considered. In other words, the path calculation unit 1110 is desired to determine the paths of the analysis flows so as to satisfy a condition that the sectioning divisions in each monitoring target directed link group under consideration differ from the sectioning divisions in the directed links other than the "monitoring target directed link group". For example, referring to the path table (FIG. 10) used for the explanation of the algorithm 2, when the directed links 1-26 corresponding to the first "monitoring target directed link group" are considered, the sectioning division is "F1=1 and F2=0" or "F1=1 and F2=1". Meanwhile, the sectioning division in the directed links 27-44 other than the "monitoring target directed link group" is "F1=0 and F2=1", which differs from the sectioning divisions of the "monitoring target directed link group". Therefore, the above condition is satisfied. The same goes for the case where the directed links 19-44 corresponding to the second "monitoring target directed link group" are considered. The path calculation unit 1110 may also determine the paths by a method other than the algorithms 1-4 as long as the above condition is satisfied. The independent descriptions may also be implemented by using three or four analysis flows instead of using two analysis flows.

The above condition can be translated as a condition that the type of combination of measurement target sections passing through a directed link differs between each directed link belonging to the monitoring target directed link group and directed links other than the monitoring target directed link group. For example, if we consider the directed links 1-26 corresponding to the first "monitoring target directed link group" in the path table (FIG. 10) used for the explanation of the algorithm 2, the combination of communication quality measurement target sections passing through a directed link is "F1" for the directed links 1-18, and the combination is "F1, F2" for the directed links 19-26. Meanwhile, for the directed links 27-44 other than the monitoring target directed link group under consideration, the combination of communication quality measurement target sections passing through the directed link is "F2". Since the combination "F1" and the combination "F1, F2" both differ from the combination "F2", the above condition is satisfied. The same goes for the case where the second "monitoring target directed link group" is considered.

The path implementation unit 1120 sets the paths calculated by the path calculation unit 1110 to the network. In this exemplary embodiment, the path implementation unit 1120 requests the OpenFlow controller (unshown) for controlling the nodes to execute a process of setting each path corresponding to each analysis flow to the nodes as actions. For example, when the path table shown in FIG. 4 is implemented in the network, the path calculation unit 1110 determines the UDP port number of each analysis flow and the path implementation unit 1120 requests the OpenFlow controller to make the following settings to the nodes. The path calculation unit 1110 determines the UDP port number of each analysis flow by, for example, setting the UDP port number of the flow F1 shown in FIG. 4 at 1, the UDP port number of the flow F2 at 2, etc. It is assumed here that the UDP port numbers of the flows F1-F14 have been set at 1-14, respectively. Subsequently, the path implementation unit 1120 determines the settings regarding each node (the node F, for example) as follows: When the input port is a port connected with the probe, a packet whose UDP port number is 1, 2, 3, 4, 6, 7, 8, 9, 11, 12, 13 or 14 should be forwarded to the node G, a packet whose UDP port number is 5 should be forwarded to the node A, and a packet whose UDP port number is 10 should be forwarded to the node K. When the input port is a port connected with the node G (when a packet is received from the link 20), a packet whose UDP port number is 1, 2, 3, 4, 6, 7, 8, 9, 11, 12, 13 or 14 should be forwarded to the probe 200. When the input port is a port connected with the node A (when a packet is received from the link 9), a packet whose UDP port number is 5 should be forwarded to the probe 200. When the input port is a port connected with the node K (when a packet is received from the link 28), a packet whose UDP port number is 10 should be forwarded to the probe 200. The path implementation unit 1120 requests the OpenFlow controller to make the above settings to the node F. While the settings of the node F have been described as an example, the path implementation unit 1120 determines the settings for every node through which an analysis flow passes, and requests the OpenFlow controller to make the settings to the nodes.

While the forwarding destination (a node or probe to which a packet should be forwarded) is determined based on the port number in the above example, the forwarding destination may also be determined based on an in-packet field that is usable for discriminating between flows (identifying each flow). For example, the forwarding destination may be determined based on a virtually assigned IP address. It is also possible to designate a VLAN for each flow and determine the forwarding destination based on the VLAN ID.

The flow link table management unit 1050 periodically refers to the communication quality stored in the quality information storage unit 1030 and the path table stored in the path table storage unit 1040 and thereby generates the flow link table. The flow link table is a table made by adding the communication quality of each flow to the path table. The path table is a table in which each row represents a flow, each column represents a directed link, and the flag is described in cells where a row (corresponding to a flow) intersects with columns (corresponding to directed links) when the flow passes through the directed links. Therefore, the communication quality corresponding to each flow may be added to the path table's row representing the flow. When the path table shown in FIG. 8 and each flow's communication quality shown in FIG. 3 have been stored, for example, the flow link table management unit 1050 may generate the flow link table shown in FIG. 11 by combining the stored data together. The flow link table indicates which analysis flow passed through which directed links and how the resultant communication quality was. The flow link table management unit 1050 stores the generated flow link table in the flow link table storage unit 1060.

The quality analysis unit 1070 executes the quality-deteriorated part analysis by referring to the flow link table and then stores the result of the analysis in the analysis result storage unit 1080. The quality analysis unit 1070 may employ general quality analysis technology such as network tomography. Such general technology (e.g., network tomography) is well known to those skilled in the art, and thus detailed explanation thereof is omitted. The quality analysis unit 1070 judges that no quality deterioration has occurred in directed links through which an analysis flow with fine communication quality passes, while regarding directed links through which an analysis flow with deteriorated communication quality passes as the candidates for the quality-deteriorated part. Then, the quality analysis unit 1070 locates the quality-deteriorated link by searching the flow link table for a directed link through which one or more analysis flows with deteriorated communication quality pass but no analysis flow with fine communication quality passes. In the example of FIG. 11, the flows F21 and F22 are the flows with deteriorated communication quality. The flow F21 passes through the directed links 19, 20, 21, 22, 23, 24, 33, 34, 41 and 42, while the flow F22 passes through the directed links 19, 20, 21, 22, 23, 24, 33, 34, 43 and 44. Among these directed links, the directed links 19, 20, 21, 22, 23 and 24 are those through which another flow with fine quality passes. Therefore, six directed links 33, 34, 41, 42, 43 and 44 remain as the candidates for the quality-deteriorated part. Among the quality-deteriorated part candidates, a combination of directed links common to a plurality of analysis flows can be considered as a combination of quality-deteriorated part candidates consistent with communication quality deterioration in a plurality of analysis flows. A combination of directed links unique to an individual analysis flow may also be considered as a combination of quality-deteriorated part candidates. Further, a combination of all directed links considered as quality-deteriorated part candidates may also be taken into consideration. In the example of FIG. 11, for instance, a combination of the directed links 33 and 34, a combination of the directed links 41, 42, 43 and 44, or a combination of the directed links 19, 20, 21, 22, 23 and 24 can be considered as the combination of quality-deteriorated part candidates consistent with communication quality deterioration in the flows F21 and F22. From these combinations, the quality analysis unit 1070 may determine a combination including the smallest number of directed links (directed links 33 and 34 in the above example) as the quality-deteriorated part, similarly to the technique described in the Patent Document 1. In cases where there is only one analysis flow having deteriorated communication quality, the quality analysis unit 1070 may determine a directed link through which only the analysis flow passes as the quality-deteriorated part.

The above method of determining the quality-deteriorated part is just an example. The method of determining the quality-deteriorated part after generating the flow link table is not restricted to the above example.

The quality analysis unit 1070 also makes a judgment on whether the monitoring target directed link groups should be changed or not. For example, at the beginning, only the presence/absence of quality deterioration is detected by using a small number of analysis flows (to reduce the load on the network) and setting the precision (coverage ratio, sectioning divisions, etc.) at a low level. The paths for this detection may be determined by using the algorithm 2, for example. If quality deterioration has occurred, the quality-deteriorated part is determined in units of links by increasing the number of analysis flows and raising the precision (coverage ratio, sectioning divisions, etc.). The paths for this detection may be determined by using the algorithm 1, for example. In cases where the quality-deteriorated part is detected by stages as above, the quality analysis unit 1070 may determine to change the monitoring target directed link groups when detection as the final stage is remaining. When the need of changing the precision of detection arises, the quality analysis unit 1070 instructs the path calculation unit 1040 to execute the path calculation to change the monitoring target directed link groups so that the required precision (coverage ratio, sectioning divisions, etc.) can be achieved. While the algorithm 2 is used first and the algorithm 1 is used next in this example, the detection by stages may also be executed using a different combination of algorithms.

While this exemplary embodiment has been described above by taking an OpenFlow network as an example, the network is not restricted to an OpenFlow network as long as the topology information on the network can be acquired by the topology gathering unit 1090 and the paths determined by the path calculation unit 1110 can be implemented in the network by the path implementation unit 1120. For example, even in a network like a VLAN or an MPLS (Multiprotocol Label Switching) network, the forwarding destination can be explicitly indicated to each node by the value of a label.

While the probe, the quality analysis server and the device for managing the network topology and the paths (e.g., the OpenFlow controller) have been described as separate devices in this exemplary embodiment, part or all of the devices may be implemented by a single device. Specifically, it is possible to implement the probe and the quality analysis server, the quality analysis server and the management device (OpenFlow controller, etc.), or the probe and the management device (OpenFlow controller, etc.) by a single device. It is also possible to implement the probe, the quality analysis server and the management device (OpenFlow controller, etc.) by a single device.

In addition, a node (switch) in the network may be provided with the function of operating as the probe 200.

Next, the operation will be described.

Figure 12:
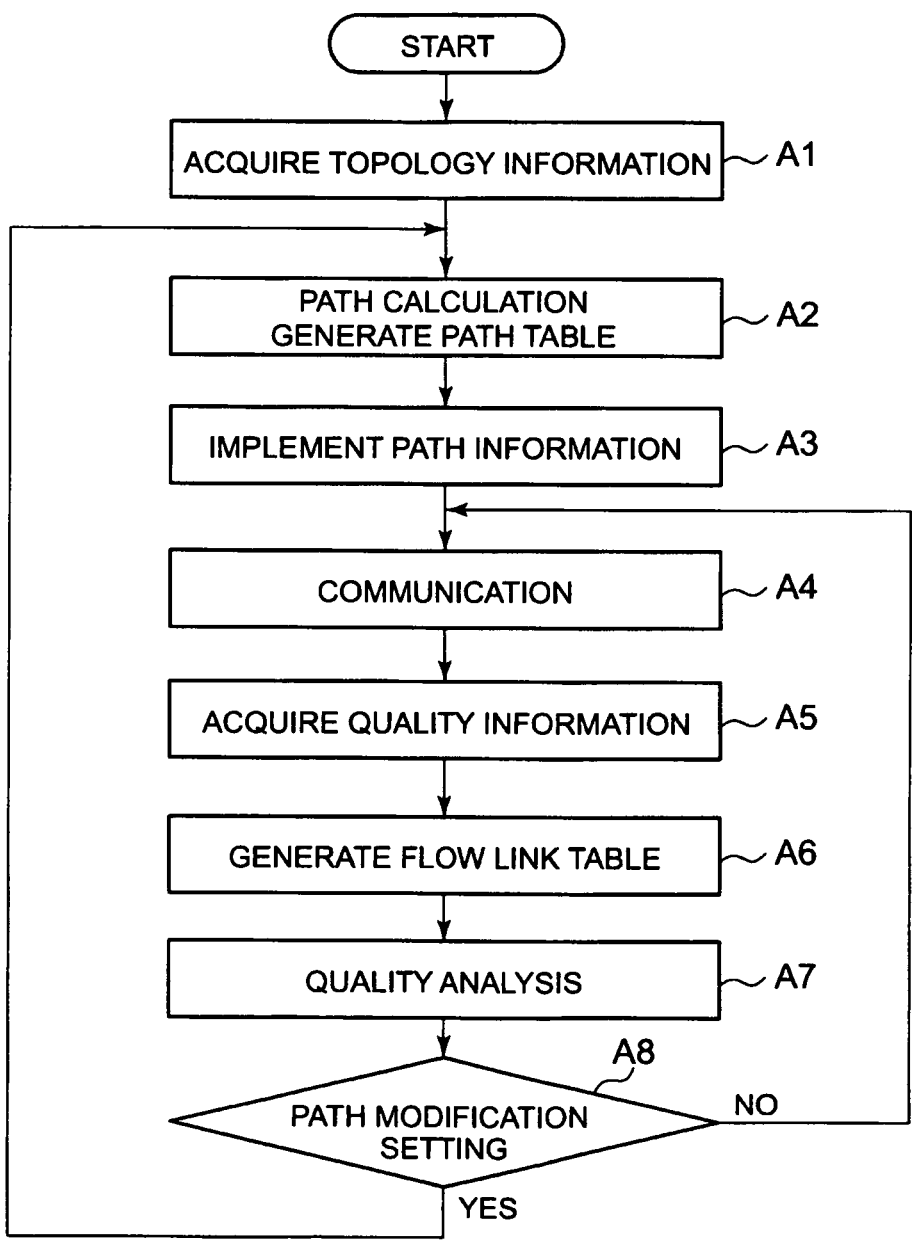
FIG. 12 It depicts a flow chart showing an example of the process flow of the first exemplary embodiment.

FIG. 12 is a flow chart showing an example of the process flow of the first exemplary embodiment.

When the quality analysis server 100*a* is started up, the quality analysis server 100*a* executes step A1. Specifically, the topology gathering unit 1090 gathers the topology information on the network from the network management device (e.g., OpenFlow controller) and stores the gathered topology information in the topology information storage unit 1100 (step A1). After the topology gathering unit 1090 has gathered the topology information including all the information on the nodes and the links of the network as the target of the quality management and stored the gathered topology information in the topology information storage unit 1100, the process advances to step A2.

In the step A2, the path calculation unit 1110 refers to the topology information, calculates the paths of the analysis flows for monitoring all the "monitoring target directed link groups", and thereby generates the path table. The path calculation unit 1110 stores the generated path table in the path table storage unit 1040. The path calculation in the step A2 may be executed employing the aforementioned algorithms 1-4, for example. The process flow of the path calculation process in the step A2 will be explained later referring to FIG. 13.

After the step A2, the path implementation unit 1120 determines the settings for each node for forwarding the flows along the paths (corresponding to the flows, respectively) calculated by the path calculation unit 1110 and then requests the network management device (e.g., OpenFlow controller) to make the settings to each node (step A3). In response to the request from the path implementation unit 1120, the network management device (e.g., OpenFlow controller) makes the settings determined by the path implementation unit 1120 to each node.

Subsequently, the probe 200 starts communication (step A4). Specifically, for each path calculated by the path calculation unit 1110, the probe 200 transmits an analysis flow (supposed to travel through the calculated path) to the network and thereafter receives the flow which passed through nodes in the network. For example, the probe 200 transmits each flow to the network by setting the source address (MAC address, IP address) and the destination address at the same value in each flow and changing the port number flow by flow. The information for discriminating between flows (port number in this example) may be determined by the path calculation unit 1110 for each path, for example. The discrimination between flows (identification of each flow) may also be made using information other than the port number. Further, the probe 200 starts the measurement of the communication quality such as the packet loss rate, packet loss number, delay information, RTT (Round Trip Time), jitter, R-factor and MOS. The probe 200 periodically transmits information on the measured communication quality to the quality analysis server 100*a*.

The quality information gathering unit 1010 receives the communication quality information periodically transmitted from the probe 200 and stores the communication quality information in the quality information storage unit 1030 (step A5). In this exemplary embodiment, the communication quality, measured by the probe 200 in the step A4 and stored in the quality information storage unit 1030 in the step A5, is communication quality in each path from the probe 200 to the probe 200 via the inside of the network. As mentioned above, the quality information gathering unit 1010 may either store the communication quality measurement values received from the probe 200 in the quality information storage unit 1030 without processing the data or compare each of the measurement values with the previously set threshold value, replace the measurement value with the class "Fine" or "Deteriorated", and store the information obtained by the replacement in the quality information storage unit 1030 as the quality information. This example will hereinafter be explained assuming that the quality information gathering unit 1010 replaces each measurement value with the class "Fine" or "Deteriorated" and stores the obtained quality information in the quality information storage unit 1030 in regard to each flow as shown in FIG. 3.

The flow link table management unit 1050 periodically refers to the communication quality stored in the quality information storage unit 1030 and the path table stored in the path table storage unit 1040 and thereby generates the flow link table (step A6). In the path table, information on directed links through which a flow passes is described in regard to each flow. The communication quality is also described in regard to each flow. The flow link table management unit 1050 generates a flow link table like the one shown in FIG. 11 by combining the path table (describing the information in regard to each flow) and the communication quality together.

Upon generation of the flow link table, the quality analysis unit 1070 analyzes the quality-deteriorated part in the network by referring to the flow link table (step A7). For example, the quality analysis unit 1070 determines directed links through which an analysis flow with deteriorated communication quality passes as the candidates for the quality-deteriorated part. The quality analysis unit 1070 may select a combination (of directed links) including the smallest number of directed links from a combination of directed links common to a plurality of analysis flows, a combination of directed links unique to an individual analysis flow and a combination of all directed links considered as quality-deteriorated part candidates and then determine the directed links belonging to the selected combination as the quality-deteriorated part. In cases where there is only one analysis flow having deteriorated communication quality, the quality analysis unit 1070 may determine a directed link through which only the analysis flow passes as the quality-deteriorated part. This method of determining the quality-deteriorated part is just an example. The quality analysis unit 1070 may also conduct the analysis according to a different method.

Subsequently, the quality analysis unit 1070 judges whether the monitoring target directed link groups should be changed or not (step A8). For example, it is possible to repeat the process from the step A2 while changing the path calculation algorithm in the step A2 and gradually increasing the precision (coverage ratio, sectioning divisions, etc.) along with the repetition of the step A2. In such cases, if the path calculation algorithm change in the step A2 has not been made a prescribed number of times, the quality analysis unit 1070 determines to advance to the step A2 again, change the monitoring target directed link groups and determine the paths (step A8: YES). If the path calculation algorithm change in the step A2 has already been made a prescribed number of times, the quality analysis unit 1070 judges that it is unnecessary to change the monitoring target directed link groups and determine the paths (step A8: NO). In this case, the process from the step A4 may be repeated without recalculating the paths of analysis flows.

For example, it is possible to execute the quality-deteriorated part analysis in the first stage by calculating the paths employing the algorithm 2 and then execute the quality-deteriorated part analysis in the second stage by calculating the paths employing the algorithm 1. In such cases, the path calculation unit 1110 executes the path calculation employing the algorithm 2 when the process advances to the step A2 for the first time. When the process advances to the step A8, the quality analysis unit 1070 determines to change the monitoring target directed link groups (step A8: YES) since the path calculation by the algorithm 1 has not been executed yet. Thereafter, the path calculation unit 1110 executes the step A2 again. In the second execution of the step A2, the path calculation unit 1110 executes the path calculation employing the algorithm 1. When the process advances to the step A8 again, the quality analysis unit 1070 determines not to change the monitoring target directed link groups (step A8: NO) since the path calculation by the algorithm 1 has finished. Thereafter, the quality-deteriorated part analyzing system repeats the process from the step A4 using the paths calculated by the algorithm 1. In this case, when the paths are calculated employing the algorithm 2, the presence/absence of the quality-deteriorated part is analyzed by setting the precision (coverage ratio, sectioning divisions, etc.) at a low level. Thereafter, the algorithm 1 is employed and the quality-deteriorated part is located in units of links by increasing the precision (coverage ratio, sectioning divisions, etc.)

While a case where the algorithm 2 and the algorithm 1 are employed in this order as the path calculation algorithms has been explained above as an example, the order of employment of path calculation algorithms in the step A1 is not restricted to this example. It is desirable that the algorithm be changed so as to increase the precision (coverage ratio or sectioning divisions). In other words, it is desirable that the monitoring target directed link groups be changed so as to increase the precision (coverage ratio or sectioning divisions).

Figure 13:
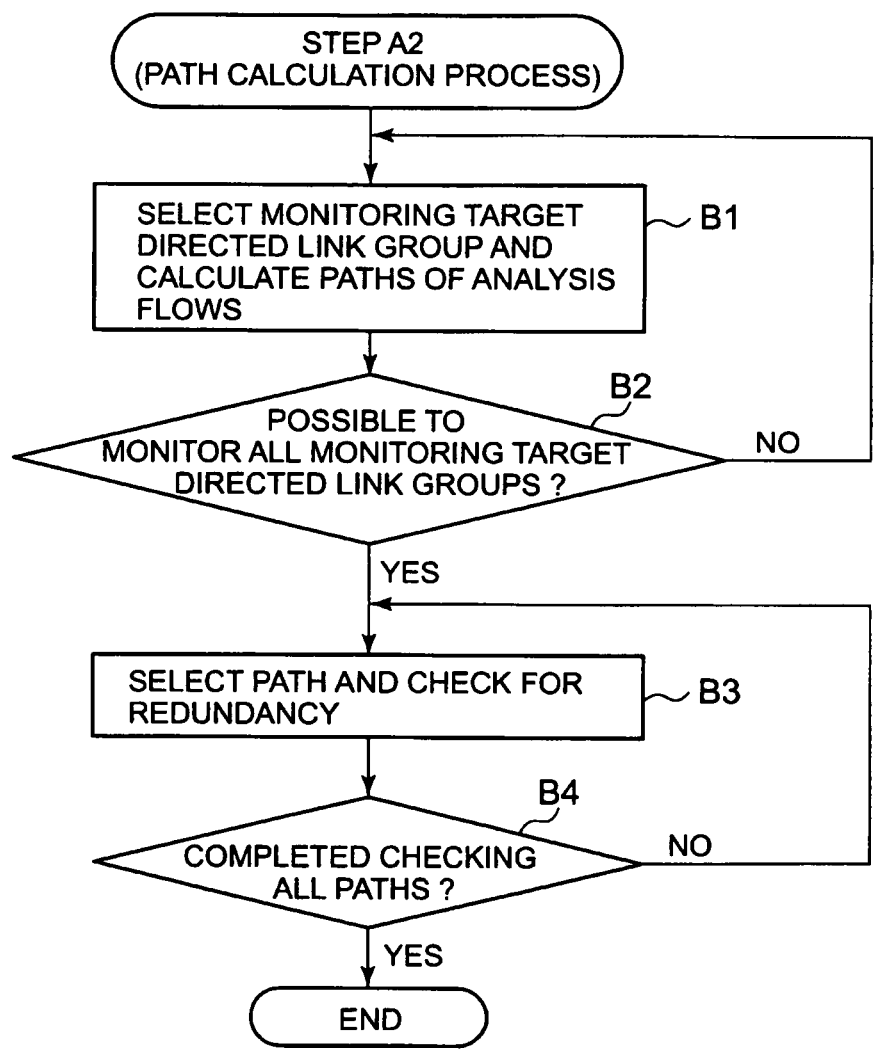
FIG. 13 It depicts a flow chart showing an example of the process flow of step A2 shown in FIG. 12.

Next, the process flow of the above step A2 (path calculation process) will be explained. FIG. 13 is a flow chart showing an example of the process flow of the step A2 (path calculation process). After the step A1 or after the quality analysis unit 1070 determined to change the path calculation algorithm and recalculate the paths (step A8: YES), the path calculation unit 1110 selects one monitoring target directed link group and calculates the paths of analysis flows in regard to the monitoring target directed link group (step B1). After calculating the paths, the path calculation unit 1110 adds the analysis flows passing through the paths to the path table. Thereafter, the path calculation unit 1110 judges whether the path calculation process has finished for all the monitoring target directed link groups or not (step B2). If there exists a monitoring target directed link group for which the path calculation process has not finished (step B2: NO), the process from the step B1 is repeated. Algorithms usable for the steps B1 and B2 include the aforementioned algorithms 1-4, for example. In the algorithm 1, a monitoring target directed link group is determined for each physical link. In the algorithms 2-4, the monitoring target directed link groups are determined by the network administrator, for example. It is also possible to employ path calculation algorithms other than the algorithms 1-4.

If the path calculation process has finished for all the monitoring target directed link groups (step B2: YES), the process advances to step B3. "The path calculation process has finished for all the monitoring target directed link groups" means that the monitoring of all the monitoring target directed link groups has become possible.

In the step B3, the path calculation unit 1110 selects an analysis flow (a row) from the path table, judges whether the selected analysis flow (row) is a subordinate expression or an independent expression, and deletes the row of the selected analysis flow from the path table if the analysis flow is a subordinate expression. If the selected analysis flow is an independent expression, the path calculation unit 1110 leaves the row of the selected analysis flow untouched in the path table (step B3).

Subsequently, the path calculation unit 1110 checks whether every analysis flow (every row) in the path table has already been selected or not (step B4). If selected (step B4: YES), the step A2 (path calculation process) is ended and the process advances to the step A3 (see FIG. 12). If there exists an unprocessed row (step B4: NO), the process from the step B3 is repeated by the path calculation unit 1110.

According to this exemplary embodiment, the quality analysis server 100a calculates the paths suitable for the quality analysis based on the acquired topology information and sets the calculated paths to the network. The quality analysis server 100a calculates the paths suitable for the quality analysis based on the probe 200 and the "monitoring target directed link groups". Therefore, even in cases where the number and installation locations of probes are restricted or have already been set, the paths of analysis flows can be determined while setting the precision (coverage ratio, sectioning divisions, etc.) at a desired level. Consequently, the quality-deteriorated part analysis of a network can be conducted while increasing the degree of freedom of the precision (coverage ratio, sectioning divisions, etc.) independently of the number and installation locations of probes.

In order to calculate the paths suitable for the quality analysis, it is desired that the paths be calculated so as to satisfy a condition that the sectioning divisions in a monitoring target directed link group under consideration differ from the sectioning divisions in the directed links other than the "monitoring target directed link group" under consideration when each "monitoring target directed link group" in the path table is considered. By measuring the communication quality in each path calculated as above, whether the quality deterioration has occurred in a "monitoring target directed link group" or in a link other than the "monitoring target directed link group" can be judged.

In one of path calculation methods satisfying the above condition, two paths both including a "monitoring target directed link group" as a common path (common part) and differing from each other in the other parts are calculated for each "monitoring target directed link group" (e.g., the algorithm 4). In another path calculation method satisfying the above condition, two paths, a first path passing through a "monitoring target directed link group" and a second path not passing through the "monitoring target directed link group" and including the first path except for the "monitoring target directed link group", are calculated for each "monitoring target directed link group" (e.g., the algorithm 3). The algorithms 1 and 2 also satisfy the above condition.

Figure 26:
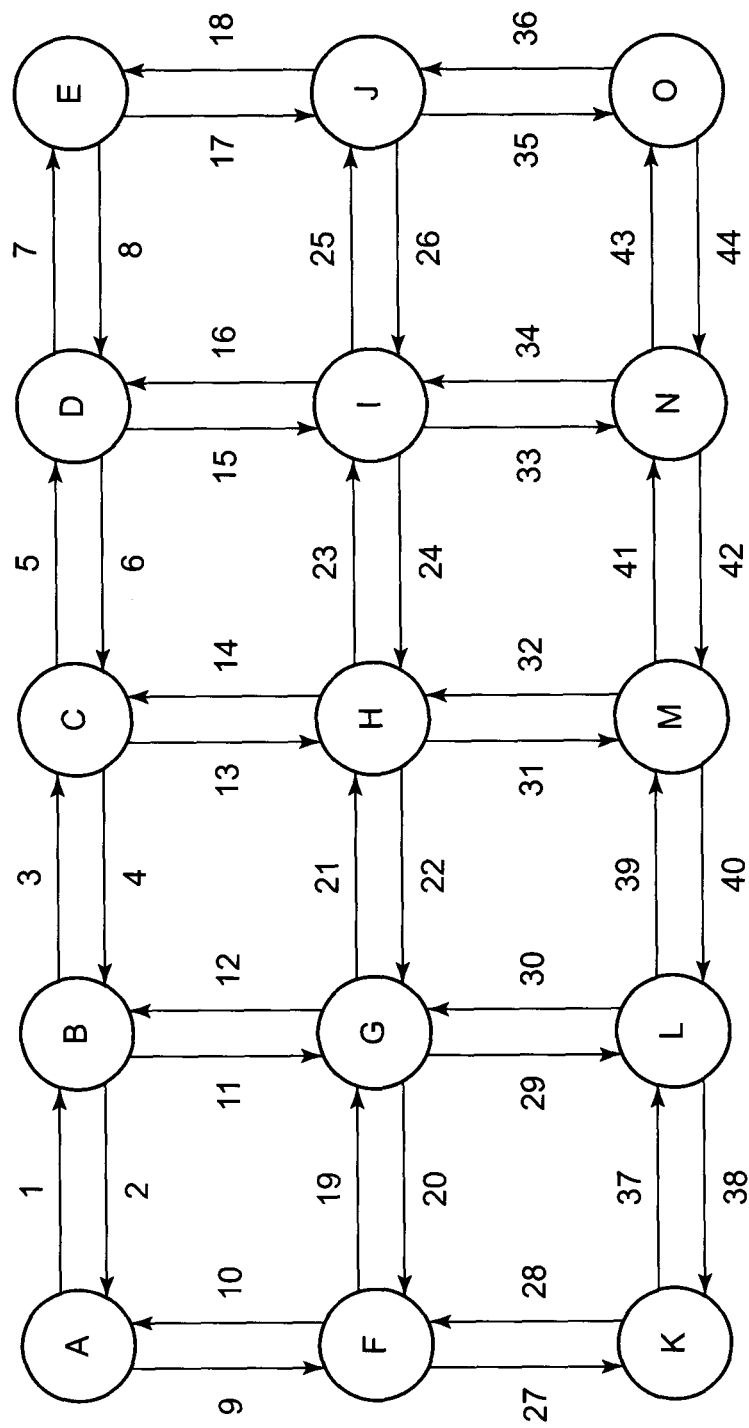
FIG. 26 It depicts an explanatory diagram showing an example of a network as the target of the quality-deteriorated part analysis.
Figure 27:
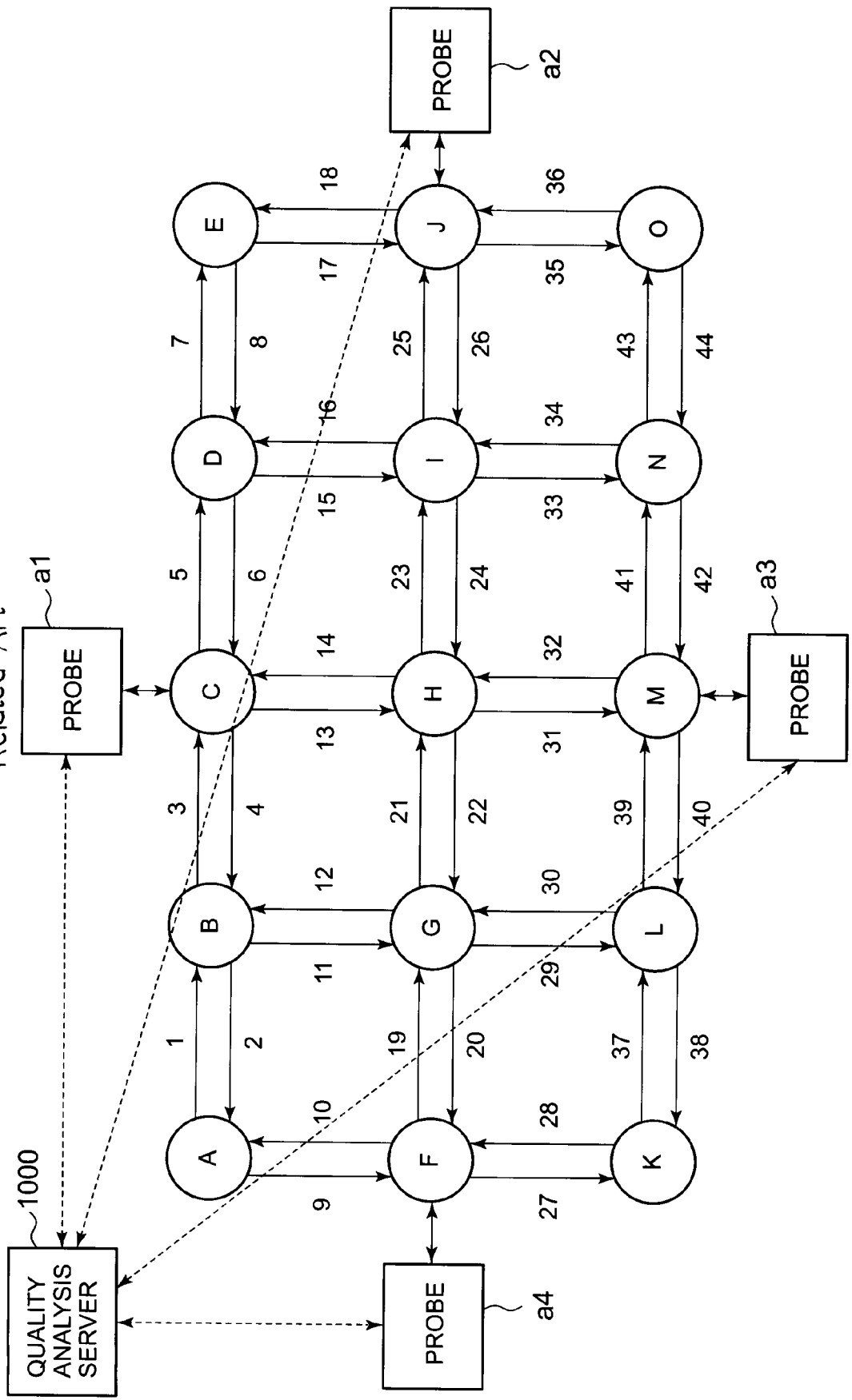
FIG. 27 It depicts an explanatory diagram showing an example of the technique described in the Patent Document 1.
Figure 28:
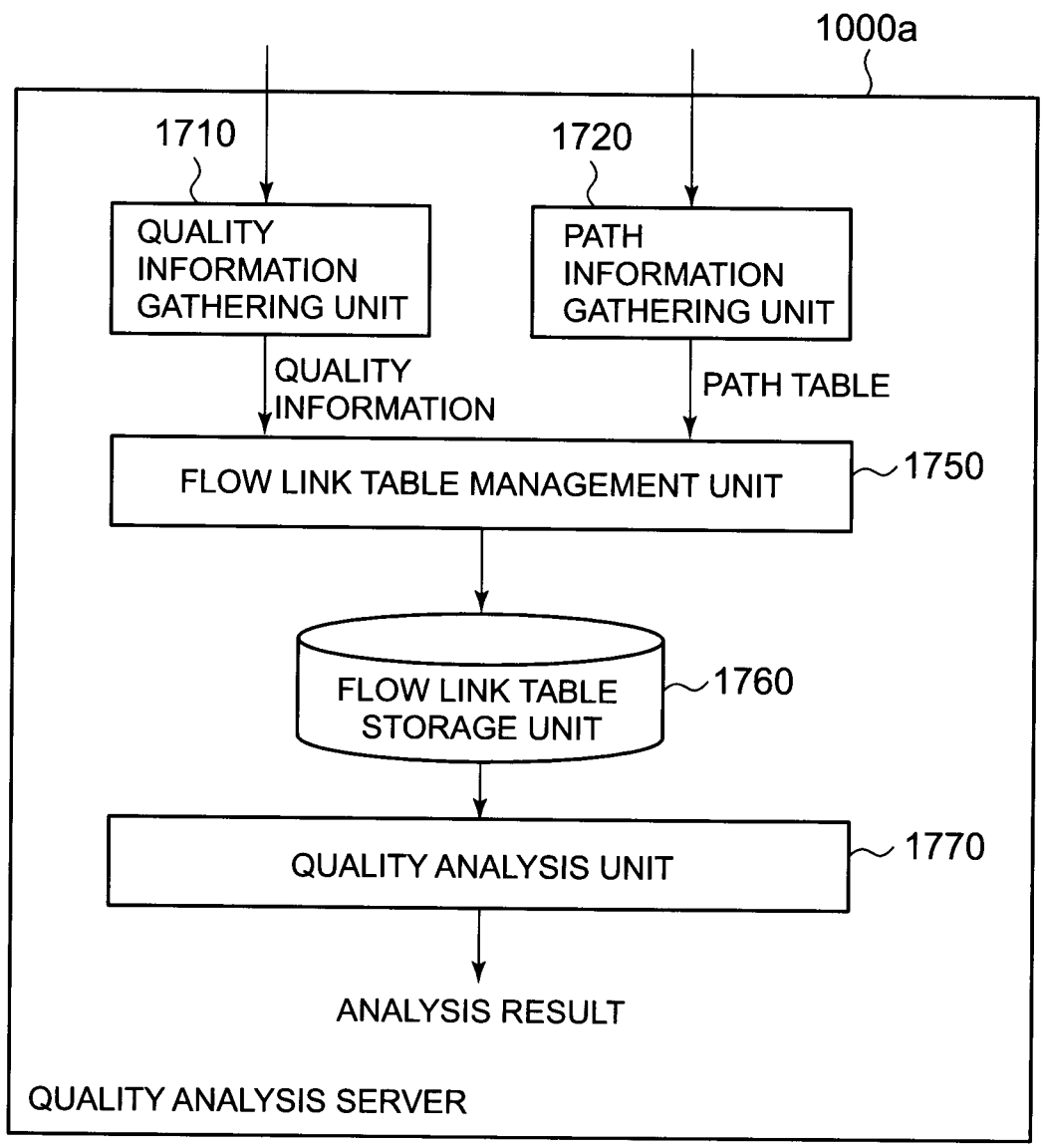
FIG. 28 It depicts a block diagram showing an example of the configuration of the quality analysis server in the technique described in the Patent Document 1.

FIG. 14 is an explanatory diagram showing comparison of the coverage ratio and some other items when the quality-deteriorated part analysis is conducted to the network shown in FIG. 26 according to the related technique 1, the related technique 2 and the first exemplary embodiment of the present invention. The related technique 1 is the technique described in the Patent Document 1. The related technique 2 is the technique described in the Patent Document 2. Data obtained by employing the algorithm 1 in the present invention are shown in three ways, focusing on the paths after the aforementioned step 1-1, the paths after the step 1-2 and the paths after the step 2.

When the full-mesh communication among four probes is executed employing the related technique 1, the number of analysis flows occurring in the network is 12. In this case, referring to the path table, the coverage ratio is 27% and the number of sectioning divisions is 8.

Assuming that the full-mesh communication among four probes is executed employing the related technique 2 and two analysis flows are added compared to the related technique 1, referring to the path table, the coverage ratio is 27% and the number of sectioning divisions is 8.

In contrast, in the present invention, quality deterioration in the network can be analyzed independently of the number and locations of probes, by setting the paths corresponding to the "monitoring target directed link groups".

The algorithm 1 is a method that determines a "monitoring target directed link group" for each physical link, that is, a method for executing the monitoring for each pair of directed links. Even if the number of probes is 1 and the same terminal is used as the source and destination of each flow, 14 flows can be used for the analysis by changing the port number flow by flow, for example. Consequently, the coverage ratio reaches 100% and the number of sectioning divisions increases to 22. Thus, even when number of probes is 1, the coverage ratio and the number of sectioning divisions can be increased and the precision of the quality-deteriorated part analysis can be increased remarkably compared to cases where the related technique 1 or 2 is employed.

The algorithm 2 is a method for roughly monitoring the whole network. Even when there is only one probe, the whole network is monitored using a small number of analysis flows. Consequently, the coverage ratio can be increased to 100% using only two analysis flows.

As described above, in the present invention, the monitoring target directed link groups are considered and the paths of analysis flows suitable for the monitoring target directed link groups are set. Consequently, it becomes possible to conduct the quality-deteriorated part analysis of a network with required precision irrespective of the number and installation locations of probes.

Therefore, the number of probes can be reduced and the quality-deteriorated part analysis can be conducted even when the network is equipped with only one probe as shown in FIG. 1, for example. Further, even when there is a restriction on providing a certain node with a probe by connecting the probe to the node, it is possible to provide the node with the probe by connecting the probe to another node while avoiding the connection of the probe to the former node. Thus, the quality-deteriorated part analysis can be conducted even when there is a restriction on the installation location of a probe.

Further, the quality-deteriorated part analysis can be conducted with desired precision and granularity (desired coverage ratio and sectioning divisions) since the coverage ratio and the sectioning divisions can be changed by modifying the "monitoring target directed link groups".

Each node forwards each flow (which is identified by the port number, etc.) according to an action determined for each flow. Therefore, the load on the CPU of each node can be reduced and the communication quality can be measured without being affected by the CPU load in each node, differently from the related technique 2. Consequently, the quality-deteriorated part analysis can be conducted with higher precision.

Figure 30:
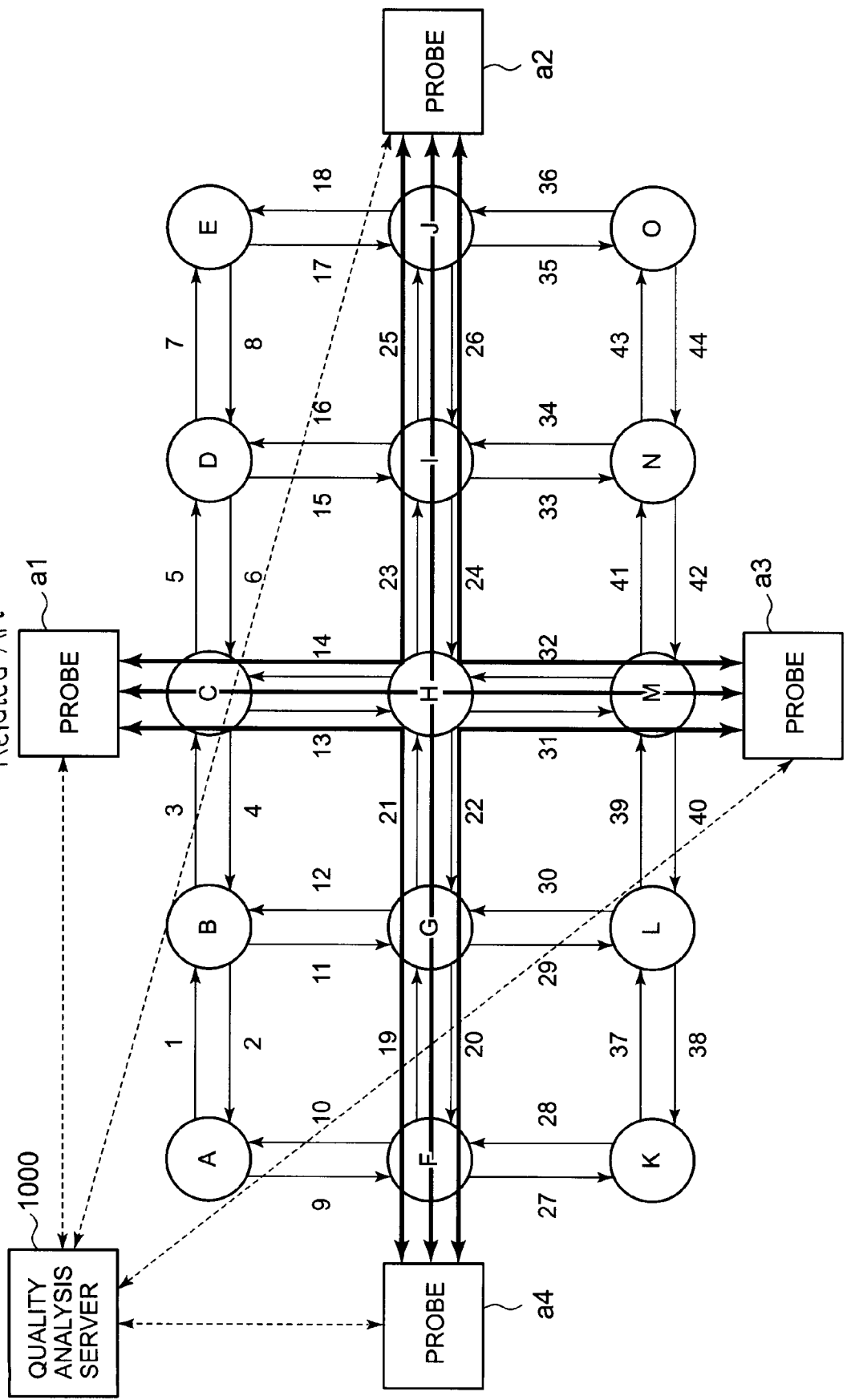
FIG. 30 It depicts an explanatory diagram showing an example of communication paths determined by another system.
Figure 31:
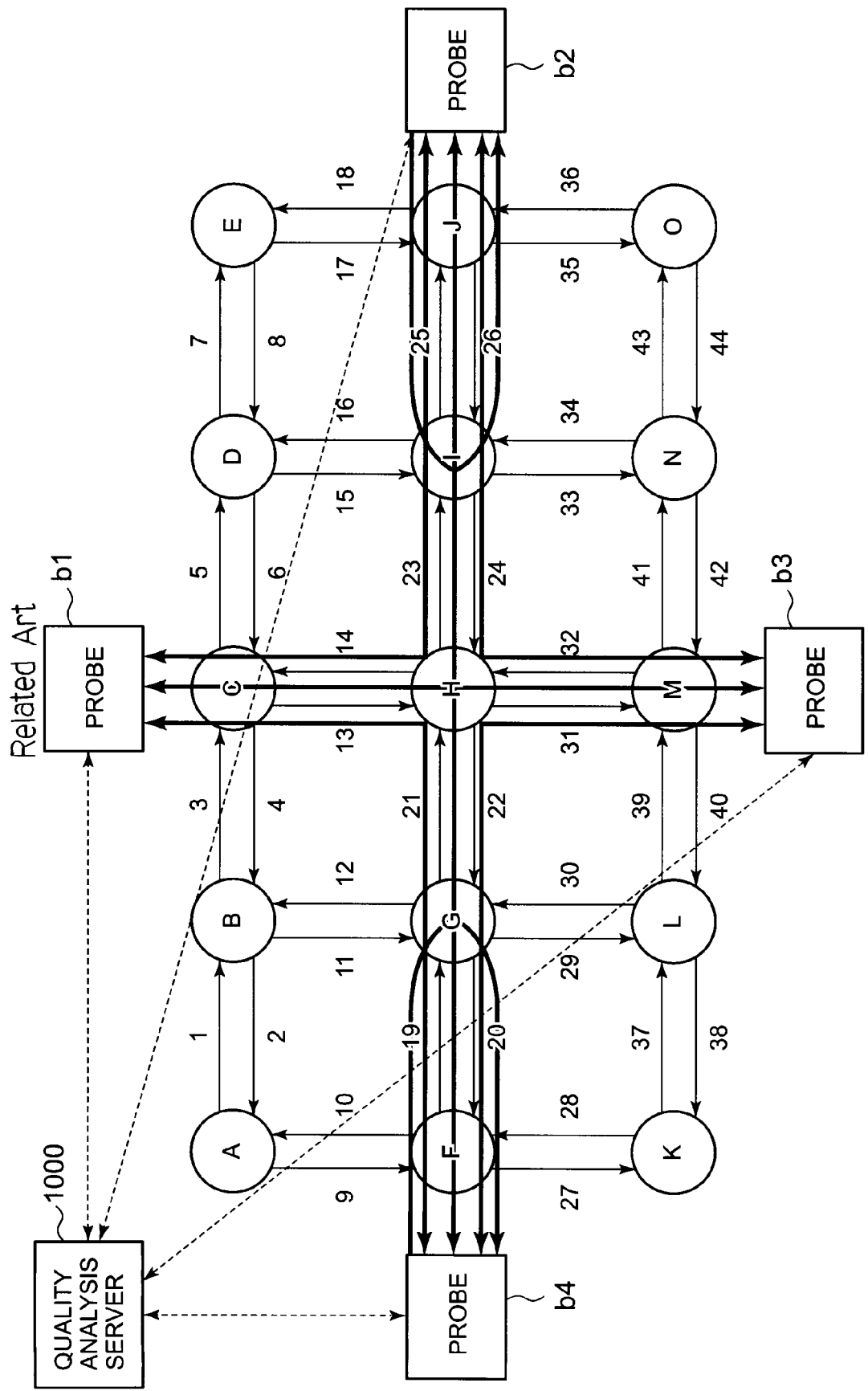
FIG. 31 It depicts an explanatory diagram showing an example of the technique described in the Patent Document 2.

Furthermore, the possibility of reducing the number of probes brings about another effect of increasing the operating ratio of the entire quality-deteriorated part analyzing system. Each probe is generally implemented by a personal computer, server or the like. Assuming that the failure rate of each probe implemented by a personal computer, server or the like is "p" and the number of probes in the related technique 1 is 4 as shown in FIG. 30, the operating ratio of the system equals $(1-p)^4$. In contrast, the operating ratio of the quality-deteriorated part analyzing system of the first exemplary embodiment, including only one probe, equals $(1-p)$. If we assume that the failure rate p is 1%, the operating ratio of the system of the related technique 1 with four probes is 96%, whereas the operating ratio in the first exemplary embodiment is as high as 99%. Moreover, the example of FIG. 30 requires still more probes in order to achieve a coverage ratio and sectioning divisions equivalent to those in the first exemplary embodiment. As a result, the superiority of the first exemplary embodiment in the operating ratio becomes more prominent under the condition of equalizing the coverage ratios.

Figure 15:
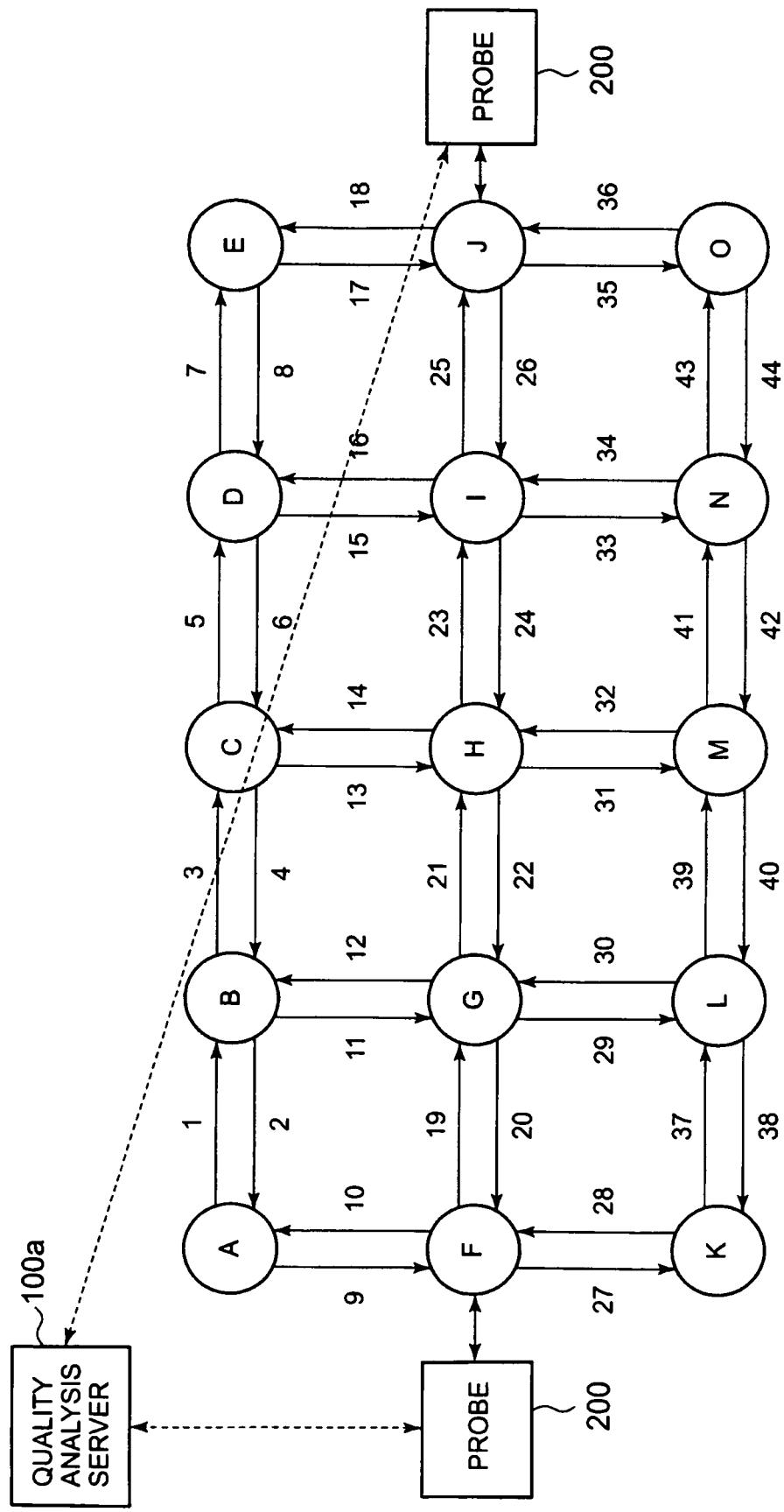
FIG. 15 It depicts an explanatory diagram showing an example of a quality-deteriorated part analyzing system equipped with two or more probes.

Next, modifications of the first exemplary embodiment will be described. While the quality-deteriorated part analyzing system is equipped with one probe 200 in the example of FIG. 1, the quality-deteriorated part analyzing system may also be equipped with two or more probes 200. An example of the quality-deteriorated part analyzing system equipped with two probes 200 is shown in FIG. 15. Further, when each algorithm 1-4 is employed, the probe as the source (sender) of a flow and the probe as the destination of the flow may also be different from each other as long as the conditions required by each algorithm are satisfied. When the algorithm 4 is employed, for example, the probe as the source of a flow and the probe as the destination of the flow may differ from each other as long as the condition that "the paths of all analysis flows pass through the monitoring target directed link group and each path's sections other than the monitoring target directed link group vary from analysis flow to analysis flow" is satisfied.

As mentioned in the explanation of the algorithm 4, the algorithm 4 is unusable when the path 3 or 4 cannot be found from the list. However, even when the path 3 or 4 cannot be found when focusing on the probe as the source of the flows, the algorithm 4 is usable if a path to another probe can be found. Thus, with the increase in the number of probes, the probability of finding a necessary path increases, and consequently, the use of the algorithm 4 becomes easier.

Second Exemplary Embodiment

Figure 16:
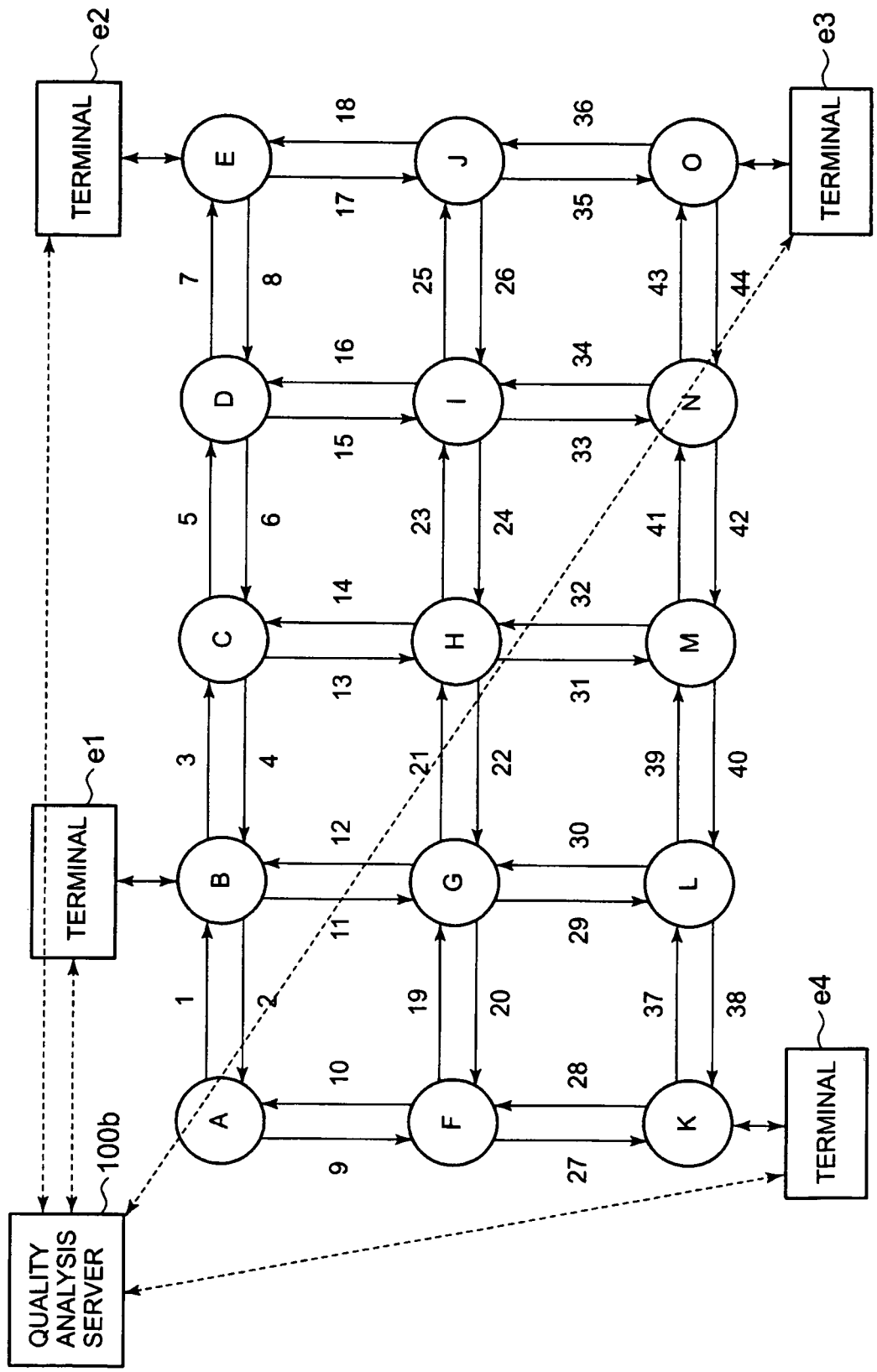
FIG. 16 It depicts is an explanatory diagram showing a quality-deteriorated part analyzing system in accordance with a second exemplary embodiment of the present invention.

FIG. 16 is an explanatory diagram showing a quality-deteriorated part analyzing system in accordance with a second exemplary embodiment of the present invention. Also in the second exemplary embodiment, the explanation will be given assuming that the network as the target of the quality-deteriorated part analysis is the network shown in FIG. 26, for example. The quality-deteriorated part analyzing system of the second exemplary embodiment includes a quality analysis server 100b and terminals e1-e4. While four terminals are shown in FIG. 16, the number of terminals and the nodes connected with the terminals are not particularly restricted.

The terminals e1-e4 are used not only for generating the flows for the purpose of analysis. The terminals e1-e4 are used also by users of a system other than the quality-deteriorated part analyzing system and execute communication according to the purposes of the system and the users. The quality analysis server 100*b* uses the flows, which are communicated between the terminals according to the purposes of the other system and the users, for the quality-deteriorated part analysis.

Each terminal e1-e4 measures the communication quality between itself and terminals communicating therewith based on the flows communicated according to the purposes of the other system and the users and then transmits information on the measured communication quality to the quality analysis server 100*b*. Concrete examples of systems employing such terminals e1-e4 include a sound/video communication system employing RTP (Real-time Transport Protocol), for example. In this system, when an RTP packet is transmitted from a transmitting terminal to a receiving terminal, the receiving terminal informs the transmitting terminal of the result of the measurement of the communication quality according to RTCP (RTP Control Protocol). The quality analysis server 100*b* and a server of the sound/video distribution system cooperate with each other by use of this function, by which the quality analysis server 100*b* is allowed to grasp the quality of the flows actually communicated by the users, etc. Incidentally, communication protocols other than RTP/RTCP may also be employed as long as the quality analysis server 100*b* can receive the communication quality measured by the terminals.

Figure 17:
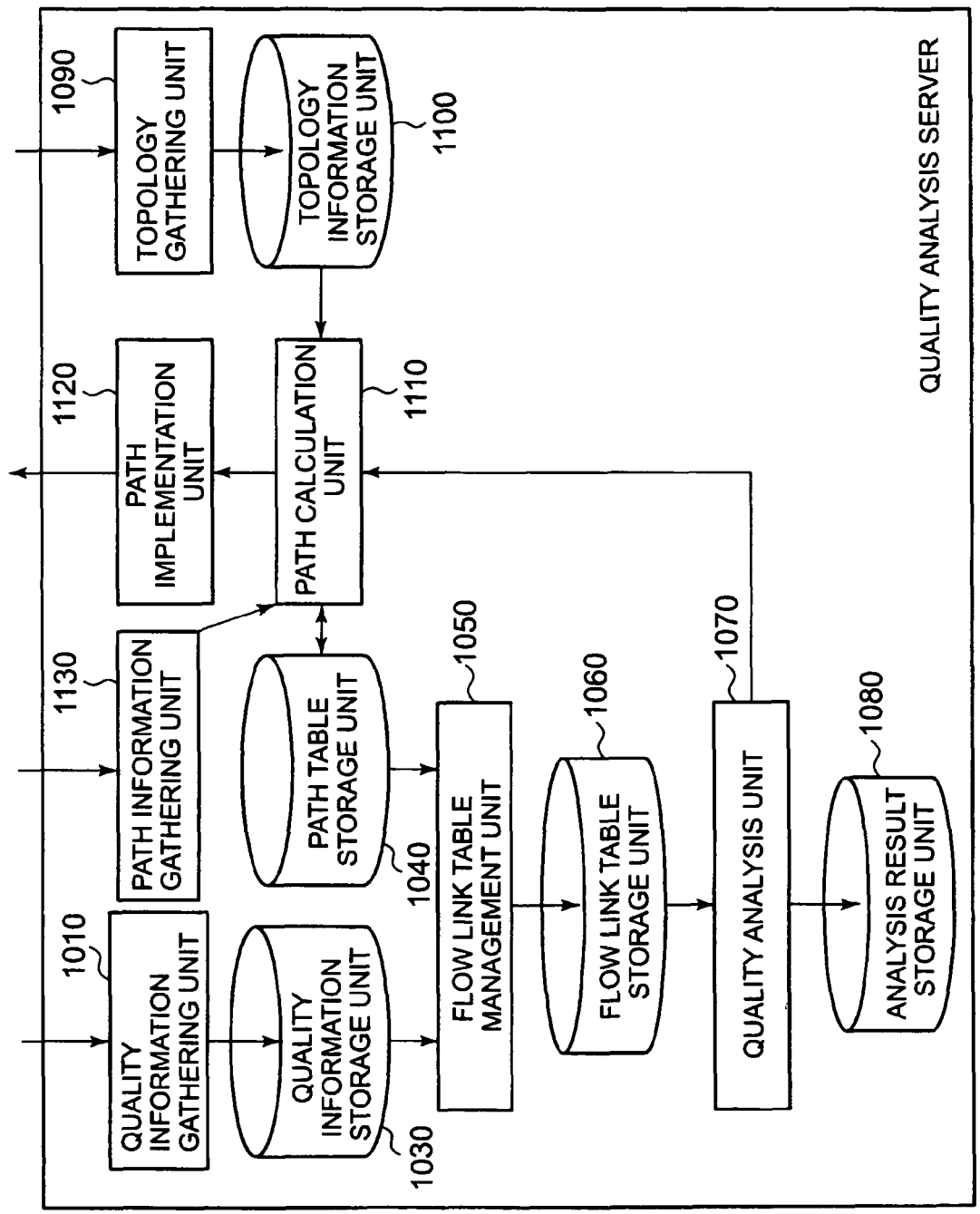
FIG. 17 It depicts a block diagram showing an example of the configuration of a quality analysis server in the second exemplary embodiment.

FIG. 17 is a block diagram showing an example of the configuration of the quality analysis server 100*b* in the second exemplary embodiment. The quality analysis server 100*b* includes a quality information gathering unit 1010, a quality information storage unit 1030, a topology gathering unit 1090, a topology information storage unit 1100, a path calculation unit 1110, a path implementation unit 1120, a path information gathering unit 1130, a path table storage unit 1040, a flow link table management unit 1050, a flow link, table storage unit 1060, a quality analysis unit 1070 and an analysis result storage unit 1080. Components equivalent to those in the first exemplary embodiment are assigned the same reference characters as those in FIG. 2 and detailed explanation thereof is omitted.

In the second exemplary embodiment, the quality information gathering unit 1010 gathers information on the communication quality of the flows communicated among the terminals e1-e4 and stores the gathered communication quality information in the quality information storage unit 1030. For example, the quality information gathering unit 1010 may receive the communication quality information from each terminal e1-e4.

The path information gathering unit 1130 gathers communication information such as the paths of the flows communicated among the terminals e1-e4 and the connecting location of each terminal e1-e4 (i.e., the node to which each terminal is connected). For example, the path information gathering unit 1130 may gather the communication information from a network management system (e.g., OpenFlow controller (unshown)) which previously recognizes the nodes connected with the terminals e1-e4 and sets communication paths among the terminals.

The communication information gathered by the path information gathering unit 1130 includes information indicating whether communication has occurred or not, between which terminals the communication has occurred, to which position of which node each terminal is connected, the route of each path that has already been set between terminals, whether communication already executed between terminals is usable as an analysis flow or not, etc. Whether communication already executed between terminals is usable as an analysis flow or not is judged considering the priority and the protocol of the communication. For example, when communication quality of flows of RTP communication is measured for the quality-deteriorated part analysis, communication already executed for WWW or email is judged to be unusable as an analysis flow. The communication information further includes information indicating whether or not the path of each flow between terminals may be changed to a path suitable for the quality-deteriorated part analysis. Examples of such information include information indicating whether the flow is for regular telephone communication or emergency communication (e.g., "110" and "119" in Japan). If the flow is for regular telephone communication, the communication path may be changed to a path suitable for the quality-deteriorated part analysis. In contrast, if the flow is for emergency communication, the path cannot be changed since the communication has to be executed through the optimum path. Therefore, flows for emergency communication are not used as analysis flows.

In the following, the configuration of each component will be described in detail.

The quality information gathering unit 1010 receives the information on the quality of communication among the terminals e1-e4 from the terminals e1-e4 and stores the received communication quality information in the quality information storage unit 1030. While the quality information gathering unit 1010 in the first exemplary embodiment receives the communication quality information from the probe 200, the quality information gathering unit 1010 in the second exemplary embodiment receives the communication quality information from the terminals e1-e4. The other features of the quality information gathering unit 1010 are equivalent to those in the first exemplary embodiment.

The topology information gathering unit 1090, the topology information storage unit 1100, the path table storage unit 1040, the flow link table management unit 1050, the flow link table storage unit 1060, the quality analysis unit 1070 and the analysis result storage unit 1080 are equivalent to those in the first exemplary embodiment, and thus repeated explanation thereof is omitted.

The path information gathering unit 1130 gathers the aforementioned communication information regarding the communication among the terminals e1-e4 from the network management system (e.g., the OpenFlow controller) which sets the communication paths between terminals. For example, the network management system (unshown) can set the paths shown in FIG. 18 as a communication path between the terminals e1 and e4 and a communication path between the terminals e2 and e3. In this case, the communication information that the path information gathering unit 1130 gathers from the network management system (unshown) includes information indicating the above communication paths, information indicating that the terminals e1, e2, e3 and e4 are connected to the nodes B, E, O and K, respectively, information indicating that communication occurs between the terminals e1 and e4 and between the terminals e2 and e3, and information indicating that flows of the communication are usable as analysis flows. Further, the path information gathering unit 1130 informs the path calculation unit 1110 of the contents of the gathered communication information.

Based on the topology information and the contents of the communication information gathered by the path information gathering unit 1130, the path calculation unit 1110 changes the communication paths between the terminals to paths suitable for the quality-deteriorated part analysis and thereby generates the path table. In the second exemplary embodiment, the management target directed link groups are designated from outside (by the network administrator, for example) and the paths between the terminals are recalculated employing the algorithm 4 explained in the first exemplary embodiment, by which the already-set paths indicated by the communication information are changed. Incidentally, the algorithm employed for the path calculation in this exemplary embodiment is not restricted to the algorithm 4; other algorithms may also be used. For example, the algorithm 3 explained in the first exemplary embodiment becomes usable depending on the positional relationship among the terminals connected to nodes. In such cases, the path calculation unit 1110 may employ the algorithm 3 for the recalculation of the paths between the terminals. The following explanation will be given assuming that the algorithm 4 is employed, for example.

Figure 18:
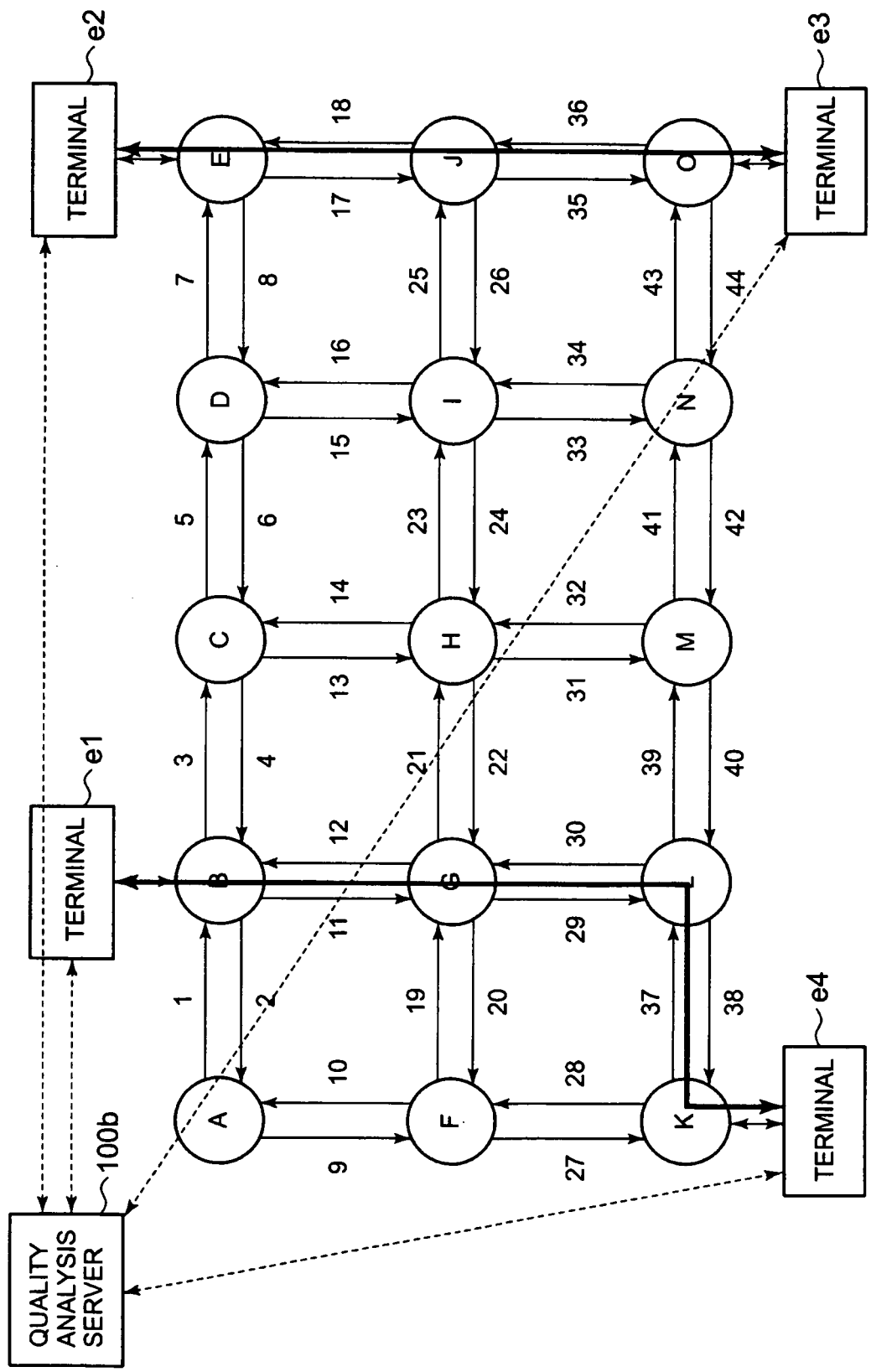
FIG. 18 It depicts an explanatory diagram showing an example of paths previously set between terminals.

FIG. 19(a) shows a path table corresponding to the paths shown in FIG. 18. While being suitable for the communication between the terminals, the paths shown in FIG. 19(a) are not already suitable for the quality-deteriorated part analysis. Further, it is unclear whether or not each communication flow passes through a management target directed link group. Furthermore, even if each communication flow passes through a management target directed link group, it is unclear whether the analysis can be conducted with required precision.

Figure 19:
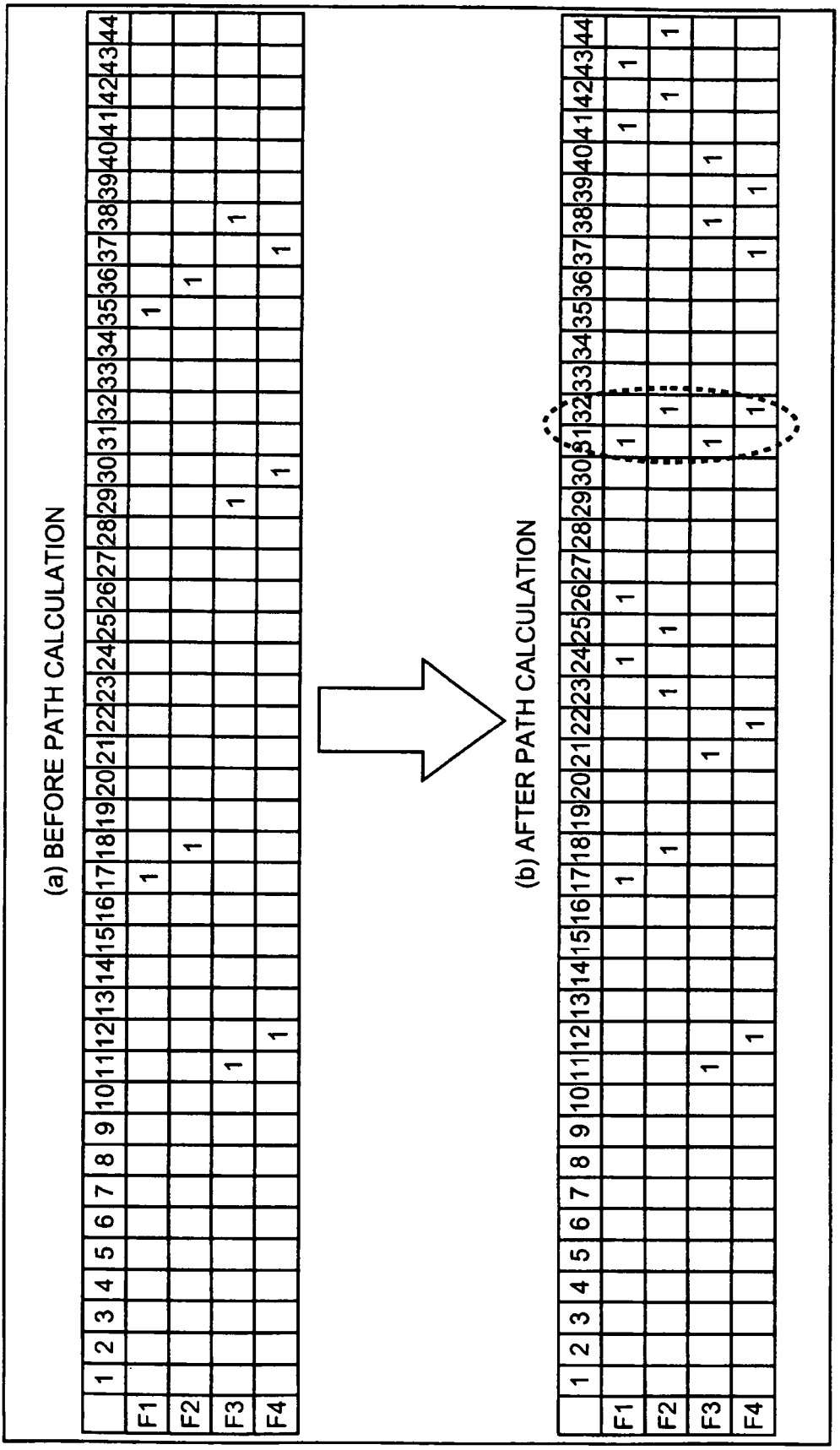
FIG. 19 It depicts an explanatory diagram showing an example of a change in the path table caused by modification of the paths.
Figure 20:
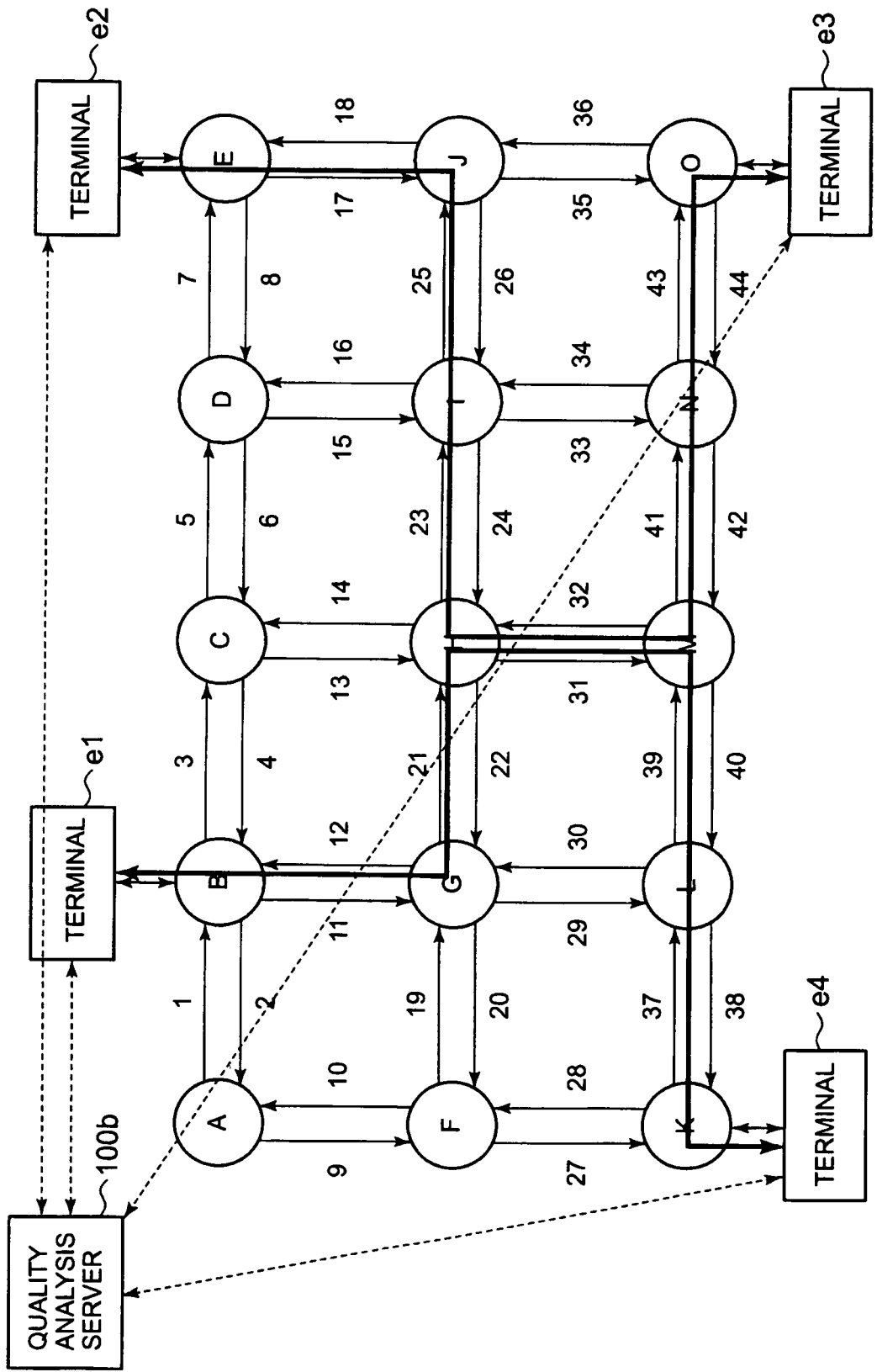
FIG. 20 It depicts an explanatory diagram showing an example of the paths after the modification.

Therefore, the path calculation unit 1110 changes the communication paths so that quality deterioration in the management target directed link groups can be analyzed. For example, assuming that the directed link 31 shown in FIG. 18 has been designated as a "management target directed link group" and the directed link 32 has also been designated as a "management target directed link group", the path calculation unit 1110 recalculates the path of the flow from the terminal e1 to the terminal e4 (flow F3 shown in FIG. 19) and the path of the flow from the terminal e2 to the terminal e3 (flow F1 shown in FIG. 19) using the algorithm 4 explained in the first exemplary embodiment so that only the directed link 31 becomes the common path. Similarly, the path calculation unit 1110 recalculates the path of the flow from the terminal e4 to the terminal e1 (flow F1 shown in FIG. 19) and the path of the flow from the terminal e3 to the terminal e2 (flow F2 shown in FIG. 19) using the algorithm 4 so that only the directed link 32 becomes the common path. FIG. 20 shows the paths after the calculation. Further, the path calculation unit 1110 generates the path table according to the result of the path calculation. FIG. 19(b) shows the path table corresponding to the recalculated paths.

In the path table shown in FIG. 19(b), no directed link other than the directed link 31 has the flags "1" totally in the same cells as the directed link 31. Thus, judgment on the presence/absence of quality deterioration in the directed link 31 becomes possible. Similarly, judgment on the presence/absence of quality deterioration in the directed link 32 becomes possible since no directed link other than the directed link 32 has the flags "1" totally in the same cells as the directed link 32.

The path implementation unit 1120 controls the settings of each node so that the flows transmitted by the terminals e1-e4 are forwarded along the paths calculated by the path calculation unit 1110. Specifically, the path implementation unit 1120 requests the network management system (e.g., the OpenFlow controller) to change the settings already made by the network management system to the nodes to the settings for forwarding the flows transmitted by the terminals e1-e4 along the recalculated paths.

While the above explanation has been given by taking an OpenFlow network as an example, the network is not restricted to an OpenFlow network as long as the topology information on the network can be acquired by the topology gathering unit 1090 and the paths determined by the path calculation unit 1110 can be implemented in the network by the path implementation unit 1120. For example, even in a network like a VLAN or an MPLS network, the forwarding destination can be explicitly indicated to each node by the value of a label.

While the above explanation has been given assuming that the terminals e1-e4 execute communication according to the purposes of the other system and the users, part or all of the terminals may be replaced with the probes.

While the network management system such as an OpenFlow controller sets the communication paths between terminals and thereafter the path calculation unit 1110 changes the paths in the above explanation of the second exemplary embodiment, the second exemplary embodiment may also be configured differently. For example, the quality analysis server 100b may directly calculate the communication paths between terminals when information on a communication request received by the network management system from a terminal e1-e4 is sent from the network management system upon reception of the communication request.

The path information gathering unit 1130 is implemented by, for example, a computer's CPU operating according to a quality-deteriorated part analyzing program. In this case, the CPU may operate as the path information gathering unit 1130, etc. according to the quality-deteriorated part analyzing program. The components of the quality-deteriorated part analyzing system (the path information gathering unit 1130, etc.) may also be implemented by separate units.

Next, the operation of the second exemplary embodiment will be explained.

Figure 21:
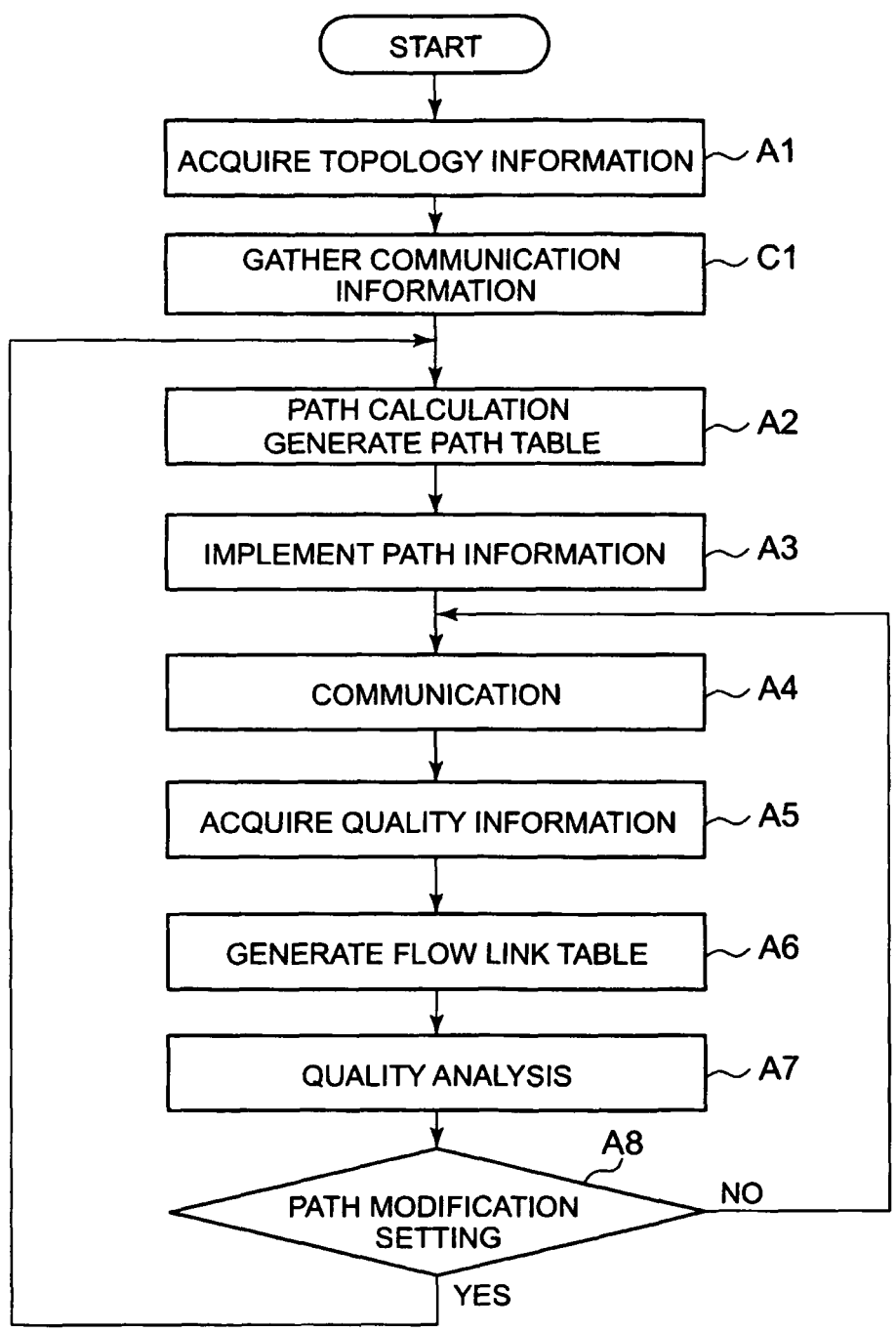
FIG. 21 It depicts a flow chart showing an example of the process flow of the second exemplary embodiment FIG. 22 It depicts an explanatory diagram showing a quality-deteriorated part analyzing system in accordance with a third exemplary embodiment of the present invention.

FIG. 21 is a flow chart showing an example of the process flow of the second exemplary embodiment, wherein steps equivalent to those in the first exemplary embodiment are assigned the same reference characters as those in FIG. 12 and detailed explanation thereof is omitted.

Upon startup of the quality analysis server 100b, the topology gathering unit 1090 gathers the topology information on the network and stores the gathered topology information in the topology information storage unit 1100 (step A1).

After the step A1, the path information gathering unit 1130 gathers the communication information regarding the communication among the terminals e1-e4 from the network management system (e.g., the OpenFlow controller) which sets the communication paths between terminals. For example, the path information gathering unit 1130 gathers the communication information including the information indicating the paths shown in FIG. 18, the information indicating that the terminals e1, e2, e3 and e4 are connected to the nodes B, E, O and K, respectively, the information indicating that communication occurs between the terminals e1 and e4 and between the terminals e2 and e3 and the information indicating that flows of the communication are usable as analysis flows as explained above (step C1). The path information gathering unit 1130 informs the path calculation unit 1110 of the contents of the gathered communication information.

Upon receiving the contents of the communication information from the path information gathering unit 1130, the path calculation unit 1110 changes the communication paths between the terminals and accordingly generates the path table based on the contents of the communication information and the topology information stored in the topology information storage unit 1100. Specifically, the path calculation unit 1110 recalculates the paths between terminals indicated by the communication information. In the recalculation, the path calculation unit 1110 calculates paths satisfying a condition that "each "management target directed link group" already set has at least two paths (of flows between terminals) sharing only the "management target directed link group" as the common part and each path between terminals passes through one of the "management target directed link groups"". Then, the path calculation unit 1110 generates path flows corresponding to the newly calculated paths. Incidentally, the method of setting the "management target directed link groups" is not particularly limited as long as they can be set previously.

For example, let us consider a case where the path from the terminal e1 to the terminal e4, the path from the terminal e4 to the terminal e1, the path from the terminal e2 to the terminal e3 and the path from the terminal e3 to the terminal e2 (shown in FIGS. 18 and 19A) have been specified by the communication information, the "directed link 31" has been determined as a "management target directed link group", the "directed link 32" has also been determined as a "management target directed link group", and it has been determined that flows between the terminals are usable as analysis flows. In this case, the path calculation unit 1110 recalculates the path from the terminal e1 to the terminal e4 and the path from the terminal e2 to the terminal e3 using the algorithm 4 so that only the directed link 31 is shared by the paths as the common part. Similarly, the path calculation unit 1110 recalculates the path from the terminal e4 to the terminal e1 and the path from the terminal e3 to the terminal e2 using the algorithm 4 so that only the directed link 32 is shared by the paths as the common part. The paths shown in FIG. 20 are obtained by the recalculation, for example. The path calculation unit 1110 generates the path table shown in FIG. 19(*b*) as the path flows corresponding to the newly calculated paths.

In the path table shown in FIG. 19(*b*), the sectioning division of the directed link 31 determined as a "management target directed link group" differs from the sectioning divisions of the other directed links. Thus, judgment on the presence/absence of quality deterioration in the directed link 31 becomes possible. Similarly, judgment on the presence/absence of quality deterioration in the directed link 32 becomes possible since the sectioning division of the directed link 32 determined as a "management target directed link group" differs from the sectioning divisions of the other directed links.

The process flow of the quality-deteriorated part analyzing system after the paths between terminals indicated by the communication information are recalculated by the path calculation unit 1110 (i.e., after the step A2) is equivalent to that in the first exemplary embodiment from the step A3. In the step A4, however, the terminals e1-e4 communicate the flows through the paths recalculated in the step A2. Each terminal e1-e4 measures the communication quality in the communication of the flow and transmits the information on the communication quality to the quality analysis server 100b. Also in the second exemplary embodiment, the process of deleting rows as subordinate expressions from the path table is desired to be executed after the path table is generated in the step A2. In other words, after the path table is corrected by modifying the given paths, rows as subordinate expressions are desired to be deleted from the corrected path table.

In this exemplary embodiment, the paths of inter-terminal communication which is executed by users or a system other than the quality-deteriorated part analyzing system for a purpose other than the quality-deteriorated part analysis are recalculated by the quality analysis server 100b (specifically, the path calculation unit 1110) into paths suitable for the quality-deteriorated part analysis. Each terminal e1-e4 measures the communication quality during the communication of the flow through the path and transmits the information on the communication quality to the quality analysis server 100b. The quality analysis server 100b generates the flow link table by combining the path table with the communication quality information and then analyzes the presence/absence of quality deterioration in the "management target directed link groups" which have been set. Since the paths are recalculated by the path calculation unit 1110 as explained, above, the quality-deteriorated part analysis of a network can be conducted with required precision irrespective of the number and installation locations of terminals.

As mentioned above, for the recalculation of the paths between terminals in the second exemplary embodiment, the algorithm 3 explained in the first exemplary embodiment becomes usable depending on the positional relationship among the terminals connected to nodes. For example, let us consider a case where the network shown in FIG. 26 is the target of the quality-deteriorated part analysis, three terminals e1-e3 have been connected to nodes (e.g., nodes B, E and O, respectively) and communication is executed between the terminals e1 and e3 and between the terminals e2 and e3. When a communication path between the terminals e1 and e3 and a communication path between the terminals e2 and e3 are given to the quality analysis server 100b and the communication paths are modified, the path calculation unit 1110 may recalculate the communication paths between the terminals employing the algorithm 3. In this case, the path calculation unit 1110 may determine the path from the terminal e1 to the terminal e3 as the directed links 3, 5, 7, 17 and 35, the path from the terminal e3 to the terminal e1 as the directed links 36, 18, 8, 6, and 4, the path from the terminal e2 to the terminal e3 as the directed links 17 and 35, and the path from the terminal e3 to the terminal e2 as the directed links 36 and 18, for example. As above, the algorithm 3 may be employed for redetermining the communication paths in cases where one terminal communicates with two or more terminals, for example.

Third Exemplary Embodiment

Figure 22:
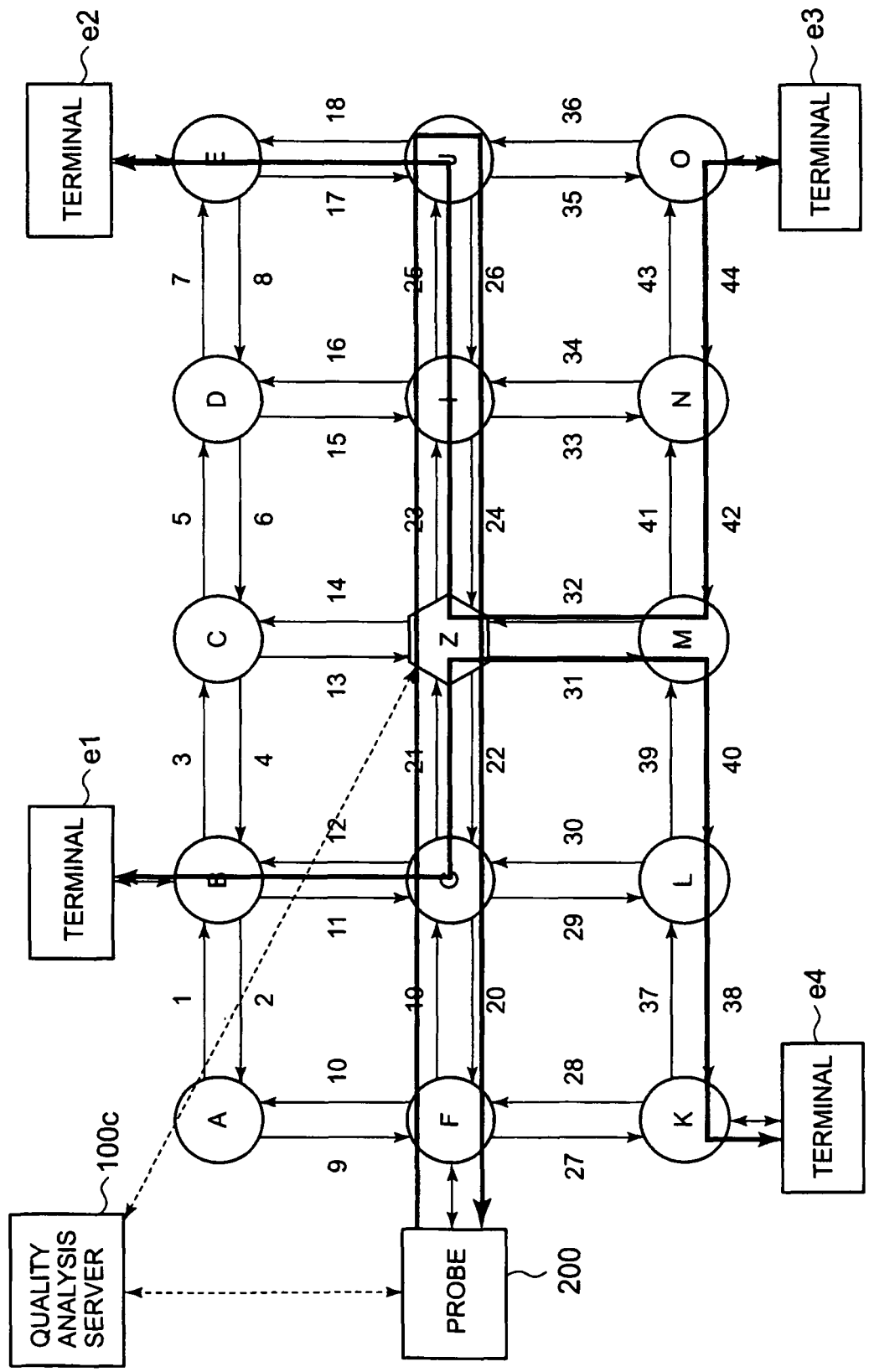

FIG. 22 is an explanatory diagram showing a quality-deteriorated part analyzing system in accordance with a third exemplary embodiment of the present invention. The quality-deteriorated part analyzing system of the third exemplary embodiment includes a quality analysis server 100c, a probe 200, terminals e1-e4 and a quality measurement device 400.

The probe 200, which is equivalent to the probe 200 in the first exemplary embodiment, transmits flows, receives the flows returning thereto via nodes in the network, and thereby measures the communication quality.

The terminals e1-e4, which are equivalent to the terminals e1-e4 in the second exemplary embodiment, are used by users and a system other than the quality-deteriorated part analyzing system. The terminals e1-e4 execute communication according to the purposes of the system and the users. However, each terminal e1-e4 in the third exemplary embodiment does not have to execute the process of measuring the communication quality between itself and terminals communicating therewith based on the communicated flows and the process of transmitting the information on the communication quality to the quality analysis server 100c. However, the terminals e1-e4 may also be configured to execute the measurement of the communication quality and the transmission to the quality analysis server 100c similarly to the second exemplary embodiment.

While the quality-deteriorated part analyzing system shown in FIG. 22 is equipped with both the probe 200 and the terminals e1-e4, the probe 200 or the terminals e1-e4 may be left out of the system.

While the probe 200 is connected to the node F in the example of FIG. 22, the probe 200 may be connected to a different node. Similarly, while the terminals e1-e4 are connected to the nodes B, E, O and K, respectively in FIG. 22, the terminals may be connected to different nodes.

The quality measurement device 400, which is placed in the network as a node, has the packet forwarding function similarly to the other nodes. Upon receiving a flow, the quality measurement device 400 measures the communication quality from the source of the flow to itself and transmits information on the measured communication quality to the quality analysis server 100c. The quality measurement device 400 may be implemented by a genuine passive measurement device or a node that observes the packets by its mirror port function.

Since the communication quality from the source of each flow to the quality measurement device 400 is measured by the quality measurement device 400 and the communication quality information is transmitted to the quality analysis server 100c, the quality analysis server 100c is capable of gathering the communication quality information even if the terminals e1-e4 do not have the function of measuring the communication quality.

While this exemplary embodiment is explained assuming that the quality measurement device 400 is installed in the network shown in FIG. 26 in place of the node H (see FIG. 22), for example, the installation location of the quality measurement device 400 in the network is not particularly limited. The quality measurement device 400 will hereinafter be referred to also as a "node Z".

The node Z measures the communication quality from the transmitting terminal of each flow to the quality measurement device (node Z) and transmits the information on the measured communication quality to the quality analysis server 100c. In short, the node Z measures the end-to-point communication quality.

In cases where the quality-deteriorated part analyzing system is equipped with the probe 200, the probe 200 measures the communication quality from the source to the destination of each flow and transmits the information on the measured communication quality to the quality analysis server 100c. In short, the probe 200 measures the end-to-end communication quality. The same goes for cases where the terminals e1-e4 measure the communication quality and transmit the communication quality information to the quality analysis server 100c.

However, depending on the protocol, the node Z can have the function of the measuring the communication quality from the source to the destination of each flow (end-to-end communication quality) and transmitting the communication quality information to the quality analysis server 100c. For example, the node Z may measure the number of packets retransmitted from the source terminal (transmitting terminal) to the destination terminal by monitoring the duplicate ACK (ACKnowledgement) of TCP. The node Z may also measure the RTP quality from the source terminal to the destination terminal by observing RTCP reports. As above, the node Z may measure both the communication quality from the source terminal to the node Z and the communication quality from the source terminal to the destination terminal and transmit information on the measured communication quality to the quality analysis server 100c.

The quality analysis server 100c is equivalent to the quality analysis server 100b in the second exemplary embodiment (see FIG. 17). In cases where the quality-deteriorated part analyzing system is not equipped with the terminals e1-e4, the quality information storage unit 1030 may be left out of the quality analysis server 100c. Components other than the path calculation unit 1110 are equivalent to those in the first and second exemplary embodiments, and thus repeated explanation thereof is omitted.

In the third exemplary embodiment, the path calculation unit 1110 calculates a path that passes through the node Z as the path of each flow transmitted from the probe 200 and returning to the probe 200. In this case, the path calculation unit 1110 may execute the path calculation employing the algorithms 1-4 explained in the first exemplary embodiment, by adding the condition that each path passes through the node Z to the algorithms 1-4.

The path calculation unit 1110 also modifies the paths of flows communicated between terminals. Specifically, the path calculation unit 1110 recalculates the paths of flows communicated between the terminals into paths passing through the node Z. In this case, the path calculation unit 1110 may execute the recalculation of the paths by adding the condition that each path passes through the node Z to the method of the recalculation in the second exemplary embodiment.

Further, the path calculation unit 1110 generates the path table corresponding to the calculated paths.

In the path table, the path calculation unit 1110 may add rows representing parts of the paths of the actually communicated flows (obtained by segmenting each path at the node Z) to the rows of the actually communicated flows.

For example, when the path calculation unit 1110 has calculated the path of a flow transmitted from the probe 200 and returning to the probe 200 via the node Z and created a row regarding the flow in the path table, the path calculation unit 1110 may add a row representing the section from the probe 200 to the node Z and a row representing the section from the node Z to the probe 200 to the path table as the rows representing parts of the path of the flow. For a flow transmitted from the probe 200, reaching a node (other than the node Z) via the node Z and returning to the probe 200 via the node Z, the path calculation unit 1110 may add rows representing sections extending from the node Z and returning to the node Z to the path table.

For example, when the path calculation unit 1110 has calculated the path of a flow transmitted from a terminal and reaching another terminal via the node Z and created a row regarding the flow in the path table, the path calculation unit 1110 may add a row representing the section from the (former) terminal to the node Z and a row representing the section from the node Z to the (latter) terminal to the path table as the rows representing parts of the path of the flow.

Incidentally, even when a row representing a part of the path of an actually communicated flow is added to the path table, the number of types of actually communicated flows does not increase. For example, even when a row representing the section from the node Z to the probe 200 is added to the path table as a part of the path of the flow, it does not cause transmission of a new flow from the node Z (source) to the probe 200 (destination). Each row added to the path table as a part of the path of an actually communicated flow means that communication quality in the section represented by the row is measured. In this exemplary embodiment, communication quality in a section (part) of the path of each flow can be measured since the end-to-point communication quality is calculated by the node Z. Therefore, each row added to the path table as a part of the path of a flow can be considered to correspond to a communication quality measurement target section.

FIG. 23 shows an example of the path table to which rows have been added. In FIG. 23, each of the rows (flows) F1-1, F2-1, F3-1, F4-1 and F5-1 indicates directed links on the path of an actually communicated flow. Specifically, the row F1-1 indicates directed links on a path connecting the probe 200, the node Z, the node J, the node Z and the probe 200 in this order. Similarly, the row F2-1 indicates directed links on a path connecting the terminal e1, the node Z and the terminal e4 in this order. The row F3-1 indicates directed links on a path connecting the terminal e4, the node Z and the terminal e1 in this order. The row F4-1 indicates directed links on a path connecting the terminal e2, the node Z and the terminal e3 in this order. The row F5-1 indicates directed links on a path connecting the terminal e3, the node Z and the terminal e2 in this order.

After creating the row F1-1, the path calculation unit 1110 adds the rows F1-2, F1-3 and F1-4 to the path table as rows indicating directed links in sections obtained by segmenting the path of the flow F1-1 at the node Z. The row F1-2 indicates directed links in the section from the probe 200 to the node Z included in the path of the flow actually transmitted from the probe 200. Similarly, the row F1-3 indicates directed links in the section extending from the node Z to the node J and returning to the node Z. Similarly, the row F1-4 indicates directed links in the section from the node Z to the probe 200. As above, the number of rows in the path table can be increased based on one flow actually transmitted from the probe 200 and returning to the probe 200 via the node Z.

Further, after creating the row F2-1, for example, the path calculation unit 1110 adds the rows F2-2 and F2-3 to the path table as rows indicating directed links in sections obtained by segmenting the path of the flow F2-1 at the node Z. The row F2-2 indicates directed links in the section from the terminal e1 to the node Z included in the path of the flow actually transmitted from the terminal e1. Similarly, the row F2-3 indicates directed links in the section from the node Z to the terminal e4.

Similarly, the rows F3-2, F3-3, F4-2, F4-3, F5-2 and F5-3 are rows that have been added to the path table as sections obtained by segmenting the path of each flow actually transmitted from a terminal at the node Z.

In the example of FIG. 23, the number of rows in the path table is increased to 16 even though there are only 5 types of actually communicated flows. As a result of the addition of rows, the diversity of the path table can be increased and the precision of the analysis (sectioning divisions, etc.) can be improved.

Incidentally, the addition of rows to the path table can cause a row as a subordinate expression in the path table. The path calculation unit 1110 may make all the rows of the path table independent expressions by deleting some rows as subordinate expressions from the path table after the addition of rows. In the example of FIG. 23, for example, the rows F1-1, F1-2, F1-3 and F1-4 are all subordinate expressions. The path calculation unit 1110 may delete any one of the rows F1-1, F1-2, F1-3 and F1-4. Consequently, the remaining three rows become independent expressions.

The rows F2-1, F2-2 and F2-3 are also all subordinate expressions in the state shown in FIG. 23. The path calculation unit 1110 may delete any one of the three rows. Consequently, the remaining two rows become independent expressions. The same goes for the three rows F3-1, F3-2 and F3-3, the three rows F4-1, F4-2 and F4-3, and the three rows F5-1, F5-2 and F5-3.

Components other than the path calculation unit 1110 are equivalent to those in the first and second exemplary embodiments, and thus repeated explanation thereof is omitted.

In the techniques described in the Patent Documents 1 and 2, even if a node as a quality measurement device is placed in the network, the paths are determined by the network management system which is separate from the quality analysis server. Therefore, in cases where the paths do not pass through the measurement device, the quality analysis server is incapable of grasping the quality in the middle of communication or the quality of user communication having no function of transmitting information on the communication quality.

In contrast, in the third exemplary embodiment, the path calculation unit 1110 of the quality analysis server 100c calculates the paths of flows passing through the quality measurement device 400 (node Z). Therefore, a lot of quality values in the middle of communication can be calculated. Further, even when a terminal does not have the function of measuring the communication quality and transmitting the communication quality information to the quality analysis server 100c, information on the quality of communication executed by such a terminal can be transmitted to the quality analysis server 100c. The quality analysis server 100c is capable of gathering the quality information on the quality in a variety of sections. Furthermore, the diversity of the path table can be increased and the precision (coverage ratio, sectioning divisions, etc.) can be improved.

While path tables in which each row corresponds to a communication quality measurement target section and each column corresponds to a directed link have been shown in the first through third exemplary embodiments, it is also possible to use path tables in which each row corresponds to a directed link and each column corresponds to a communication quality measurement target section.

Figure 24:
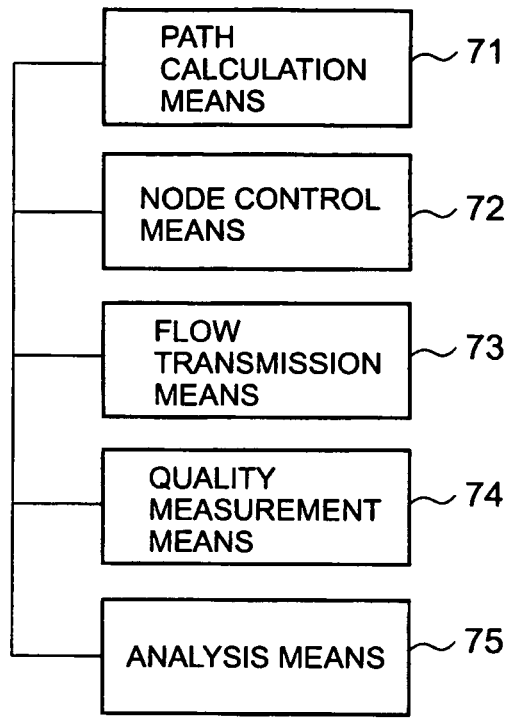
FIG. 24 It depicts a block diagram showing an example of the minimum configuration of the quality-deteriorated part analyzing system in accordance with the present invention.

Next, the minimum configuration of the present invention will be described. FIG. 24 is a block diagram showing an example of the minimum configuration of the quality-deteriorated part analyzing system in accordance with the present invention.

The quality-deteriorated part analyzing system in accordance with the present invention comprises path calculation means 71, node control means 72, flow transmission means 73, quality measurement means 74 and analysis means 75.

The path calculation means 71 (e.g., the path calculation unit 1110) determines paths, each passing through directed links between nodes in a network, as targets of communication quality measurement by referring to topology information on the network and generates a path table which indicates directed links included in each communication quality measurement target section.

The node control means 72 (e.g., the path implementation unit 1120) makes settings for the nodes in the network, the settings for forwarding along the paths flows corresponding to the paths determined by the path calculation means.

The flow transmission means 73 (e.g., the probe 200 and the terminals e1-e4) transmits the flows corresponding to the paths determined by the path calculation means.

The quality measurement means 74 (e.g., the probe 200 and the terminals e1-e4) measures communication quality based on the flows corresponding to the paths determined by the path calculation means.

The analysis means 75 (e.g., the quality analysis unit 1070) analyzes a communication quality-deteriorated part in the directed links in the network based on the path table and the communication quality.

Figure 25:
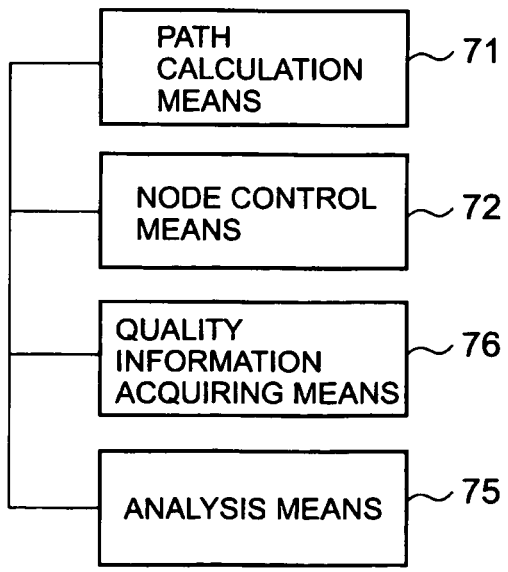
FIG. 25 It depicts a block diagram showing an example of the minimum configuration of the quality-deteriorated part analyzing device in accordance with the present invention.

FIG. 25 is a block diagram showing an example of the minimum configuration of the quality-deteriorated part analyzing device in accordance with the present invention. The quality-deteriorated part analyzing device comprises the path calculation means 71, the node control means 72, quality information acquiring means 76 and the analysis means 75. The quality information acquiring means 76 (e.g., the quality information gathering unit 1010) acquires information on communication quality measured based on the flows corresponding to the paths determined by the path calculation means.

With such configurations, in the present invention, the quality-deteriorated part analysis of a network can be conducted while increasing the degree of freedom of the precision (coverage ratio, sectioning divisions, etc.) independently of the number and installation locations of the devices transmitting and receiving the flows.

While part or all of the above exemplary embodiments can also be described as the following Supplementary notes, the present invention is not to be restricted by the following description.

(Supplementary Note 1)

A quality-deteriorated part analyzing system comprising:

path calculation means which determines paths, each passing through one or more directed links between nodes in a network and being regarded as a target of communication quality measurement, by referring to topology information on the network and generates a path table which indicates directed links included in each communication quality measurement target section;

node control means which makes settings for the nodes in the network, the settings for forwarding along the paths flows corresponding to the paths determined by the path calculation means;

flow transmission means which transmits the flows corresponding to the paths determined by the path calculation means;

quality measurement means which measures communication quality based on the flows corresponding to the paths determined by the path calculation means; and analysis means which analyzes a communication quality-deteriorated part in the directed links in the network based on the path table and the communication quality measured by the quality measurement means.

(Supplementary Note 2)

The quality-deteriorated part analyzing system according to Supplementary note 1, wherein the path calculation means determines the paths regarded as the targets of the communication quality measurement based on monitoring target directed link groups which are regarded as targets of monitoring of presence/absence of communication quality deterioration.

(Supplementary Note 3)

The quality-deteriorated part analyzing system according to Supplementary note 1 or 2, wherein the path calculation means deletes information on a measurement target section from the path table when directed links regarding the measurement target section are expressed in the path table as the sum of directed links regarding some other measurement target sections or as the difference between directed links regarding another measurement target section and directed links regarding still another measurement target section.

(Supplementary Note 4)

The quality-deteriorated part analyzing system according to any one of Supplementary notes 1-3, wherein:

at least one quality measurement means is implemented by a node in the network, and the path calculation means determines a path passing through the node operating as the quality measurement means.

(Supplementary Note 5)

The quality-deteriorated part analyzing system according to any one of Supplementary notes 1-4, wherein the path calculation means determines paths that satisfy a condition that the type of combination of measurement target sections passing through a directed link differs between each directed link belonging to a monitoring target directed link group regarded as a target of monitoring of presence/absence of communication quality deterioration and directed links other than the monitoring target directed link group.

(Supplementary Note 6)

The quality-deteriorated part analyzing system according to any one of Supplementary notes 1-5, wherein the path calculation means determines a plurality of paths that share a monitoring target directed link group as a common part and differ from each other in sections other than the monitoring target directed link group for each monitoring target directed link group regarded as a target of monitoring of presence/absence of communication quality deterioration.

(Supplementary Note 7)

The quality-deteriorated part analyzing system according to any one of Supplementary notes 1-5, wherein the path calculation means determines a plurality of paths for each monitoring target directed link group regarded as a target of monitoring of presence/absence of communication quality deterioration so that one path included in the plurality of paths contains the monitoring target directed link group and the other paths included in the plurality of paths share sections of the one path other than the monitoring target directed link group as common parts and do not contain the monitoring target directed link group.

(Supplementary Note 8)

The quality-deteriorated part analyzing system according to any one of Supplementary notes 1-7, wherein when paths of flows communicated for a purpose other than the communication quality-deteriorated part analysis are given, the path calculation means redetermines the paths of the flows.

(Supplementary Note 9)

The quality-deteriorated part analyzing system according to any one of Supplementary notes 1-8, wherein:

the path calculation means determines the paths regarded as the targets of the communication quality measurement based on monitoring target directed link groups as targets of monitoring of presence/absence of communication quality deterioration, and after the analysis means has analyzed the communication quality-deteriorated part, the path calculation means partitions the monitoring target directed link groups into finer groups and redetermines the paths regarded as the targets of the communication quality measurement based on the partitioned monitoring target directed link groups.

(Supplementary Note 10)

A quality-deteriorated part analyzing device comprising:

path calculation means which determines paths, each passing through one or more directed links between nodes in a network and being regarded as a target of communication quality measurement, by referring to topology information on the network and generates a path table which indicates directed links included in each communication quality measurement target section;

node control means which makes settings for the nodes in the network, the settings for forwarding along the paths flows corresponding to the paths determined by the path calculation means;

quality information acquiring means which acquires information on communication quality measured based on the flows corresponding to the paths determined by the path calculation means; and analysis means which analyzes a communication quality-deteriorated part in the directed links in the network based on the path table and the communication quality.

(Supplementary Note 11)

The quality-deteriorated part analyzing device according to Supplementary note 10, wherein the path calculation means determines the paths regarded as the targets of the communication quality measurement based on monitoring target directed link groups which are regarded as targets of monitoring of presence/absence of communication quality deterioration.

(Supplementary Note 12)

The quality-deteriorated part analyzing device according to Supplementary note 10 or 11, wherein the path calculation means deletes information on a measurement target section from the path table when directed links regarding the measurement target section are expressed in the path table as the sum of directed links regarding some other measurement target sections or as the difference between directed links regarding another measurement target section and directed links regarding still another measurement target section.

(Supplementary Note 13)

The quality-deteriorated part analyzing device according to any one of Supplementary notes 10-12, wherein the path calculation means determines a path that passes through the network's node having a function of measuring the communication quality based on a flow passing through the node.

(Supplementary Note 14)

The quality-deteriorated part analyzing device according to any one of Supplementary notes 10-13, wherein the path calculation means determines paths that satisfy a condition that the type of combination of measurement target sections passing through a directed link differs between each directed link belonging to a monitoring target directed link group regarded as a target of monitoring of presence/absence of communication quality deterioration and directed links other than the monitoring target directed link group.

(Supplementary Note 15)

The quality-deteriorated part analyzing device according to any one of Supplementary notes 10-14, wherein the path calculation means determines a plurality of paths that share a monitoring target directed link group as a common part and differ from each other in sections other than the monitoring target directed link group for each monitoring target directed link group regarded as a target of monitoring of presence/absence of communication quality deterioration.

(Supplementary Note 16)

The quality-deteriorated part analyzing device according to any one of Supplementary notes 10-14, wherein the path calculation means determines a plurality of paths for each monitoring target directed link group regarded as a target of monitoring of presence/absence of communication quality deterioration so that one path included in the plurality of paths contains the monitoring target directed link group and the other paths included in the plurality of paths share sections of the one path other than the monitoring target directed link group as common parts and do not contain the monitoring target directed link group.

(Supplementary Note 17)

The quality-deteriorated part analyzing device according to any one of Supplementary notes 10-16, wherein when paths of flows communicated for a purpose other than the communication quality-deteriorated part analysis are given, the path calculation means redetermines the paths of the flows.

(Supplementary Note 18)

The quality-deteriorated part analyzing device according to any one of Supplementary notes 10-17, wherein:

the path calculation means determines the paths regarded as the targets of the communication quality measurement based on monitoring target directed link groups as targets of monitoring of presence/absence of communication quality deterioration, and after the analysis means has analyzed the communication quality-deteriorated part, the path calculation means partitions the monitoring target directed link groups into finer groups and redetermines the paths regarded as the targets of the communication quality measurement based on the partitioned monitoring target directed link groups.

(Supplementary Note 19)

A quality-deteriorated part analyzing method comprising the steps of:

determining paths, each passing through one or more directed links between nodes in a network and being regarded as a target of communication quality measurement, by referring to topology information on the network and then generating a path table which indicates directed links included in each communication quality measurement target section;

making settings for the nodes in the network, the settings for forwarding along the paths flows corresponding to the determined paths;

transmitting the flows corresponding to the determined paths;

measuring communication quality based on the flows corresponding to the determined paths; and analyzing a communication quality-deteriorated part in the directed links in the network based on the path table and the communication quality.

(Supplementary Note 20)

The quality-deteriorated part analyzing method according to Supplementary note 19, wherein the paths regarded as the targets of the communication quality measurement are determined based on monitoring target directed link groups which are regarded as targets of monitoring of presence/absence of communication quality deterioration.

(Supplementary Note 21)

The quality-deteriorated part analyzing method according to Supplementary note 19 or 20, wherein information on a measurement target section is deleted from the path table when directed links regarding the measurement target section are expressed in the path table as the sum of directed links regarding some other measurement target sections or as the difference between directed links regarding another measurement target section and directed links regarding still another measurement target section.

(Supplementary Note 22)

The quality-deteriorated part analyzing method according to any one of Supplementary notes 19-21, wherein the path determining step determines a path that passes through the network's node having a function of measuring the communication quality based on a flow passing through the node.

(Supplementary Note 23)

The quality-deteriorated part analyzing method according to any one of Supplementary notes 19-22, wherein the path determining step determines paths that satisfy a condition that the type of combination of measurement target sections passing through a directed link differs between each directed link belonging to a monitoring target directed link group regarded as a target of monitoring of presence/absence of communication quality deterioration and directed links other than the monitoring target directed link group.

(Supplementary Note 24)

The quality-deteriorated part analyzing method according to any one of Supplementary notes 19-23, wherein the path determining step determines a plurality of paths that share a monitoring target directed link group as a common part and differ from each other in sections other than the monitoring target directed link group for each monitoring target directed link group regarded as a target of monitoring of presence/absence of communication quality deterioration.

(Supplementary Note 25)

The quality-deteriorated part analyzing method according to any one of Supplementary notes 19-23, wherein the path determining step determines a plurality of paths for each monitoring target directed link group regarded as a target of monitoring of presence/absence of communication quality deterioration so that one path included in the plurality of paths contains the monitoring target directed link group and the other paths included in the plurality of paths share sections of the one path other than the monitoring target directed link group as common parts and do not contain the monitoring target directed link group.

(Supplementary Note 26)

The quality-deteriorated part analyzing method according to any one of Supplementary notes 19-25, wherein when paths of flows communicated for a purpose other than the communication quality-deteriorated part analysis are given, the paths of the flows are redetermined.

(Supplementary Note 27)

The quality-deteriorated part analyzing method according to any one of Supplementary notes 19-26, wherein:

the paths regarded as the targets of the communication quality measurement are determined based on monitoring target directed link groups as targets of monitoring of presence/absence of communication quality deterioration, and after the communication quality-deteriorated part has been analyzed, the monitoring target directed link groups are partitioned into finer groups and the paths regarded as the targets of the communication quality measurement are redetermined based on the partitioned monitoring target directed link groups.

(Supplementary Note 28)

A quality-deteriorated part analyzing program for causing a computer to execute:

a path calculation process of determining paths, each passing through one or more directed links between nodes in a network and being regarded as a target of communication quality measurement, by referring to topology information on the network and then generating a path table which indicates directed links included in each communication quality measurement target section;

a node control process of making settings for the nodes in the network, the settings for forwarding along the paths flows corresponding to the paths determined by path calculation process;

a quality information acquiring process of acquiring information on communication quality measured based on the flows corresponding to the paths determined in the path calculation process; and an analysis process of analyzing a communication quality-deteriorated part in the directed links in the network based on the path table and the communication quality.

(Supplementary Note 29)

The quality-deteriorated part analyzing program according to Supplementary note 28, causing the computer in the path calculation process to determine the paths regarded as the targets of the communication quality measurement based on monitoring target directed link groups which are regarded as targets of monitoring of presence/absence of communication quality deterioration.

(Supplementary Note 30)

The quality-deteriorated part analyzing program according to Supplementary note 28 or 29, causing the computer in the path calculation process to delete information on a measurement target section from the path table when directed links regarding the measurement target section are expressed in the path table as the sum of directed links regarding some other measurement target sections or as the difference between directed links regarding another measurement target section and directed links regarding still another measurement target section.

(Supplementary Note 31)

The quality-deteriorated part analyzing program according to any one of Supplementary notes 28-30, causing the computer in the path calculation process to determine a path that passes through the network's node having a function of measuring the communication quality based on a flow passing through the node.

(Supplementary Note 32)

The quality-deteriorated part analyzing program according to any one of Supplementary notes 28-31, causing the computer in the path calculation process to determine paths that satisfy a condition that the type of combination of measurement target sections passing through a directed link differs between each directed link belonging to a monitoring target directed link group regarded as a target of monitoring of presence/absence of communication quality deterioration and directed links other than the monitoring target directed link group.

(Supplementary Note 33)

The quality-deteriorated part analyzing program according to any one of Supplementary notes 28-32, causing the computer in the path calculation process to determine a plurality of paths that share a monitoring target directed link group as a common part and differ from each other in sections other than the monitoring target directed link group for each monitoring target directed link group regarded as a target of monitoring of presence/absence of communication quality deterioration.

(Supplementary Note 34)

The quality-deteriorated part analyzing program according to any one of Supplementary notes 28-32, causing the computer in the path calculation process to determine a plurality of paths for each monitoring target directed link group regarded as a target of monitoring of presence/absence of communication quality deterioration so that one path included in the plurality of paths contains the monitoring target directed link group and the other paths included in the plurality of paths share sections of the one path other than the monitoring target directed link group as common parts and do not contain the monitoring target directed link group (Supplementary Note 35)

The quality-deteriorated part analyzing program according to any one of Supplementary notes 28-34, wherein when paths of flows communicated for a purpose other than the communication quality-deteriorated part analysis are given, the quality-deteriorated part analyzing program causes the computer in the path calculation process to redetermine the paths of the flows.

(Supplementary Note 36)

The quality-deteriorated part analyzing program according to any one of Supplementary notes 28-35, wherein:

the quality-deteriorated part analyzing program causes the computer in the path calculation process to determine the paths regarded as the targets of the communication quality measurement based on monitoring target directed link groups as targets of monitoring of presence/absence of communication quality deterioration, and after the analysis process, the quality-deteriorated part analyzing program causes the computer to partition the monitoring target directed link groups into finer groups and redetermine the paths regarded as the targets of the communication quality measurement based on the partitioned monitoring target directed link groups.

(Supplementary Note 37)

A quality-deteriorated part analyzing system comprising:

a path calculation unit which determines paths, each passing through one or more directed links between nodes in a network and being regarded as a target of communication quality measurement, by referring to topology information on the network and generates a path table which indicates directed links included in each communication quality measurement target section;

a node control unit which makes settings for the nodes in the network, the settings for forwarding along the paths flows corresponding to the paths determined by the path calculation unit;

a flow transmission unit which transmits the flows corresponding to the paths determined by the path calculation unit;

a quality measurement unit which measures communication quality based on the flows corresponding to the paths determined by the path calculation unit; and an analysis unit which analyzes a communication quality-deteriorated part in the directed links in the network based on the path table and the communication quality measured by the quality measurement unit.

(Supplementary Note 38)

The quality-deteriorated part analyzing system according to Supplementary note 37, wherein the path calculation unit determines the paths regarded as the targets of the communication quality measurement based on monitoring target directed link groups which are regarded as targets of monitoring of presence/absence of communication quality deterioration.

(Supplementary Note 39)

The quality-deteriorated part analyzing system according to Supplementary note 37, wherein the path calculation unit deletes information on a measurement target section from the path table when directed links regarding the measurement target section are expressed in the path table as the sum of directed links regarding some other measurement target sections or as the difference between directed links regarding another measurement target section and directed links regarding still another measurement target section.

(Supplementary Note 40)

The quality-deteriorated part analyzing system according to Supplementary note 37, wherein:

at least one quality measurement unit is implemented by a node in the network, and the path calculation unit determines a path passing through the node operating as the quality measurement unit.

(Supplementary Note 41)

The quality-deteriorated part analyzing system according to Supplementary note 37, wherein the path calculation unit determines paths that satisfy a condition that the type of combination of measurement target sections passing through a directed link differs between each directed link belonging to a monitoring target directed link group regarded as a target of monitoring of presence/absence of communication quality deterioration and directed links other than the monitoring target directed link group.

(Supplementary Note 42)

The quality-deteriorated part analyzing system according to Supplementary note 37, wherein the path calculation unit determines a plurality of paths that share a monitoring target directed link group as a common part and differ from each other in sections other than the monitoring target directed link group for each monitoring target directed link group regarded as a target of monitoring of presence/absence of communication quality deterioration.

(Supplementary Note 43)

The quality-deteriorated part analyzing system according to Supplementary note 37, wherein the path calculation unit determines a plurality of paths for each monitoring target directed link group regarded as a target of monitoring of presence/absence of communication quality deterioration so that one path included in the plurality of paths contains the monitoring target directed link group and the other paths included in the plurality of paths share sections of the one path other than the monitoring target directed link group as common parts and do not contain the monitoring target directed link group.

(Supplementary Note 44)

The quality-deteriorated part analyzing system according to Supplementary note 37, wherein when paths of flows communicated for a purpose other than the communication quality-deteriorated part analysis are given, the path calculation unit redetermines the paths of the flows.

(Supplementary Note 45)

The quality-deteriorated part analyzing system according to Supplementary note 37, wherein:

the path calculation unit determines the paths regarded as the targets of the communication quality measurement based on monitoring target directed link groups as targets of monitoring of presence/absence of communication quality deterioration, and after the analysis unit has analyzed the communication quality-deteriorated part, the path calculation unit partitions the monitoring target directed link groups into finer groups and redetermines the paths regarded as the targets of the communication quality measurement based on the partitioned monitoring target directed link groups.

(Supplementary Note 46)

A quality-deteriorated part analyzing device comprising:

a path calculation unit which determines paths, each passing through one or more directed links between nodes in a network and being regarded as a target of communication quality measurement, by referring to topology information on the network and generates a path table which indicates directed links included in each communication quality measurement target section;

a node control unit which makes settings for the nodes in the network, the settings for forwarding along the paths flows corresponding to the paths determined by the path calculation unit;

a quality information acquiring unit which acquires information on communication quality measured based on the flows corresponding to the paths determined by the path calculation unit; and an analysis unit which analyzes a communication quality-deteriorated part in the directed links in the network based on the path table and the communication quality.

(Supplementary Note 47)

The quality-deteriorated part analyzing device according to Supplementary note 46, wherein the path calculation unit determines the paths regarded as the targets of the communication quality measurement based on monitoring target directed link groups as targets of monitoring of presence/absence of communication quality deterioration.

(Supplementary Note 48)

The quality-deteriorated part analyzing device according to Supplementary note 46, wherein the path calculation unit deletes information on a measurement target section from the path table when directed links regarding the measurement target section are expressed in the path table as the sum of directed links regarding some other measurement target sections or as the difference between directed links regarding another measurement target section and directed links regarding still another measurement target section.

(Supplementary Note 49)

The quality-deteriorated part analyzing device according to Supplementary note 46, wherein the path calculation unit determines a path that passes through the network's node having a function of measuring the communication quality based on a flow passing through the node.

(Supplementary Note 50)

The quality-deteriorated part analyzing device according to Supplementary note 46, wherein the path calculation unit determines paths that satisfy a condition that the type of combination of measurement target sections passing through a directed link differs between each directed link belonging to a monitoring target directed link group regarded as a target of monitoring of presence/absence of communication quality deterioration and directed links other than the monitoring target directed link group.

(Supplementary Note 51)

The quality-deteriorated part analyzing device according to Supplementary note 46, wherein the path calculation unit determines a plurality of paths that share a monitoring target directed link group as a common part and differ from each other in sections other than the monitoring target directed link group for each monitoring target directed link group regarded as a target of monitoring of presence/absence of communication quality deterioration.

(Supplementary Note 52)

The quality-deteriorated part analyzing device according to Supplementary note 46, wherein the path calculation unit determines a plurality of paths for each monitoring target directed link group regarded as a target of monitoring of presence/absence of communication quality deterioration so that one path included in the plurality of paths contains the monitoring target directed link group and the other paths included in the plurality of paths share sections of the one path other than the monitoring target directed link group as common parts and do not contain the monitoring target directed link group.

(Supplementary Note 53)

The quality-deteriorated part analyzing device according to Supplementary note 46, wherein when paths of flows communicated for a purpose other than the communication quality-deteriorated part analysis are given, the path calculation unit redetermines the paths of the flows.

(Supplementary Note 54)

The quality-deteriorated part analyzing device according to Supplementary note 46, wherein:

the path calculation unit determines the paths regarded as the targets of the communication quality measurement based on monitoring target directed link groups as targets of monitoring of presence/absence of communication quality deterioration, and after the analysis unit has analyzed the communication quality-deteriorated part, the path calculation unit partitions the monitoring target directed link groups into finer groups and redetermines the paths regarded as the targets of the communication quality measurement based on the partitioned monitoring target directed link groups.

While the present invention has been described above with reference to the exemplary embodiments, the present invention is not to be restricted to the particular illustrative exemplary embodiments. A variety of modifications understandable to those skilled in the art can be made to the configuration and details of the present invention within the scope of the present invention.

This application claims priority to Japanese Patent Application No. 2010-034010 filed on Feb. 18, 2010, the entire disclosure of which is incorporated herein by reference.

INDUSTRIAL APPLICABILITY

The present invention is suitably applicable to the analysis of the communication quality-deteriorated part in a network.

REFERENCE SIGNS LIST

100$a$, 100$b$, 100$c$ quality analysis server (quality-deteriorated part analyzing device)
200 probe
1010 quality information gathering unit
1030 quality information storage unit
1040 path table storage unit
1050 flow link table management unit
1060 flow link table storage unit
1070 quality analysis unit
1080 analysis result storage unit
1090 topology gathering unit
1100 topology information storage unit
1110 path calculation unit
1120 path implementation unit
1130 path information gathering unit

The invention claimed is:

1. A quality-deteriorated part analyzing system comprising:

a path calculation unit implemented at least by a hardware including a processor to determine paths, each passing through one or more directed links between nodes in a network and being regarded as a target of a communication quality measurement, by referring to topology information on the network and generates a path table which indicates directed links included in each communication quality measurement target section;

a node control unit implemented at least by a hardware including a processor to set the nodes in the network so that flows corresponding to the paths determined by the path calculation unit run along the paths, and so that the nodes in the network transmit the flows corresponding to the path determined by the path calculation unit;
a quality information acquiring unit implemented at least by a hardware including a processor to acquire information on communication quality measured by at least one node in the network based on the flows corresponding to the paths determined by the path calculation unit; and
an analysis unit implemented at least by a hardware including a processor to analyze a communication quality-deteriorated part in the directed links in the network based on the path table and the communication quality,
wherein one communication quality measurement target section includes the directed links on one path determined by the path calculation unit,
wherein the path calculation unit deletes information on a measurement target section from the path table when directed links regarding the measurement target section are expressed in the path table as a sum of directed links regarding some other measurement target sections or as a difference between directed links of another measurement target section and directed links of still another measurement target section.

2. The quality-deteriorated part analyzing system according to claim 1, wherein the path calculation unit determines the paths regarded as the targets of the communication quality measurement based on monitoring target directed link groups which are regarded as targets of monitoring of presence/absence of communication quality deterioration.

3. The quality-deteriorated part analyzing system according to claim 1, wherein:
the path calculation unit determines a path passing through at least one node in the network which measured the communication quality.

4. The quality-deteriorated part analyzing system according to claim 1, wherein the path calculation unit determines paths that satisfy a condition that a type of combination of measurement target sections passing through a directed link differs between each directed link belonging to a monitoring target directed link group regarded as a target of monitoring of presence/absence of communication quality deterioration and directed links other than the monitoring target directed link group.

5. The quality-deteriorated part analyzing system according to claim 1, wherein the path calculation unit determines a plurality of paths that share a monitoring target directed link group as a common part and differ from each other in sections other than a monitoring target directed link group for each monitoring target directed link group regarded as a target of monitoring of presence/absence of communication quality deterioration.

6. The quality-deteriorated part analyzing system according to claim 1, wherein the path calculation unit determines a plurality of paths for each monitoring target directed link group regarded as a target of monitoring of presence/absence of communication quality deterioration so that one path included in the plurality of paths contains the monitoring target directed link group and other paths included in the plurality of paths share sections of the one path other than the monitoring target directed link group as common parts and do not contain the monitoring target directed link group.

7. The quality-deteriorated part analyzing system according to claim 1, wherein said communication quality includes one or more of a packet loss rate, a packet loss number, delay information, a RTT (Round Trip Time), a jitter, and an R-factor.

8. The quality-deteriorated part analyzing system according to claim 1, wherein said path calculation unit judges whether a path calculation process has finished for one or more monitoring target directed link groups.

9. The quality-deteriorated part analyzing system according to claim 1, wherein said path calculation unit selects a monitoring target directed link group and calculates paths of analysis flows in regard to said monitoring target directed link group.

10. The quality-deteriorated part analyzing system according to claim 1, wherein said path calculation unit examines whether an expression of each flow is possible as one of a sum of expressions of some other flows and a difference between an expression of another flow and an expression of still another flow.

11. The quality-deteriorated part analyzing system according to claim 10, wherein when said expression of each flow is possible as said one of a sum of expressions of some other flows and a difference between an expression of another flow and an expression of still another flow, said path calculation unit determines that a flow under consideration is expressed subordinately and deletes a description of said flow from the path table.

12. The quality-deteriorated part analyzing system according to claim 1, wherein said path calculation unit calculates a plurality of paths under a first condition that a path of one analysis flow passes through a monitoring target directed link group and a path of another analysis flow does not pass through the monitoring target directed link group.

13. The quality-deteriorated part analyzing system according to claim 12, wherein said path calculation unit calculates a plurality of paths under a second condition that a part of a former path other than the monitoring target directed link group is also included in a latter path as a common part.

14. A quality-deteriorated part analyzing device comprising:
a path calculation unit implemented at least by a hardware including a processor to determine paths, each passing through one or more directed links between nodes in a network and being regarded as a target of a communication quality measurement, by referring to topology information on the network and generates a path table which indicates directed links included in each communication quality measurement target section;
a node control unit implemented at least by a hardware including a processor to set the nodes in the network so that flows corresponding to the paths determined by the path calculation unit run along the paths;
a quality information acquiring unit implemented at least by a hardware including a processor to acquire information on communication quality measured based on the flows corresponding to the paths determined by the path calculation unit; and
an analysis unit implemented at least by a hardware including a processor to analyze a communication quality-deteriorated part in the directed links in the network based on the path table and the communication quality,
wherein one communication quality measurement target section includes the directed links on one path determined by the path calculation unit,
wherein the path calculation unit deletes information on a measurement target section from the path table when directed links regarding the measurement target section are expressed in the path table as a sum of directed links regarding some other measurement target sections or as a difference between directed links of another measurement target section and directed links of still another measurement target section.

15. A quality-deteriorated part analyzing method comprising:
- determining paths, each passing through one or more directed links between nodes in a network and being regarded as a target of a communication quality measurement, by referring to topology information on the network and then generating a path table which indicates directed links included in each communication quality measurement target section;
- setting the nodes in the network so that flows corresponding to the determined paths run along the determined paths;
- transmitting the flows corresponding to the determined paths;
- measuring communication quality based on the flows corresponding to the determined paths; and
- analyzing a communication quality-deteriorated part in the directed links in the network based on the path table and the communication quality,
- wherein one communication quality measurement target section includes the directed links on one determined path,
- wherein the generating the path table further comprises: deleting information on a measurement target section from the path table when directed links regarding the measurement target section are expressed in the path table as a sum of directed links regarding some other measurement target sections or as a difference between directed links of another measurement target section and directed links of still another measurement target section.

16. The quality-deteriorated part analyzing method of claim 15, wherein the measuring communication quality further comprises: comparing a value of one or more communication quality items with a predetermined threshold value.

17. The quality-deteriorated part analyzing method system according to claim 16, wherein said value of one or more communication quality items is classified based on said comparison.

18. A non-transitory computer readable recording medium in which a quality-deteriorated part analyzing program is recorded, the quality-deteriorated part analyzing program causing a computer to execute:
- a path calculation process of determining paths, each passing through one or more directed links between nodes in a network and being regarded as a target of communication quality measurement, by referring to topology information on the network and then generating a path table which indicates directed links included in each communication quality measurement target section;
- a node control process of setting the nodes in the network so that flows corresponding to the paths determined by the path calculation process run along the paths;
- a quality information acquiring process of acquiring information on communication quality measured based on the flows corresponding to the paths determined in the path calculation process; and
- an analysis process of analyzing a communication quality-deteriorated part in the directed links in the network based on the path table and the communication quality,
- wherein one communication quality measurement target section include the directed links on one path determined by the path calculation process,
- wherein the node control process further comprises: deleting information on a measurement target section from the path table when directed links regarding the measurement target section are expressed in the path table as a sum of directed links regarding some other measurement target sections or as a difference between directed links of another measurement target section and directed links of still another measurement target section.

* * * * *